US012762917B2

(12) United States Patent
Rigby et al.

(10) Patent No.: US 12,762,917 B2
(45) Date of Patent: Oct. 13, 2026

(54) MONEY ITEM HANDLING SYSTEM AND METHOD

(71) Applicant: Crane Payment Innovations Limited, Royton (GB)

(72) Inventors: Mike Rigby, Bolton (GB); Kevin Mulvey, Warrington (GB); Ian Peers, Oldham (GB); Mark Watson, Warrington (GB)

(73) Assignee: Crane Payment Innovations Limited, Royton (GB)

( * ) Notice: Subject to any disclaimer, the term of this patent is extended or adjusted under 35 U.S.C. 154(b) by 846 days.

(21) Appl. No.: 17/755,210

(22) PCT Filed: Oct. 26, 2020

(86) PCT No.: PCT/GB2020/052709

§ 371 (c)(1),
(2) Date: Apr. 22, 2022

(87) PCT Pub. No.: WO2021/079159

PCT Pub. Date: Apr. 29, 2021

(65) Prior Publication Data

US 2022/0398889 A1 Dec. 15, 2022

(30) Foreign Application Priority Data

Oct. 24, 2019 (GB) ..................................... 1915439

(51) Int. Cl.
*G07D 9/00* (2006.01)
*G07D 1/00* (2006.01)
(Continued)

(52) U.S. Cl.
CPC ............... *G07D 9/008* (2013.01); *G07D 1/00* (2013.01); *G07D 3/06* (2013.01); *G07D 3/125* (2013.01)

(58) Field of Classification Search
CPC ............ G07D 9/008; G07D 1/00; G07D 3/06; G07D 3/125; G07D 3/00
See application file for complete search history.

(56) References Cited

U.S. PATENT DOCUMENTS 2,256,976 A * 9/1941 Ford .................. G07F 17/0078 194/244
3,174,488 A * 3/1965 Rau ......................... G07D 3/10 453/3
(Continued)

FOREIGN PATENT DOCUMENTS

CN 1525404 9/2004
CN 201383179 1/2010
(Continued)

OTHER PUBLICATIONS

First Office Action dated Sep. 29, 2024, in connection with Chinese Application No. 202080075673.7, 28 pages.
(Continued)

*Primary Examiner* — Jeffrey A Shapiro

(57) ABSTRACT

A money item handling system, comprising a mixed denomination money item storage region comprising at least one money item outlet routing; at least one money item collection zone arranged to receive mixed denomination money items outlet through the at least one money item outlet routing; at least one money item conveyor arranged to collect money items from the at least one money item collection zone and to convey money items collected from the at least one money item collection zone around a path of the at least one money item conveyor; at least one money item flow control apparatus; and at least one actuator configured to controllably actuate the at least one money item flow control apparatus to selectively control movement of
(Continued)

money items from the mixed denomination money item storage region to the at least one money item collection zone.

16 Claims, 30 Drawing Sheets

(51) Int. Cl.
*G07D 3/06* (2006.01)
*G07D 3/12* (2006.01)

(56) References Cited

U.S. PATENT DOCUMENTS 3,703,903 A * 11/1972 Landis .................. G07D 9/008 453/57
4,544,058 A * 10/1985 Choderker ............... G07D 5/04 194/339
4,558,711 A * 12/1985 Ikuta Yoshiaki ......... G07D 3/14 453/3
4,635,661 A * 1/1987 Uematsu .................. G07F 5/24 453/20
5,356,333 A * 10/1994 Bointon .................... G07F 5/24 221/75
5,366,407 A * 11/1994 Sentoku ................... G07D 3/14 453/32
5,684,597 A * 11/1997 Hossfield ................. G07D 5/02 194/317
5,735,379 A * 4/1998 Schulze .............. G07F 17/3258 194/352
6,050,388 A * 4/2000 Gautherot ................ G07D 5/08 194/351
6,786,408 B2 * 9/2004 Yamagishi ........... G06K 7/0008 235/451
8,535,125 B2 * 9/2013 Starke ...................... G07D 9/00 453/18
9,881,436 B1 * 1/2018 Juan ......................... G07D 1/06
10,068,404 B2 * 9/2018 Shibata .................... G07D 3/06
2001/0015310 A1 8/2001 Cole
2003/0032387 A1 * 2/2003 Abe ....................... G07D 9/008 453/56
2003/0221933 A1 * 12/2003 Morikawa ................ G07D 5/00 194/302
2004/0093117 A1 * 5/2004 Daout .................... G07D 11/12 700/231
2005/0107025 A1 * 5/2005 Malcolm .................. G07D 1/00 453/22
2006/0113161 A1 * 6/2006 Umeda .................. G07D 9/008 194/302
2009/0008215 A1 * 1/2009 Bell ......................... G07D 5/08 194/350
2010/0203817 A1 * 8/2010 Rigo ........................ G07D 5/00 453/3
2010/0210200 A1 * 8/2010 Bell ....................... G07D 9/008 221/121
2010/0234985 A1 * 9/2010 Shuren ..................... G07D 9/00 700/223
2014/0008176 A1 * 1/2014 Watson .................... G07D 5/04 194/350
2015/0371478 A1 * 12/2015 Blythin .................... G07D 3/00 453/18
2016/0086413 A1 * 3/2016 Blythin .................... G07D 1/02 453/18

FOREIGN PATENT DOCUMENTS

CN 105247580 A 1/2016
CN 106796741 A 5/2017
EP 369731 A * 5/1990 ............... G07F 9/04
EP 1617384 A1 1/2006
JP S60241183 A 11/1985
JP S62114091 A 5/1987
JP H08167060 6/1996
WO WO 9812672 A1 * 3/1998 ............... G07F 1/04
WO 2007/146705 A2 12/2007
WO 2014184555 11/2014
WO 2016009172 1/2016

OTHER PUBLICATIONS

International Search Report and Written Opinion of the International Searching Authority dated Mar. 23, 2021, in connection with International Application No. PCT/GB2020/052709, 22 pages.

* cited by examiner

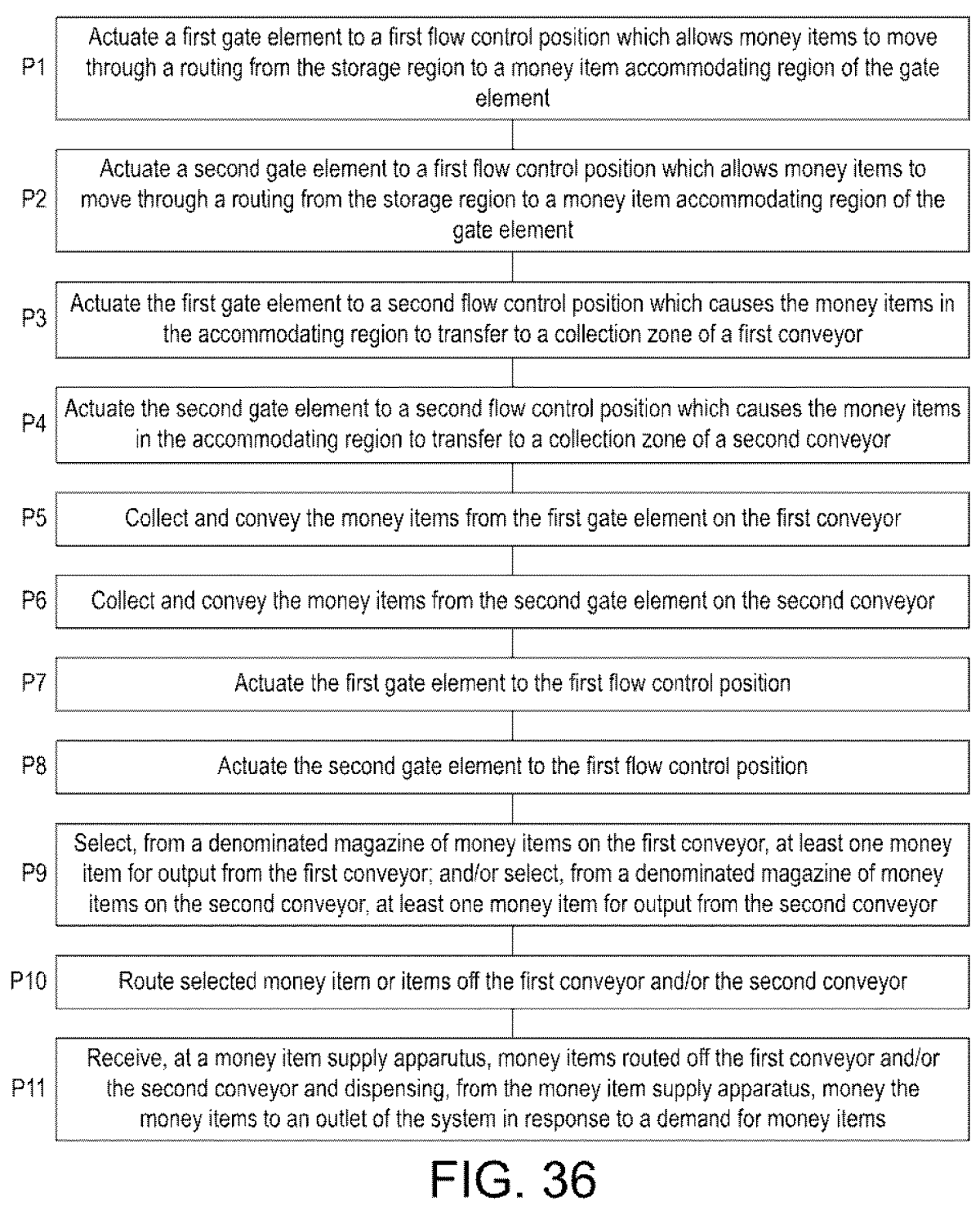

P1 Actuate a first gate element to a first flow control position which allows money items to move through a routing from the storage region to a money item accommodating region of the gate element P2 Actuate a second gate element to a first flow control position which allows money items to move through a routing from the storage region to a money item accommodating region of the gate element P3 Actuate the first gate element to a second flow control position which causes the money items in the accommodating region to transfer to a collection zone of a first conveyor P4 Actuate the second gate element to a second flow control position which causes the money items in the accommodating region to transfer to a collection zone of a second conveyor P5 Collect and convey the money items from the first gate element on the first conveyor P6 Collect and convey the money items from the second gate element on the second conveyor P7 Actuate the first gate element to the first flow control position P8 Actuate the second gate element to the first flow control position P9 Select, from a denominated magazine of money items on the first conveyor, at least one money item for output from the first conveyor; and/or select, from a denominated magazine of money items on the second conveyor, at least one money item for output from the second conveyor P10 Route selected money item or items off the first conveyor and/or the second conveyor P11 Receive, at a money item supply apparutus, money items routed off the first conveyor and/or the second conveyor and dispensing, from the money item supply apparatus, money the money items to an outlet of the system in response to a demand for money items

FIG. 36

MONEY ITEM HANDLING SYSTEM AND METHOD

CROSS REFERENCE TO RELATED APPLICATIONS

This application is a 371 National Stage of International Application No. PCT/GB2020/052709, filed Oct. 26, 2020, which claims priority to United Kingdom Patent Application No. GB1915439.2, filed Oct. 24, 2019, the disclosures of which are herein incorporated by reference in their entirety.

FIELD

This specification relates to a money item handling system and a method of handling money items.

BACKGROUND

Money item handling equipment is often used to feed money items, such as coins, from an internal storage region to an outlet. There are technical challenges to producing such equipment, for example when the system is required to feed money items of different sizes and/or denominations from a mixed storage region to an outlet in response to demand and without undue delay.

SUMMARY

This specification provides a money item handling system, comprising a mixed denomination money item storage region comprising at least one money item outlet routing; at least one money item collection zone arranged to receive mixed denomination money items outlet through the at least one money item outlet routing; at least one money item conveyor arranged to collect money items from the at least one money item collection zone and to convey money items collected from the at least one money item collection zone around a path of the at least one money item conveyor; at least one money item flow control apparatus; and at least one actuator configured to controllably actuate the at least one money item flow control apparatus to selectively control movement of money items from the mixed denomination money item storage region to the at least one money item collection zone.

The specification also provides a method of operating a money item handling system, comprising actuating at least one money item flow control apparatus to feed, from a mixed denomination money item storage region, money items to a collection zone of a money item conveyor via a first money item outlet routing between the mixed denomination money item storage region and the money item conveyor; conveying, on the money item conveyor, a plurality of money items from the collection zone to at least one money item sensor; denominating, at the at least one money item sensor, the plurality of money items; selecting, from the denominated money items on the conveyor, at least one money item for output from the money item conveyor; routing, in a money item outlet zone of the money item conveyor, the selected at least one money item off the money item conveyor.

The specification also provides a money item handling system, comprising a money item storage region; a money item feed in which at least one money item routing is arranged to feed money items out of the money item storage region;

a rotatable apparatus comprising at least one gate element; and at least one actuator configured to controllably rotate the rotatable apparatus between at least first and second flow control positions to control movement of money items from the money item storage region through the at least one money item routing.

The specification also provides a money item handling system, comprising: a first money item conveyor configured to rotate in a first plane; at least one first money item sensor configured to denominate money items on the first conveyor; a second money item conveyor configured to rotate in a second plane different to the first plane; at least one second money item sensor configured to denominate money items on the second conveyor; a money item storage region; and a money item feed in which a first routing feeds money items from the money item storage region to the first money item conveyor and a second routing feeds money items from the money item storage region to the second money item conveyor.

The specification also provides a method of operating a money item handling system, comprising: feeding, from a money item storage region, a first plurality of money items to a first conveyor via a first routing between the money item storage region and the first conveyor, wherein the first money item conveyor is configured to rotate in a first plane; feeding, from the money item storage region, a second plurality of money items to a second conveyor via a second routing between the money item storage region and the second conveyor, wherein the second money item conveyor is configured to rotate in a second plane different from the first plane; conveying the first plurality of money items on the first conveyor to at least one first money item sensor and denominating the first plurality of money items at the at least one first money item sensor to create a first magazine of denominated money items on the first conveyor; conveying the second plurality of money items on the second conveyor to at least one second money item sensor and denominating the second plurality of money items at the at least one second money item sensor to create a second magazine of denominated money items on the second conveyor; selecting, from a combination of the first and second magazines of denominated money items on the first and second conveyors, at least one money item for output; and outputting the selected at least one money item from the money item handling system.

The specification also provides a money item handling system, comprising

- a money item storage region; a money item feed in which at least one money item routing is arranged to feed money items out of the money item storage region; a rotatable apparatus, arranged to rotate in a plane of rotation inside the money item storage region, comprising at least one gate element which is selectively alignable with the at least one money item routing; at least one actuator configured to controllably rotate the rotatable apparatus to selectively vary a degree of alignment between the at least one gate element and the at least one money item routing to control movement of money items from the money item storage region through the at least one money item routing.

Example implementations are described below with reference to the accompanying figures.

BRIEF DESCRIPTION OF THE FIGURES

FIG. 36 is a flow diagram of operation of a money item handling system including a money item conveyor, a money item storage region, a routing to allow a flow of money items from the storage region to the money item conveyor, and a gate element which is actuatable by the system relative to the routing;

DETAILED DESCRIPTION

A money item handling system which is able to output money items, such as coins, in response to demand is described below. Aspects of the system have the capability to respond and output such money items, in accordance with the demand, at a very high rate. The system is also efficient, at least in terms of its use of space, meaning that it can be accommodated in a small space envelope. Aspects of the system also operate to reduce and manage the manner in which mechanical loads are placed on moving elements of the system. This improves system reliability and may also improve the longevity of system components.

Figure 1:
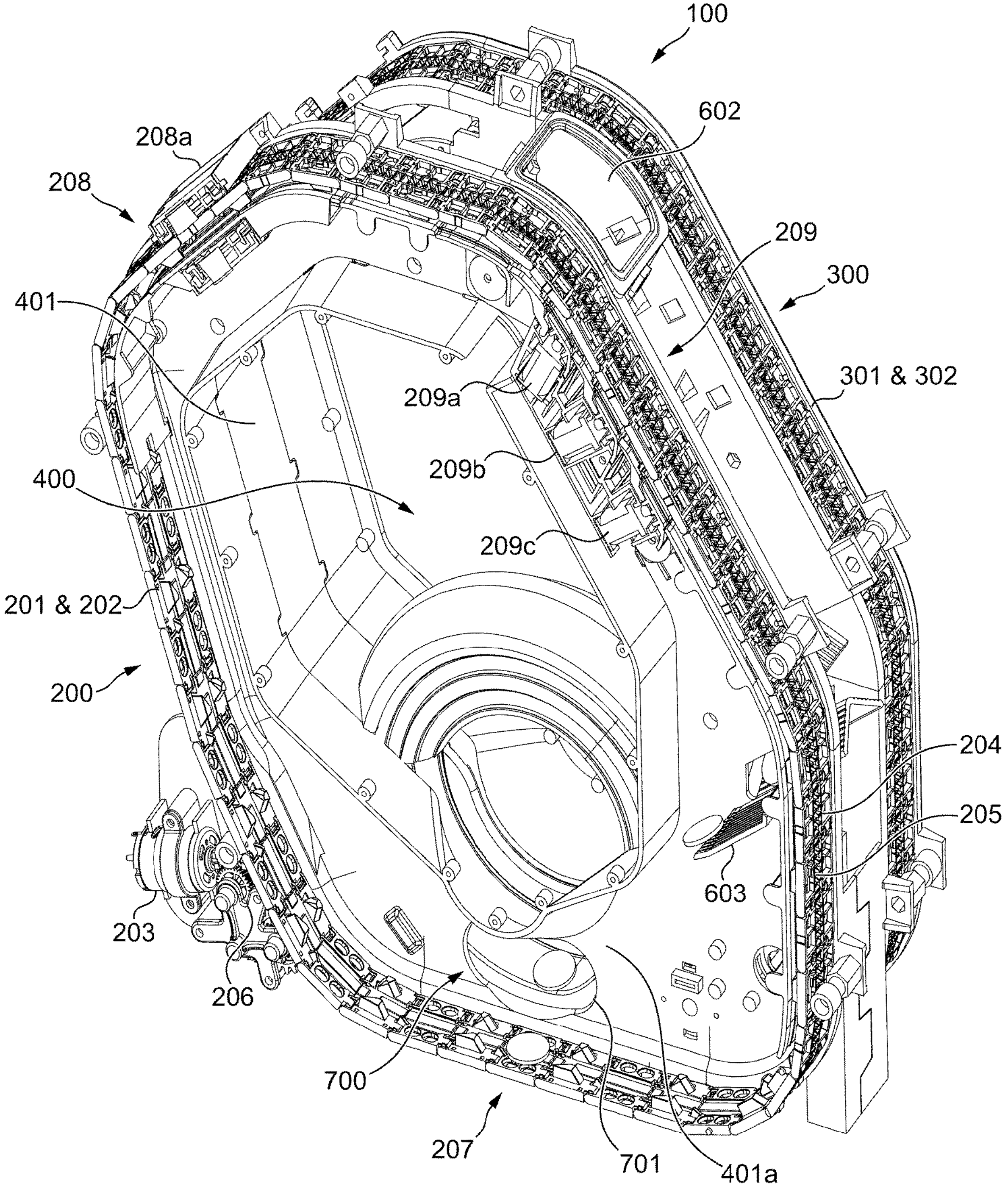
FIG. 1 is a perspective cut-away view of aspects of a money item handling system, including first and second money item conveyors, a money item storage region and selectively moveable flow control apparatuses, in the form of gate elements, to control a flow of money items from the storage region to the conveyors via first and second routings.

FIG. 1 illustrates aspects of an example of a money item handling system 100. As shown, the illustrated system 100 comprises a first money item conveyor 200, a second money item conveyor 300 and a money item storage region 400 which is configured to store money items of mixed denomination. The system 100 is configured to feed money items from the storage region 400 to the first and second conveyors 200, 300 so that money items from the storage region 400 may be transported by the conveyors 200, 300 to one or more outlet paths of the system 100. As will be explained in various places below, although the system illustrated in FIG. 1 includes two conveyors 200, 300, the system may instead include other numbers of conveyors, including a single conveyor.

As shown in FIG. 1, the first conveyor 200 and second conveyor 300, where present, may each comprise an endlessly looped track 201, 301 of money item conveying elements 202, 302 (best illustrated in FIGS. 4-6 discussed further below). The tracks 201, 301 are articulated so that the plurality of conveying elements 202, 302 of each track 201, 301 can pivot with respect to one another as the tracks 201, 301 travel around the paths of their respective conveyors 200, 300. Movement of the tracks 201, 301 around these paths may be controlled via one or more motor-driven actuators of the money item handling system 100. For example, FIG. 1 illustrates an electric motor 203 located adjacent to the radially outwardly facing surface 204 of the looped track 201 of the first conveyor 200. The electric motor 203 is arranged to engage with teeth 205 on this outwardly facing track surface 204, such as via a drive cog 206, to move the track 201 around the path of the conveyor 200. A further electric motor (not shown), or alternative electrical actuator, which is controllable independently of the first motor 203, may drive movement of the track 301 of the second conveyor 300 in the same manner.

The looped path of each conveyor 200, 300 has a plurality of zones. For example, referring again to the first conveyor 200 illustrated in FIG. 1, a first of these zones comprises a money item collection zone 207 at which money items from the money item storage region 400 reach the conveyor 200 and are collected by the conveying elements 202 of the track 201. As will be explained in more detail further below, the collection zone 207 is located towards the bottom of the conveyor path to aid the passage of money items from the storage region 400 to the track 201. A second zone of the conveyor path comprises a money item sensing zone 208, at which money items on the looped track 201 are denominated by one or more money item sensors 208*a* located adjacent to the track 201. In some implementations, the one or more money item sensors 208*a* in the sensing zone 208 may also be configured to validate the money items on the looped track 201 in order to determine or confirm authenticity (e.g. as a second check). A third zone of the conveyor path comprises a money item outlet zone 209, at which money items on the looped track 201 may be selectively routed off the track 201 through one or more outlet gates 209*a*, 209*b*, 209*c*.

The first, second and third zones 207-209 of the first conveyor 200 described above may be replicated by corresponding first, second and third zones of the second conveyor 300. The zones 207-209 are positioned one after another in a direction of rotation of the looped tracks 201, 301 so that money items moving around the conveyor paths on the tracks 201, 301 are denominated at the sensing zone 208 before reaching the outlet zone 209. This allows the one or more outlet gates 209*a-c* of the respective conveyors 200, 300 to be selectively opened to route particular known denominations of money item, as denominated at the sensing zone 208, off the tracks 201, 301. Operation of the outlet gates 209*a-c* is controlled by an electronic computing apparatus 1200 of the money item handling system 100, as described in more detail further below.

Figure 2:
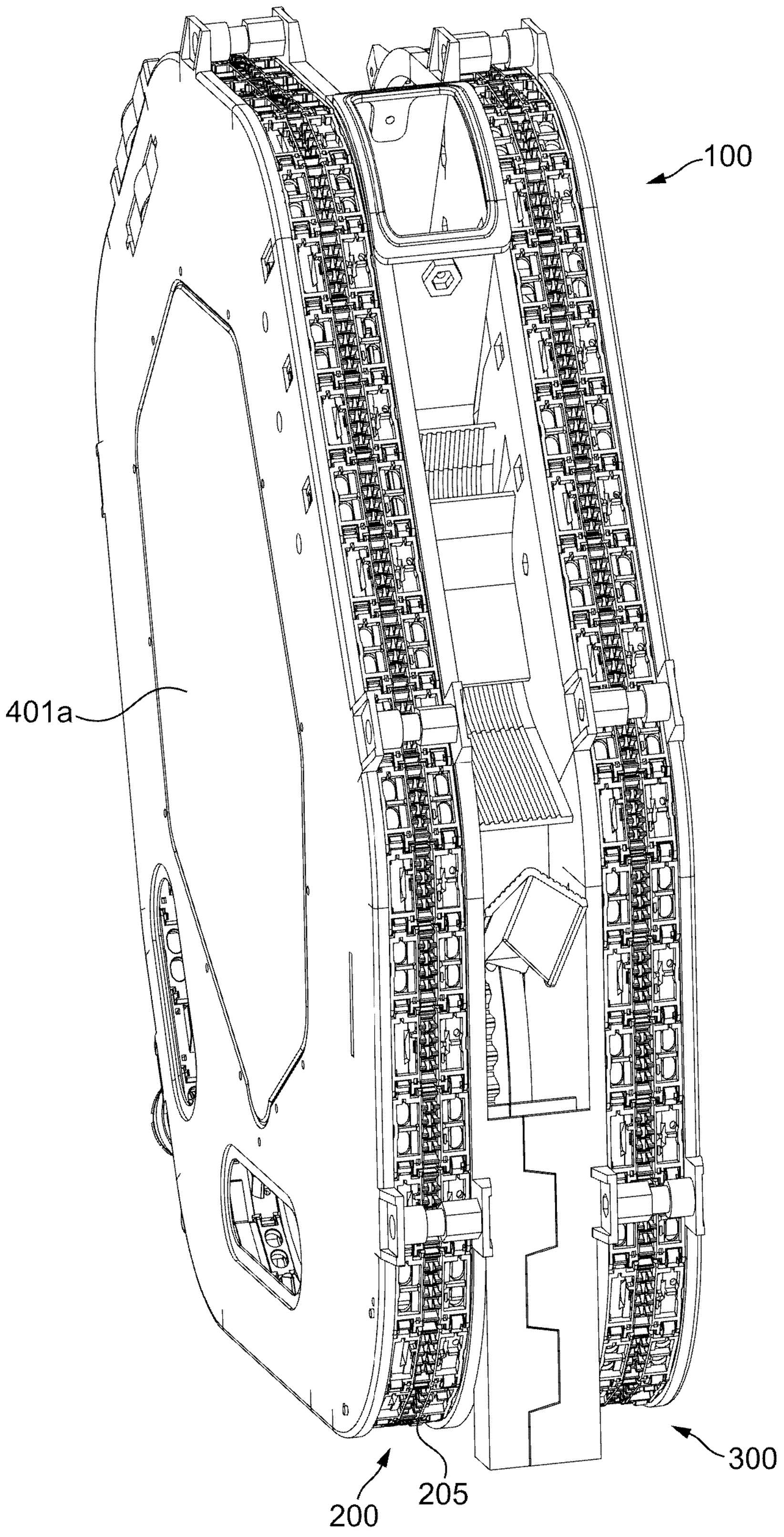
FIG. 2 is a perspective view of aspects of the money item handling system illustrated in FIG. 1.

The track 201 of the first conveyor 200 is arranged to move around its looped path in a plane of rotation which is different to, and separated from, the plane of rotation of the track 301 of the second conveyor 300. For example, as illustrated in FIGS. 1 and 2, the rotation plane of the first conveyor 200 may be parallel (or near parallel) to the rotation plane of the second conveyor 300.

Figure 3:
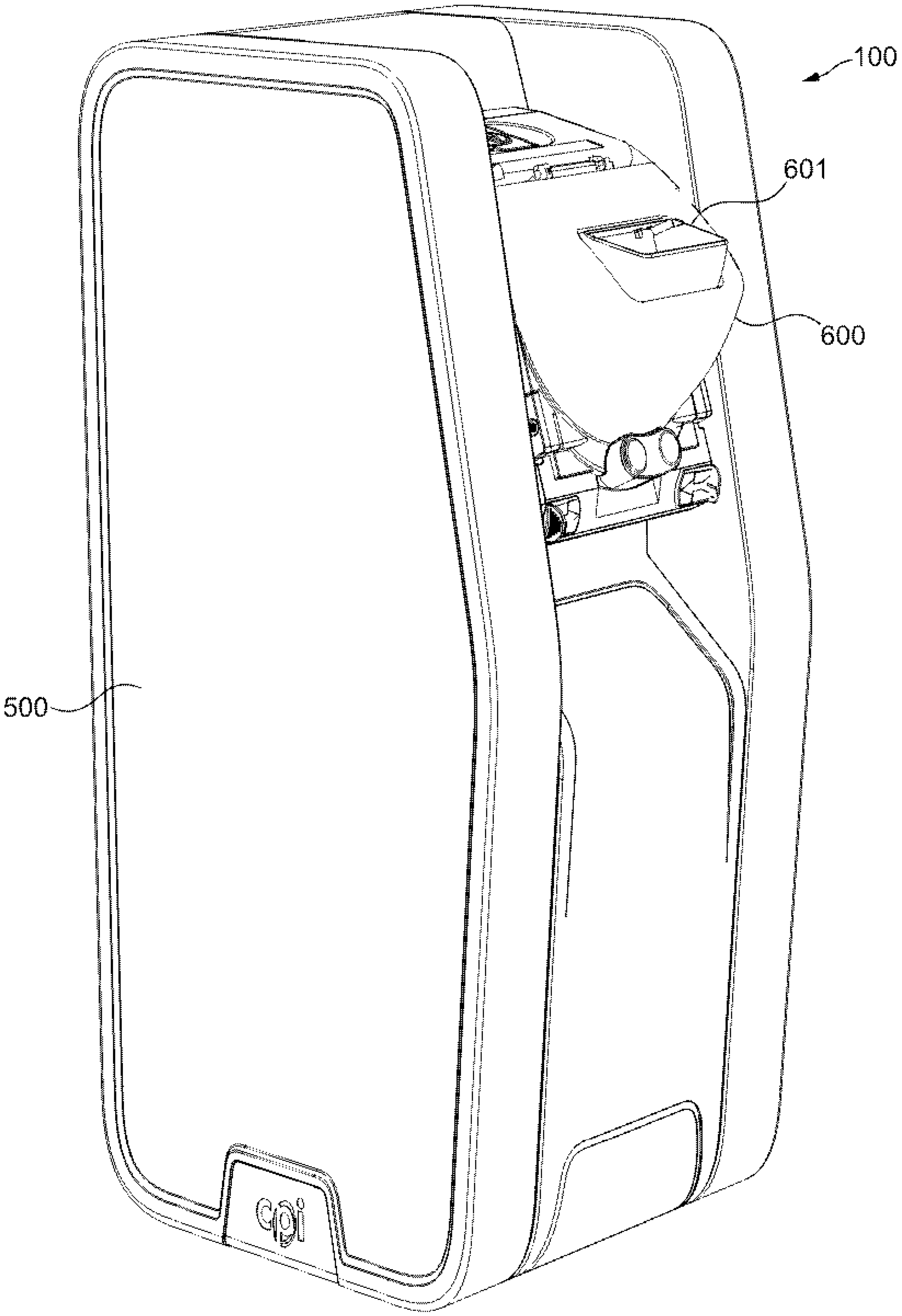
FIG. 3 is a perspective view of a money item handling system, including an external housing of the system and a money item receiving apparatus for feeding money items into a storage region of the system.

In the money item handling system 100, the region between the rotation plane of the first conveyor 200 and the rotation plane of the second conveyor 300 may be occupied, at least partially, by the money item storage region 400. For example, as shown in FIGS. 1 and 2, the money item storage region 400 may comprise a container 401 which extends laterally across the system 100 from the rotation plane of the first conveyor 200 to the rotation plane of the second conveyor 300, where present. The space occupied by the storage region 400 may include regions bounded by the tracks 201, 301 of one or both of the conveyors 200, 300, i.e. regions within the planes of the conveyor(s) 200, 300. This increases the volume of the money item storage region 400 and improves the use of space within the system 100 as a whole. This arrangement contributes to efficient packaging of the principal elements of the system 100 into a small space envelope, so that the system 100 can likewise be accommodated in a more space-efficient manner inside an external housing. An example of this can be seen in FIG. 3, in which the first and second conveyors 200, 300, the money item storage region 400 and other elements of the system 100 are contained inside a protective housing 500.

A money item receiving apparatus 600, such as a bulk coin entry apparatus, may be located at an exterior of the housing 500. The money item receiving apparatus 600 is configured to validate money items fed into the apparatus 600 for authenticity. Money items which are determined to be non-authentic may be directed by the receiving apparatus 600 back to the exterior of the housing 500, via a money item reject path, for collection by a user of the system 100. On the other hand, money items which are determined to be authentic are fed into the system 100.

Figure 10:
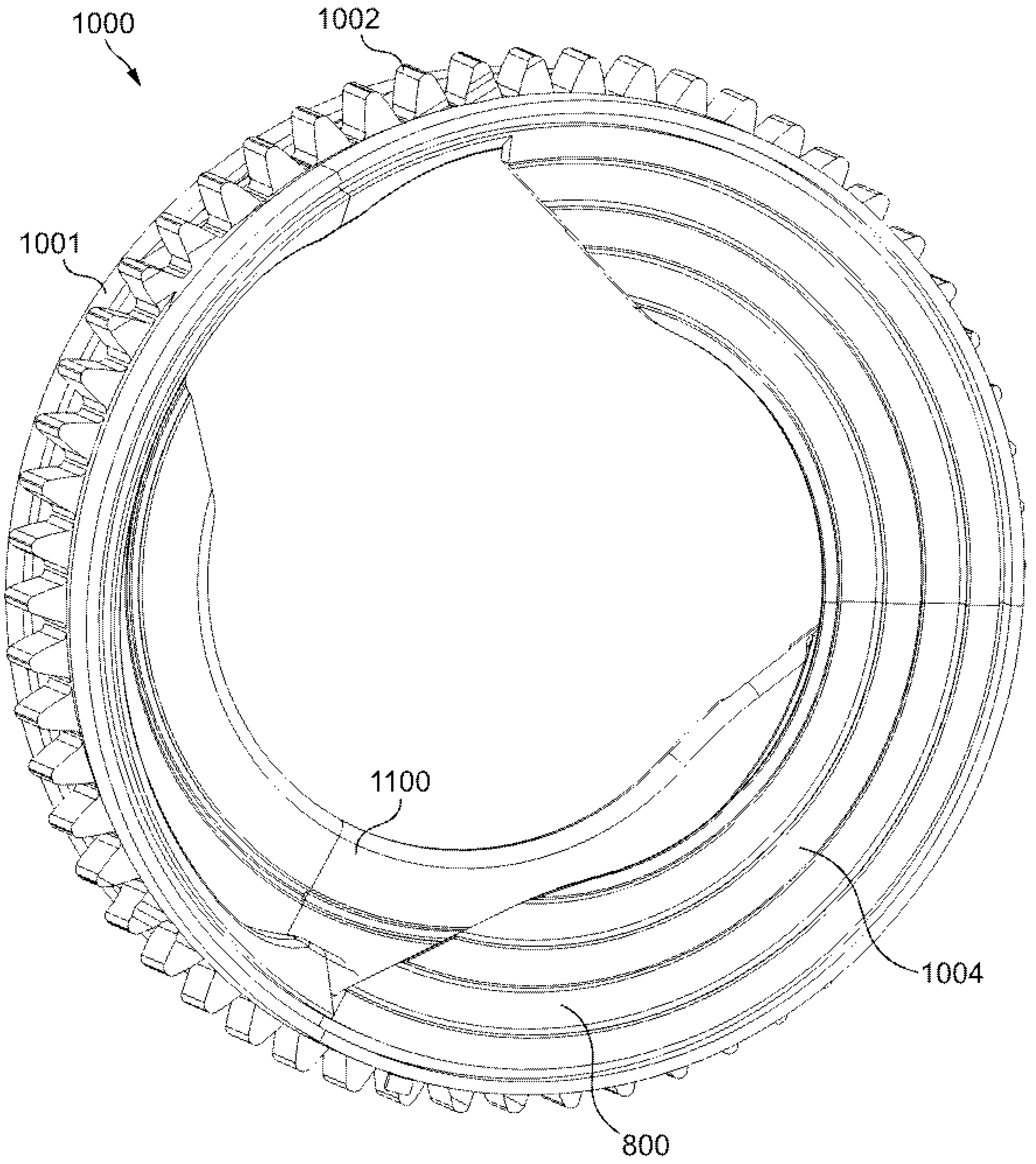
FIG. 10 is a fourth perspective view of a rotatable apparatus, in the form of a wheel, comprising a gate element for selectively blocking a money item routing.

For example, the receiving apparatus 600 may feed validated money items directly to the money item storage region 400 via a feed routing 602 between the receiving apparatus 600 and an entrance of the storage container 401 mentioned above. The entrance of the money item storage container 401 may be located, for example, at the top of the container 401 so that money items entering the container 401 from the receiving apparatus 600 naturally fall towards the bottom of the container 401 under gravity. The passage of money items towards the bottom of the container 401 may be guided to some extent by a narrowing width of the container 401 towards its base. This is illustrated in FIGS. 1 and 10.

In some implementations of the system 100, it may be possible for authorized personnel to access the feed routing 602 from the exterior of the housing 500 in a manner which bypasses the money item receiving apparatus 600. In such implementations, a hinge or other articulation apparatus may be present on the receiving apparatus 600 to allow the receiving apparatus 600 to be moved, relative to the housing 500, in order to reveal the feed routing 602 and allow money items to be deposited directly into it from the exterior of the housing 500. This direct access may be useful, for example, for the purposes of bulk-filling the storage region 400 with money items as part of a general service or maintenance operation by authorized personnel. Such authorized personnel may be in possession of keys to one or more locks which otherwise prevent movement of the money item receiving apparatus 600 relative to the housing 500.

In addition or as an alternative to the above, the money item receiving apparatus 600 may be configured to feed money items directly to the collection zones 207 of the first and/or second conveyors 201, 202 via further feed routings 603 between the receiving apparatus 600 and the respective collection zones 207. These further routings allow money items to be selectively sent straight to one or both of the conveyor collection zones without first passing through the money item storage region 400. An outlet of such a further feed routing 603 between the receiving apparatus 600 and the collection zone 207 of the first conveyor 201 is illustrated in FIG. 1.

A record of validated money items deposited in the system 100 via the money item receiving apparatus 600 may be maintained by the computing apparatus 1200, discussed further below, based on data received from the receiving apparatus 600. In implementations where the money item receiving apparatus 600 is not configured to validate incoming money items, validation of money items may be performed on the conveyor(s) 200, 300 as mentioned above.

As mentioned above, the money item handling system 100 is configured to feed money items from the money item storage region 400 to the track 201 of the first conveyor 200. In some implementations, the money item handling system 100 is also configured to feed money items from the money item storage region 400 to the track 301 of the second conveyor 300. In order to facilitate this, the system 100 comprises a first routing from the storage region 400 to the first conveyor 200 and may comprise a second routing from the storage region 400 to the second conveyor 300. An example of such a first routing 700 is illustrated in FIG. 1, where it is shown as comprising an outlet aperture 701 in a first side wall 401*a* of the money item storage/feed container 401. The outlet aperture 701 is adjacent to the first conveyor 200 so that money items which move out of the storage region 400 through the outlet aperture 701 may be transported away on the conveyor track 201. In particular, the outlet aperture 701 of the first routing 700 is located adjacent to the money item collection zone 207 of the first conveyor 200, so that money items which move through the first routing 700 can be collected by the track 201, e.g. by pick-up regions of the articulated conveying elements 202, as the track 201 is driven through the collection zone 207. If multiple money items move through the first routing 700, they may pool in the collection zone 207 before being carried away on the moving track 201. The elements 202 of the track 201 may singulate money items as they are picked up and carried away from the collection zone 207.

A corresponding arrangement to that described above with respect to the first routing 700 may be provided also for the second routing. In particular, the second routing may comprise a second outlet aperture in a second side wall of the money item storage/feed container 401. The second side wall is on the opposite side of the storage/feed container to the first side wall 401*a*. The second outlet aperture is adjacent to the second conveyor 300 so that money items which move out of the storage region 400 through the second outlet aperture may be transported away on the track 301 of the second conveyor 300. In particular, the outlet aperture of the second routing is located adjacent to the money item collection zone of the second conveyor 300, so that money items which move through the second routing can be collected by the track 301, e.g. by pick-up regions of the articulated conveying elements 302, as the track 301 is driven through the collection zone. As described above with respect to the first routing 700, if multiple money items move through the second routing they may pool in the collection zone of the second conveyor 300 before being carried away, one by one, on the moving track 301.

Movement of money items from the storage region 400 to the first and second conveyors 200, 300 may be controlled by a money item flow control apparatus of the system 100. The money item flow control apparatus may be actuatable to selectively start, stop and/or vary the flow of money items to the first conveyor 200 and/or the second conveyor 300. As discussed in more detail below, a powered actuator may be provided in the system to facilitate movement of the flow control apparatus, as required, in order to selectively cause money items from the storage region 400 to flow to the first and/or second conveyors. For example, movement of money items through the first and second routings towards the first and second conveyors 200, 300 may be controlled by individual gate elements located at the first and second routings. In particular, flow of money items from the storage region 400 through the first routing may be selectively permitted by actuation of a first gate element, whereas flow of money items from the storage region 400 through the second routing may be selectively permitted by actuation of a second gate element. Examples of this are described below, again using the first routing 700 as an illustrative example. In general, the money item flow control apparatus is discussed in the remaining description principally in the context of individual gate elements although, as mentioned below, other implementations are also possible.

An example first gate element 800, which is selectively moveable relative to the first routing 700 to selectively open and close the first routing 700, is illustrated in FIGS. 4-10. The first gate element 800 may be selectively moveable across the outlet aperture 701 of the first routing 700 to control and vary the rate of flow of money items from the money item storage region 400 to the first conveyor 200. Movement of the gate element 800 relative to the first routing 700 is caused by one or more actuators 900 connected to the gate element 800, such as one or more motor-driven actuator(s). The actuator(s) 900 operate under the control of the computing apparatus 1200 of the money item handling system 100 to controllably and selectively actuate movement of the gate element 800 to each of a plurality of possible positions of the gate element 800 relative to the first routing 700.

The plurality of positions for the gate element 800 may be selectively adopted to increase or decrease a rate of flow of money items through the first routing 700. In a first flow control position, the gate element 800 is positioned relative to the routing 700 so as to fully block the routing 700 and thereby prevent money items from moving past the gate element 800 towards the conveyor 200. In second, intermediate, flow control positions, the gate element 800 partially blocks the routing 700 but allows a restricted flow of money items past the gate element 800 towards the conveyor 200. In a third flow control position, the gate element 800 does not block the routing 700 and thereby allows a full flow of money items past the gate element 800 towards the conveyor 200.

Figure 4:
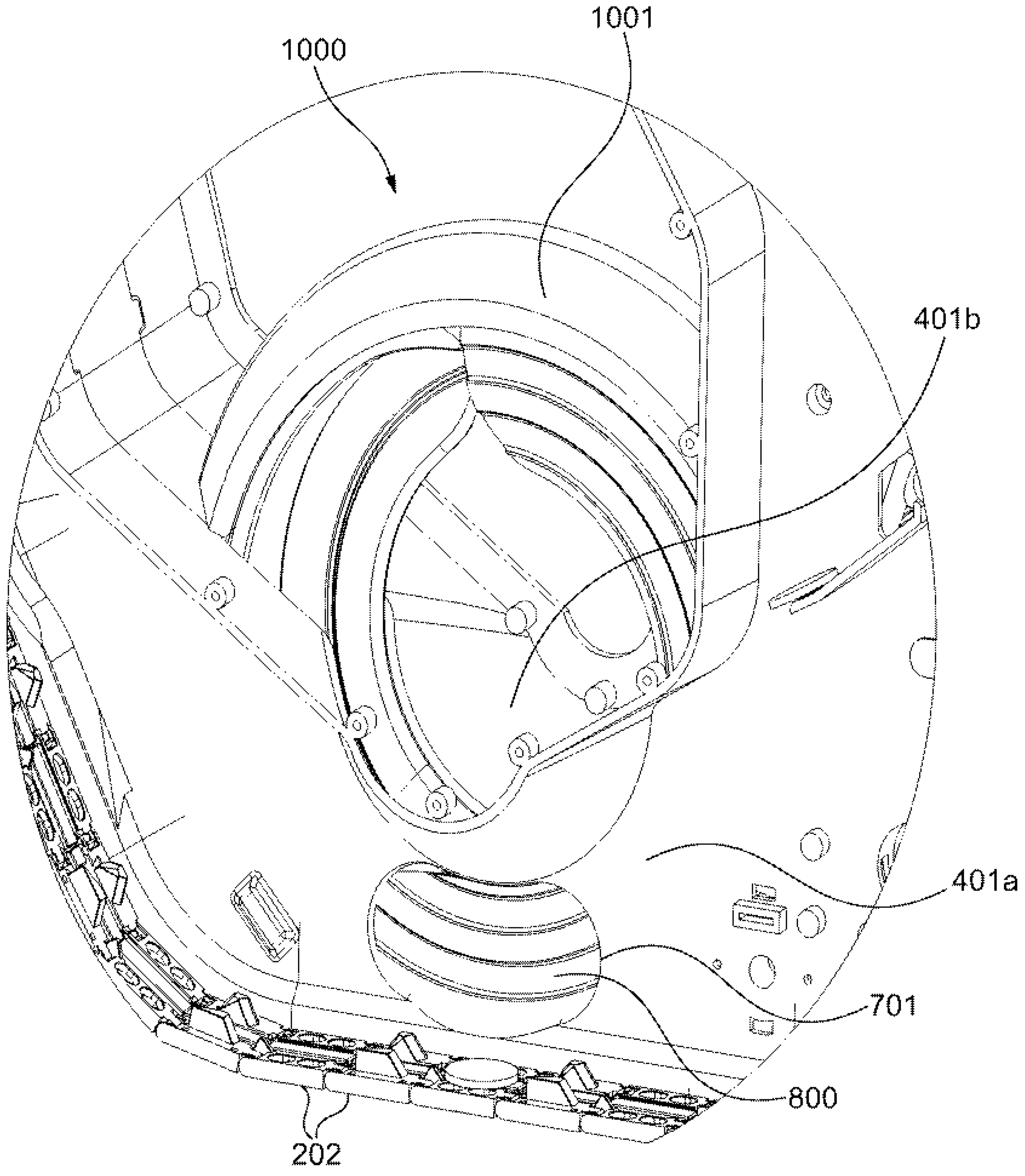
FIG. 4 is a perspective cut-away view of aspects of a money item handling system in which a gate element, which is selectively moveable relative to a money item routing, is in a closed position.

An example of the first flow control position of the gate element 800 is illustrated in FIG. 4. The gate element 800 can be implemented in various ways so as to control movement of money items through the first routing in the manner outlined above. In FIG. 4, the gate element 800 is part of a rotatable apparatus 1000 (also shown in FIG. 1) located inside the storage region 400 of the money item handling system 100. The rotatable apparatus 1000 occupies a position at the base of the money item storage region 400 so that money items within the storage region 400 naturally fall under gravity into the rotatable apparatus 1000. The rotatable apparatus 1000 is in an upstanding orientation inside the storage region 400, so that money items which enter the storage region 400 from the top naturally fall through the storage region 400 to the bottom of the rotatable apparatus 1000. For example, FIG. 1 illustrates how the central region of the rotatable apparatus 1000 is hollow. This allows money items which have fallen through the storage region 400 to sit on an upwardly facing internal surface of the rotatable apparatus 1000. The narrowing side walls of the money item storage/feed container 401 may guide money items downwards through the storage region 400 into the hollow central region of the rotatable apparatus 1000.

The rotatable apparatus 1000 can be rotated relative to the container 401 of the storage region 400 so as to adjust the position of the gate element 800 relative to the first routing 700. As shown in FIG. 4, the rotatable apparatus 1000 may comprise a wheel 1001 which can be turned under the control of the actuator 900 mentioned above so as to move the gate element 800 across the routing 700. When the rotatable apparatus 1000 is rotated inside the storage region 400, the gate element 800 is caused to slide along the internal surface of the container side wall 401*a* so as to block (or unblock) the outlet aperture 701 of the routing 700.

Figure 5:
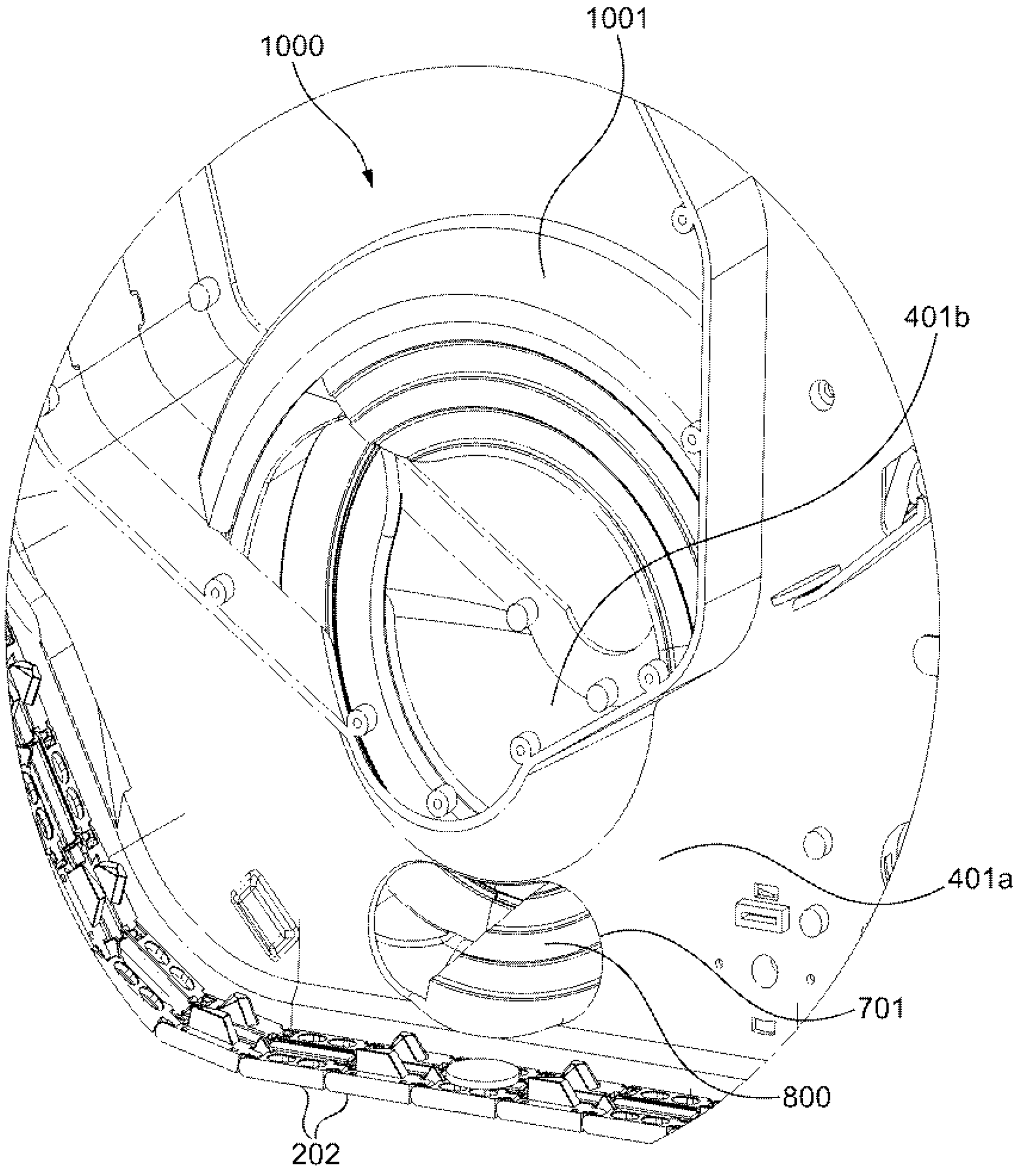
FIG. 5 is a perspective cut-away view of aspects of a money item handling system in which a gate element, which is selectively moveable relative to a money item routing, is in a partially open position.

An example of a second, intermediate flow control position of the gate element 800 is illustrated in FIG. 5. In this figure, the gate element 800 is again illustrated as part of the rotatable apparatus 1000. The rotatable apparatus 1000 has been rotated relative to the first flow control position shown in FIG. 4 so as to partially retract the gate element 800 across the outlet aperture 701 of the first routing 700 and thereby partially open the first routing 700. In this partially open position, money items may move through the first routing 700 from the storage region 400 to the collection zone 207 of the first conveyor 200.

Figure 6:
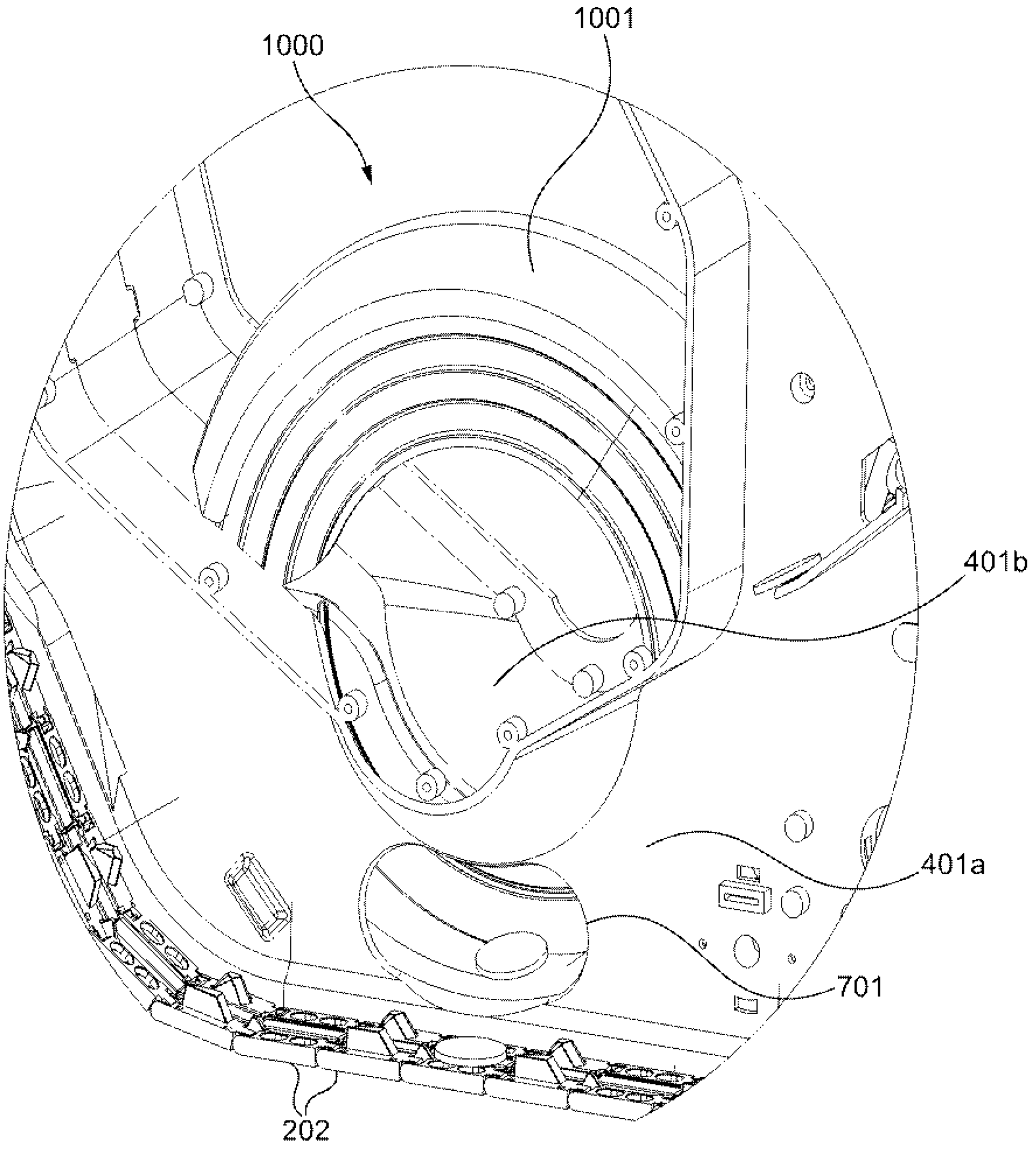
FIG. 6 is a perspective cut-away view of aspects of a money item handling system in which a gate element, which is selectively moveable relative to a money item routing, is in a fully open position.

An example of the third flow control position of the gate element 800 is illustrated in FIG. 6. In this figure, the gate element 800 is again illustrated as part of the rotatable apparatus 1000. The rotatable apparatus has been further rotated (in the same direction) relative to the first flow control position shown in FIG. 4 so as to further (and fully) retract the gate element 800 across the outlet aperture 701 and thereby fully open the first routing 700. In this fully open position, money items may move through the first routing 700 from the storage region 400 to the collection zone 207 of the first conveyor 200. Due to the fully open nature of the first routing 700, the rate of flow of the money items through the routing 700 to the first conveyor 200 in this position of the gate element 800 may be higher than in the second, intermediate position of the gate element 800 shown in FIG. 5.

A corresponding arrangement to that described above with respect to the first gate element 800 and first routing 700 may also be provided for the second routing. In particular, as briefly mentioned above, the money item handling system 100 may also comprise a second gate element 1100 which is selectively moveable relative to the second routing to control and/or vary the rate of flow of money items from the money item storage region 400 to the second conveyor 300.

In a similar manner to the first gate element discussed above with respect to FIGS. 4-6, the second gate element 1100 may be selectively moveable across an outlet aperture of the second routing, which may be located in the opposite side wall 401*b* of the storage container 401 to the outlet aperture 701 of the first routing 700. For example, the second gate element 1100 may be part of the same rotatable apparatus 1000 discussed above in relation to the first gate element 800. This implementation is discussed more below with respect to FIGS. 7-10. Alternatively, the second gate element 1100 may be part of a separate rotatable apparatus (not shown), which is rotatable independently of the rotatable apparatus 1000 comprising the first gate element 800. In either case, when the rotatable apparatus comprising the second gate element 1100 is rotated inside the storage region 400, the second gate element 1100 may be caused to slide along the internal surface of the container side wall 401*b* so as to block (or unblock) the outlet aperture of the second routing.

Movement of the second gate element 1100 relative to the second routing may be caused by the same one or more actuators 900 mentioned above with respect to the first gate element 800. Alternatively, one or more different actuators may be used if, for example, the second gate element 1100 is implemented on a separate wheel to the first gate element 800. Movement of the second gate element 1100 may be controllably and selectively actuated to each of the plurality of possible flow control positions discussed above for the first gate element 800 (but relative to the second routing rather than the first routing). In a corresponding fashion to the first gate element 800, the plurality of possible positions for the second gate element 1100 may be selectively adopted to increase or decrease a rate of flow of money items through the second routing to the second conveyor 300.

The outlet aperture of the second routing may correspond in position, shape and size to the outlet aperture 701 of the first routing 700, e.g. in the second sidewall 401*b* referred to above. Alternatively, the outlet aperture of the second routing may have a different shape and/or size to the outlet aperture 701 of the first routing 700. In this latter configuration, the different outlet apertures may be specifically optimised for the passage of different sizes and/or denominations of money item from the storage region 400 to the first and second conveyors 200, 300, respectively. This may be particularly effective in implementations of the system 100 in which the different outlet apertures are fed by different, e.g. partitioned, areas of the money item storage region 400 containing differently sized/shaped denominations of money item.

Figure 7:
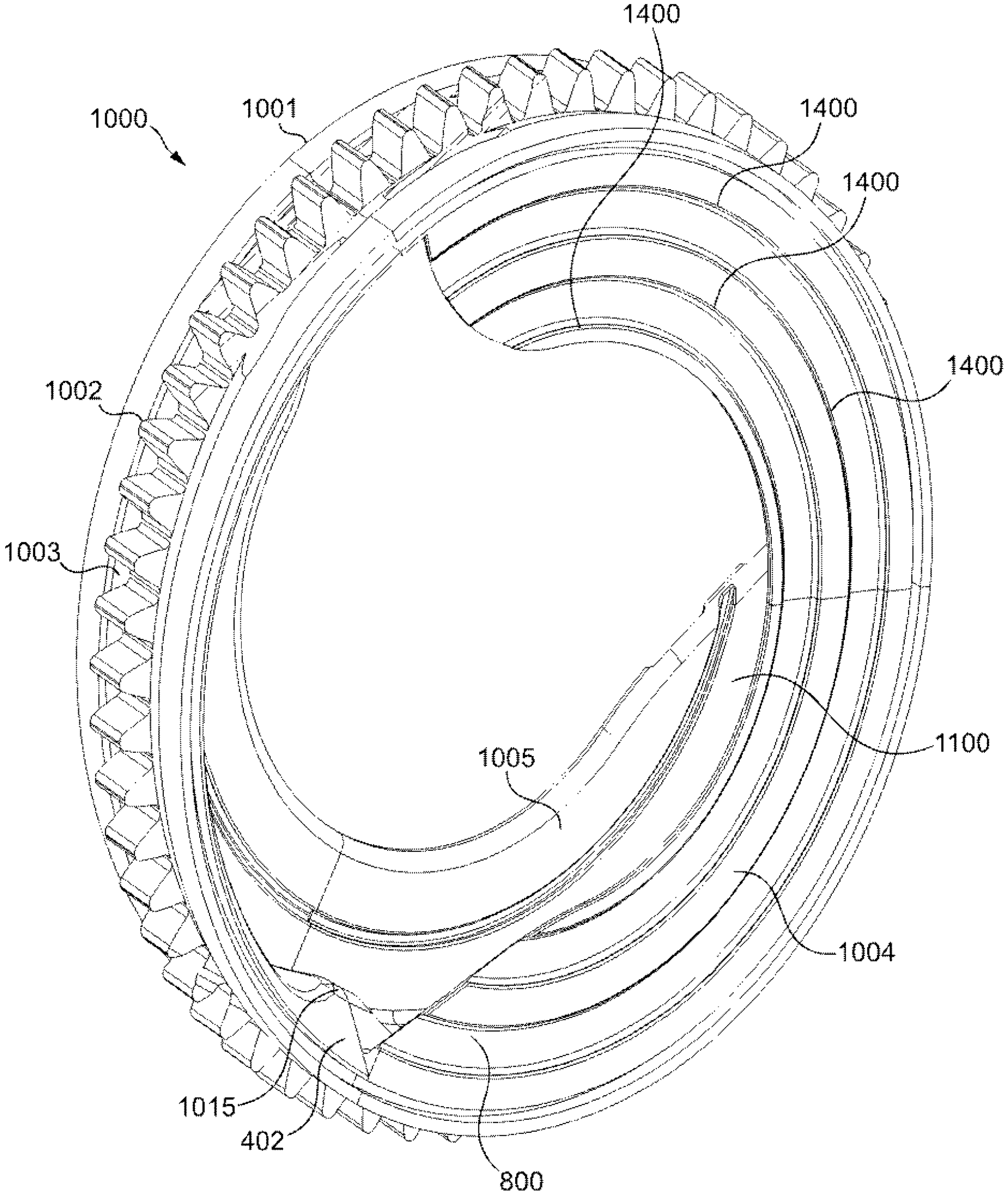
FIG. 7 is a first perspective view of a rotatable apparatus, in the form of a wheel, comprising a gate element for selectively blocking a money item routing.
Figure 8:
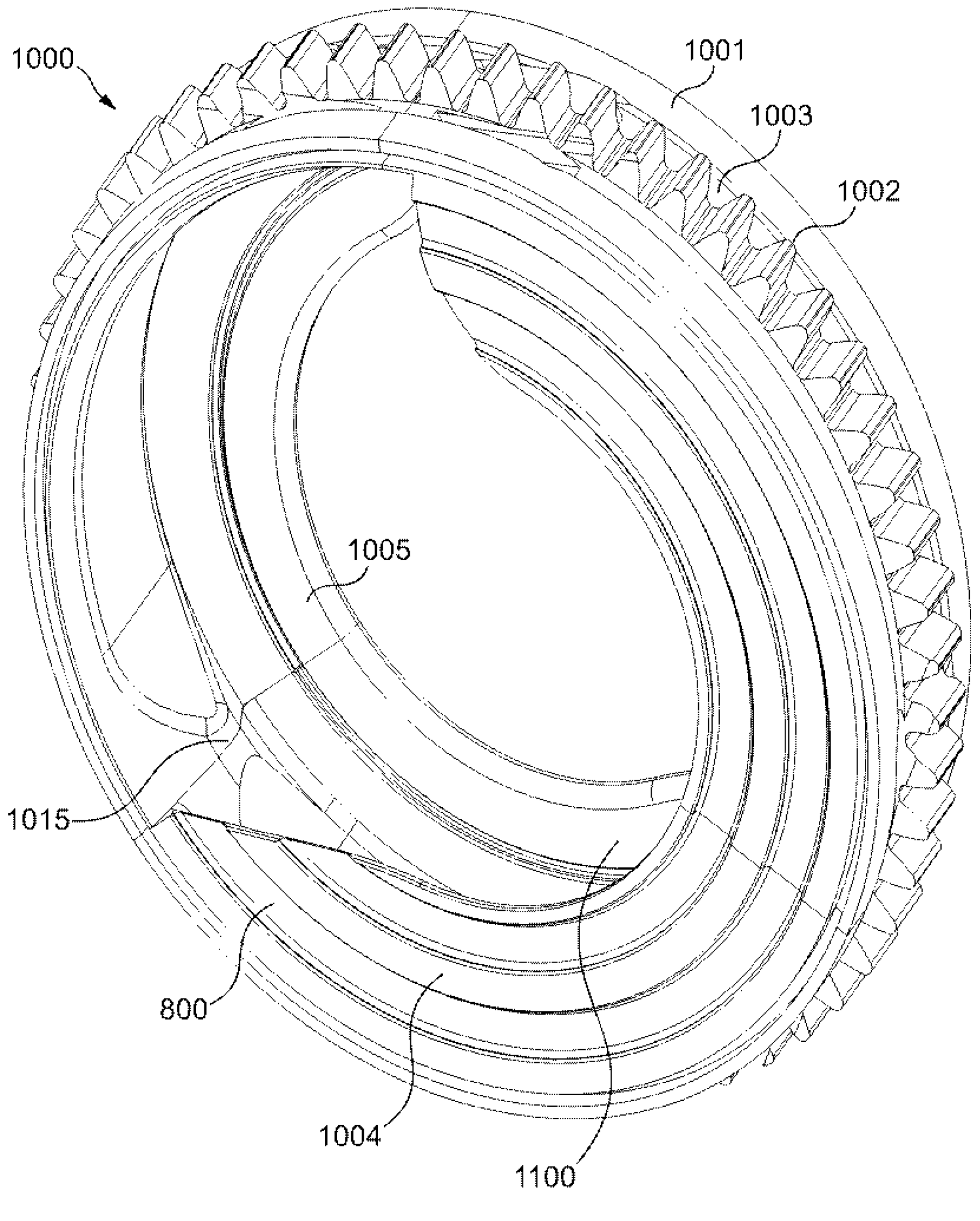
FIG. 8 is a second perspective view of a rotatable apparatus, in the form of a wheel, comprising a gate element for selectively blocking a money item routing.
Figure 9:
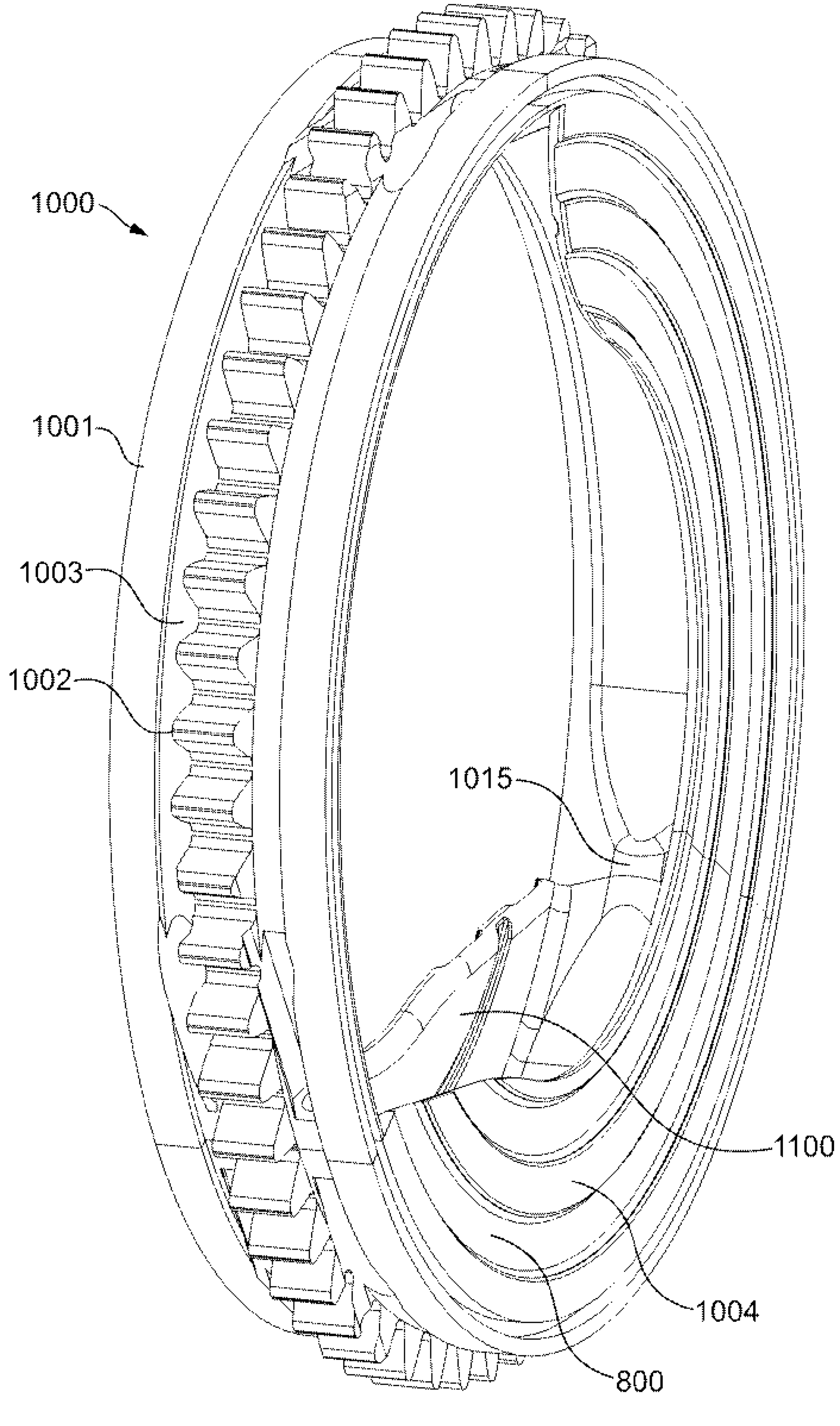
FIG. 9 is a third perspective view of a rotatable apparatus, in the form of a wheel, comprising a gate element for selectively blocking a money item routing.

FIGS. 7-10 show three further views of the rotatable apparatus 1000 discussed above. In these figures, the apparatus 1000 is illustrated in absence of the surrounding components of the money item handling system 100. The rotatable apparatus 1000 takes the form of the wheel 1001 mentioned above. The wheel 1001 may comprise drive elements for facilitating driven and controllable rotation of the wheel 1001 by the actuator 900. These drive elements may, for example, comprise a plurality of teeth 1002 set around the radially outwardly facing surface of the wheel 1001 on a circumferential wall region 1003. This is illustrated in FIG. 7. The teeth 1002 (or alternative drive elements) may alternatively be set in appropriate positions elsewhere on the wheel 1001. The teeth 1002 may be arranged to engage with corresponding teeth on the actuator 900 so as to allow the rotatable apparatus 1000 to be controllably rotated relative to the routing 700. In other implementations, controllable rotation of the wheel 1001 by the actuator 900 may be facilitated by alternative drive techniques and equipment. A first example of such an alternative is a friction-based system, in which a drivable surface of the wheel 1001 frictionally engages with a drive surface of the actuator 900 so that movement (e.g. rotation)

of the drive surface of the actuator 900 produces corresponding rotation of the wheel 1001 due to friction between the respective surfaces. A second example of such an alternative system is belt-drive system, in which a belt engages with both the wheel 1001 and the actuator 900. In this type of system, rotation of the belt by the actuator 900 produces corresponding rotation of the wheel 1001.

In addition to the circumferential wall region 1003, the wheel 1001 may further comprise a first side wall region 1004 on a first side of the wheel 1001 and a second side wall region 1005 on a second side of the wheel 1001. The first and second side wall regions 1004, 1005 shown in FIGS. 7-10 are perpendicular (or near perpendicular) to the circumferential wall region 1003 and, in this example, extend radially inwardly in the direction of the centre of the wheel 1001. However, it is not necessary for the side wall regions 1004, 1005 to form a right-angle with the circumferential wall region 1003. For example, instead of the perpendicular wall regions 1003-1005 illustrated in FIGS. 7-10, the wall regions 1003-1005 may instead, together, form a concave wall in which the side wall regions 1004, 1005 are joined to the circumferential wall region 1003 by a curve.

The distance to which the side wall regions 1004, 1005 extend radially (or, in other words, the height of the wall regions 1004, 1005) varies around the circumference of the wheel 1001 and, as discussed further below, there may be areas of the circumference of the wheel 1001 in which the side wall regions 1004, 1005 are not present.

The presence/absence (or variation in the height) of the side wall regions 1004, 1005 is one manner in which the gate elements 800, 1100 at the first and second routings may be implemented. Movement of the wheel 1001 relative to the first and second routings causes sections of the side wall regions 1004, 1005 to become aligned/misaligned with the first and second routings as the wheel 1001 turns in the storage region 400, thereby closing/opening the routings as shown in FIGS. 4 to 6. This is discussed more below, using the first side wall region 1004 and first gate element 800 as an example.

Referring to FIGS. 7-10, a central section of the first side wall region 1004 is adjacent to first and second end sections of the side wall region 1004, which are respectively located on either side of the central section. In the central section, the height of the side wall region 1004 may be approximately constant. By contrast, in the first and second end sections, the height of the side wall region 1004 may progressively reduce from the height of the central section to a point where the side wall region 1004 is no longer present. Together, the central and first and/or second end sections of the first side wall region 1004 form the first gate element 800 discussed above. In the central section, the height of the side wall region 1004 and the extent to which the side wall region 1004 extends around of the circumference of the wheel 1001 is sufficient to entirely block the outlet aperture 701 of the first routing 700 when the central section of the side wall region 1004 is fully aligned with the outlet aperture 701. This is the first flow control position of the gate element 800 shown, for example, in FIG. 4.

On the other hand, when the central section of the first side wall region 1004 is not fully aligned with the outlet aperture 701 of the first routing 700, the outlet aperture 701 is not completely blocked. For example, in the first and second end sections of the side wall region 1004, the reducing height of the side wall region 1004 means that, when the first or second end sections of the side wall region 1004 are aligned with the outlet aperture 701, the outlet aperture 701 is only partially blocked. This is an example of the second flow control position of the gate element 800 shown in FIG. 5. It will be appreciated that there is not one single second flow control position but instead a spectrum of second flow control positions produced by movement of the end of the gate element 800 across the outlet aperture 701 of the first routing 700.

In the remaining section of the circumference of the wheel 1001, i.e. between the first and second end sections of the side wall region 1004 but opposite the central section, the side wall region 1004 is not present or has a height which is too low to prevent money items from sliding over it through the outlet aperture 701. Therefore, when this remaining section of the wheel 1001 is fully aligned with the outlet aperture 701 (and the central and end sections of the side wall region 1004 are fully misaligned with outlet aperture 701), the outlet aperture 701 is not blocked at all. This is the third flow control position of the gate element 800 shown, for example, in FIG. 6.

As illustrated by FIGS. 7-10, the rotatable apparatus 1000 may also comprise the second gate element 1100 mentioned above. The second gate element 1100 is formed by the second side wall region 1005, on the opposite side of the wheel 1001 to the first gate element 800, and is moveable by rotation of the wheel 1001 to control movement of money items from the storage region 400 through the second routing to the collection zone of the second money item conveyor 300. As with the first side wall region 1004, a central section of the second side wall region 1005 has a height which, when aligned with an outlet aperture of the second routing, is sufficient to fully block the outlet aperture and prevent money items from passing through the second routing to the second conveyor 300. The second side wall region 1005 may also comprise first and second end sections, which as shown in FIGS. 7-10 may correspond to the first and second end sections of the first side wall region 1004 discussed above. There is also a remaining section of the circumference of the wheel 1001 in which the second side wall region 1005 is not present or has a height which is too low to prevent money items from sliding over it through the outlet aperture of the second routing. Together, the central and first and/or second sections of the second side wall region 1005 form the second gate element 1100. Movement of these sections of the second side wall region 1005 with respect to the outlet aperture of the second routing allow the plurality of flow control positions described above with respect to the first gate element 800 to be selectively adopted also for the second gate element 1100.

The angled nature of the end sections of the gate elements 800, 1100, i.e. at the ends of the first and second side wall regions 1004, 1005, helps to prevent money items from becoming trapped in the outlet apertures of the first and second routings as the first and second gate elements 800, 1100 move from open to closed positions. In particular, the angle produced by the reducing height of the gate elements 800, 1100 in the end sections of the first and second side wall regions 1004, 1005 helps to lift money items out of the outlet apertures as the gate elements close.

It should be noted that the first gate element 800 and the second gate element 1100 are not necessarily aligned on the circumference of the wheel 1001. An example of this is shown in FIGS. 7-10. These figures illustrate non-alignment between not only the first and second gate elements 800, 1100 but also the open (remaining) sections discussed above on each side of the wheel 1001. This misalignment between the various sections of the wheel 1001 means a corresponding degree of misalignment between the flow control positions for the first and second routings. When the first routing is fully open, for example, the second routing may be fully closed and vice versa. Rotation of the wheel 1001 may, in practice, allow each of the following configurations to be selectively adopted: 1) first and second routings both fully open—by simultaneous non-alignment of the first and second gate elements 800, 1100 with the outlets of the first and second routings; 2) first and second routings both fully closed—by simultaneous full alignment of the first and second gate elements 800, 1100 with the outlets of the first and second routings; 3) first routing fully open and second routing fully closed—by non-alignment of the first gate element 800 with the outlet of the first routing and full alignment of the second gate element 1100 with the outlet of the second routing; 4) second routing fully open and first routing fully closed—by full alignment of the first gate element 800 with the outlet of the first routing and non-alignment of the second gate element 1100 with the outlet of the second routing; 5) first routing partially open and second routing fully closed—by partial alignment of the first gate element 800 with the outlet of the first routing and full alignment of the second gate element 1100 with the outlet of the second routing; 6) second routing partially open and first routing fully closed—by partial alignment of the second gate element 1100 with the outlet of the second routing and full alignment of the first gate element 800 with the outlet of the first routing.

Referring again to FIGS. 7-10, the internal face of the circumferential wall region 1003 of the rotatable apparatus 1000 may comprise one or more stirring elements 1015. A stirring element 1015 may be located, for example, adjacent to the end section of each of the first and second side wall regions 1004, 1005. The stirring elements 1015 comprise raised sections of the internal face and protrude towards the centre of the wheel 1001. The stirring elements 1015 serve to agitate money items in the central area of the wheel 1001, between the first and second side wall regions 1004, 1005, when the wheel 1001 turns. This agitation can help to move money items into proximity with the first and second routings so that they may be output from the storage region 400. Each stirring element may be relatively low-profile, as illustrated in FIGS. 7-10, so as encourage money items to move through the first and second routings at an appropriate flow rate.

As shown in FIG. 7, the wheel 1001 may comprise one or more circumferential notches and/or ridges 1400 which integrate with one or more corresponding ridges and/or notches on the internal face of the storage container 401. This integration prevents money items from becoming trapped between the wheel 1001 and the internal face of the container 401.

Upon start-up of the system 100, for example following bulk-loading of money items into the storage region 400, the rotatable apparatus 1000 may be rotated to a position in which one or both of the first and second routings are fully open for an extended period of time. During this time, the first and/or second conveyor tracks 201, 301 may be rotated continuously to collect money items from the collection zone(s) adjacent to the open routing(s). At the outlet zone(s) 209, all money items on the track(s) 201, 301 may be directed off the track(s) 201, 301 and back into the storage region 400. This process mixes money items inside the storage region 400 so as to improve the even distribution of different types and/or values of money items throughout the storage region 400. This mixing of money items can be especially helpful when a service person has bulk-loaded money items into the storage region 400 one denomination after another. The degree of layering of money items within the storage region 400 that can result from this bulk-loading process can be alleviated by the presence of the stirring elements 1015 of the rotatable apparatus 1000, which mix the money items and cause redistribution within the storage region 400.

As an alternative to the rotatable apparatus(es) described above, the first and/or second gate elements of the system 100 may be implemented in other manners (e.g. without the rotatable apparatus(es)). For example, either or both of the first and second gate elements may be implemented as a separate sliding door which is independently actuatable back and forth, across the respective first/second routing, to selectively adopt the different flow control positions discussed above (including configurations 1)-6)). Such sliding doors may be angled at their ends in the manner described above with respect to the first and second side wall regions 1004, 1005 so as to help prevent money items from becoming trapped in the outlet apertures of the first and second routings.

A further example of the flow control apparatus is described below with respect to FIGS. 11 to 21. Consistent with the discussion above, the flow control apparatus is actuatable to selectively start, stop and/or vary a flow of money items from the storage region 400 to the first conveyor 200 and/or the second conveyor 300. The flow control apparatus comprises a first gate element 2000 to selectively block and permit movement of money items from the first routing 700 to the first conveyor 200. In implementations where the second conveyor 300 is present, the flow control apparatus may also comprise a second gate element to selectively block or permit movement of money items from the second routing to the second conveyor 300. The functionality, structure and operation of the second gate element may be equivalent to that of the first gate element 2000.

Figure 11:
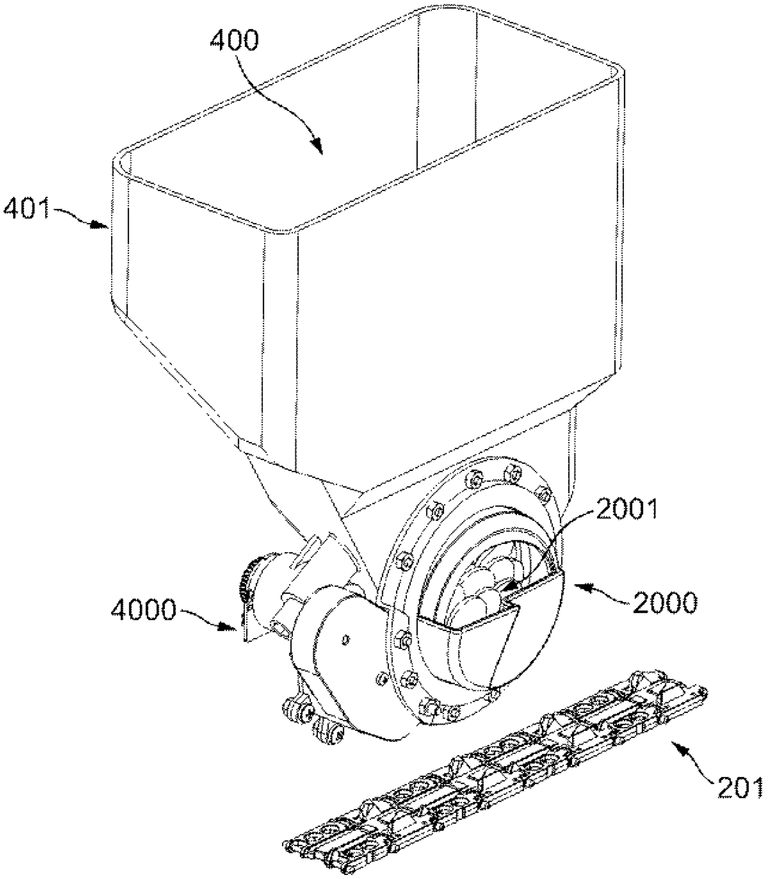
FIG. 11 is a perspective view of aspects of a money item handling system, including a flow control apparatus, an actuator for the flow control apparatus, a section of conveyor track and a money item storage container.

An example of the first gate element 2000 is illustrated in FIG. 11, alongside other aspects of the system 100 including the money item storage region 400 and the track 201 of the first conveyor 200. As with the examples already discussed above, the first gate element 2000 is selectively moveable relative to the first routing 700 to cause a transfer of money items from the money item storage region 400 to the first conveyor 200. Movement of the gate element 2000 relative to the first routing 700 is caused by one or more actuators coupled to the gate element 2000, such as one or more motor-driven actuator(s). The actuator(s) operate under the control of the computing apparatus 1200 of the system 100 to controllably and selectively actuate movement of the gate element 2000 to each of a plurality of possible positions of the gate element 2000 relative to the first routing 700. The plurality of positions for the gate element 2000 may be adopted to selectively transfer money items from the storage region 400 into the collection zone 207 of the first conveyor 200.

As shown in FIG. 11, the gate element 2000 comprises a money item accommodating region which is arranged to receive money items from the money item storage region 400 via the first routing 700. The money item accommodating region may take the form of a cup 2001 and may be positioned directly adjacent to the outlet aperture 701 of the first routing 700, at an exterior of the money item storage container 401, so that money items may move through the outlet aperture 701 into the accommodating region. This is discussed in more detail further below.

Figure 12:
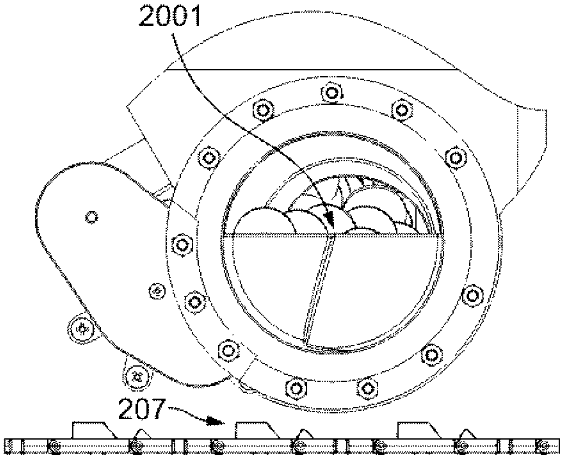
FIG. 12 is a front-on view of aspects of the flow control apparatus shown in FIG. 11, in which a gate element of the flow control apparatus is in a first orientation corresponding to a first flow control position and money items are retained inside a money item accommodating region of the gate element.
Figure 13:
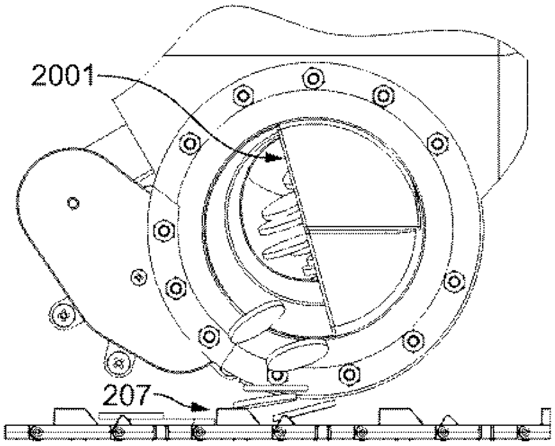
FIG. 13 is a front-on view of aspects of the flow control apparatus shown in FIG. 11, in which a gate element of the flow control apparatus is in a second orientation corresponding to a second flow control position and money items are tipped out of a money item accommodating region of the gate element.

In order to control movement of money items to the first conveyor 200, the money item accommodating region of the gate element 2000 is configured to selectively change orientation. An example of this is illustrated in FIGS. 12 and 13. FIG. 12 illustrates a first flow control position of the gate element 2000, in which the cup 2001 mentioned above has a substantially upright orientation. FIG. 13 illustrates a second flow control position of the gate element 2000, in which the cup 2001 has a non-upright orientation. As can be seen, in the first flow control position, a plurality of money items are accommodated and retained within the cup 2001 by side walls of the cup 2001. As such, in the first flow control position, the gate element 2000 prevents money items inside the cup 2001 from moving into the collection zone 207 of the first conveyor 200. In the second flow control position, the non-upright orientation of the cup 2001 causes money items to fall out of the open top of the cup 2001, under gravity, into the collection zone 207 of the conveyor 200. This movement of money items from the cup 2001 to the collection zone 207 of the conveyor 200 may be encouraged by geometric aspects of the cup 2001, as explained in more detail further below.

Therefore, actuation of the gate element 2000 between the first flow control position and the second flow control position causes money items inside the cup 2001 to be tipped out of the cup 2001 and onto the conveyor 207. As will be explained in more detail below, each time the gate element 2000 is moved between the first and second flow control positions, the volume of money items which are transferred to the collection zone 207 of the conveyor 200 may be approximately the same. In other words, each time the cup 2001 is tipped under the control of the computing apparatus 1200, approximately the same volume of money items is deposited into the collection zone 207 of the conveyor 200. The number of money items which transfer from the cup 2001 to the collection zone 207 of the conveyor 200 may be related to a number of factors, such as the size and type of the money items, the capacity of the cup 2001, the degree to which money items flow into the cup 2001 in the first flow control position, and the frequency with which the gate element 2000 moves from the first control position to the second control position and back again.

In FIGS. 11-13, the gate element 2000 is part of a rotatable apparatus 3000 located at the money item outlet aperture 701 of the first routing 700. The rotatable apparatus 3000 has a substantially upstanding orientation, with its principal plane being parallel to the region of the wall of the money item storage container 401 in which the outlet aperture 701 is located. This can be seen in the exploded view of the flow control apparatus in FIG. 14, which also shows elements of the actuator 4000 of the flow control apparatus. The rotatable apparatus 3000 can be rotated independently of the container 401 of the storage region 400 so as to adjust the position of the gate element 2000 relative to the first routing 700 and outlet aperture 701.

Figure 14:
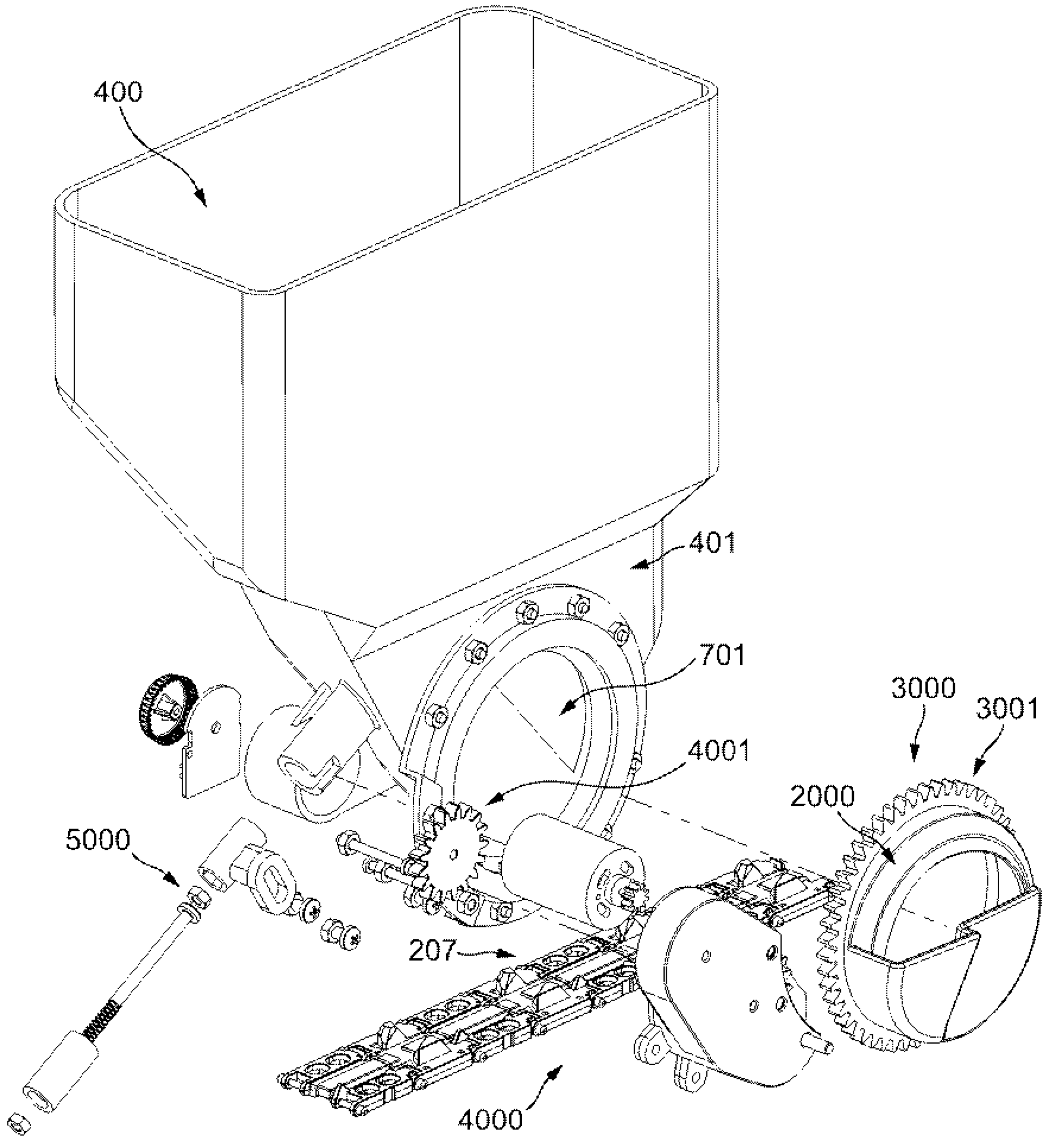
FIG. 14 is an exploded view of aspects of a money item handling system, including a flow control apparatus, an actuator for the flow control apparatus, a section of conveyor track and a money item storage container.

As shown in FIG. 14, the rotatable apparatus 3000 may comprise drive elements for facilitating driven and controllable rotation of the rotatable apparatus 3000 by the actuator 4000. These drive elements may, for example, comprise a plurality of teeth 3001 set around the radially outwardly facing surface of a substantially circular perimeter of the apparatus 3000. The teeth 3001 (or alternative drive elements) may alternatively be set in appropriate positions elsewhere on the rotatable apparatus 3000. The teeth 3001 may be arranged to engage with corresponding teeth 4001 on the actuator 4000 so as to allow the rotatable apparatus 3000 to be controllably rotated relative to the routing 700. In other implementations, controllable rotation of the rotatable apparatus 3000 by the actuator 4000 may be facilitated by alternative drive techniques and equipment, such as those mentioned above with respect to the wheel 1001. As shown in FIG. 14, the floor of the money item storage container 401 may slope downwards towards the money item outlet aperture 701 so as to encourage money items in the storage region 400 to move towards the outlet aperture 701 under gravity.

FIG. 14 also illustrates an optional money item disturbance apparatus 5000, which is configured to disturb and agitate money items inside the storage region 400. The example of the disturbance apparatus 5000 illustrated in FIG. 14 is configured, when actuated, to reciprocate back and forth inside the money item storage region 400 in order to disturb money items therein and break any 'bridging', i.e. blockages, formed by groups of closely arranged money items inside the storage region 400. In doing so, the disturbance apparatus 5000 may be actuated to improve the flow of money items from the storage region 400 into the accommodating region 2001 of the gate element 2000. Actuation of the disturbance apparatus 5000 may be linked to actuation of the gate element 2000, so that money items inside the storage region are agitated simultaneously with the movement of the gate element 2000 between flow control positions. This may be achieved by use of a common actuator 4000 for the gate element 2000 and the disturbance apparatus 5000, or may be achieved by use of separate actuators controlled individually. In the example of FIG. 14, it can be seen that the disturbance apparatus 5000 comprises a length of rod and is configured to agitate money items positioned close to, and slightly above, the top of the routing 700.

Figure 15:
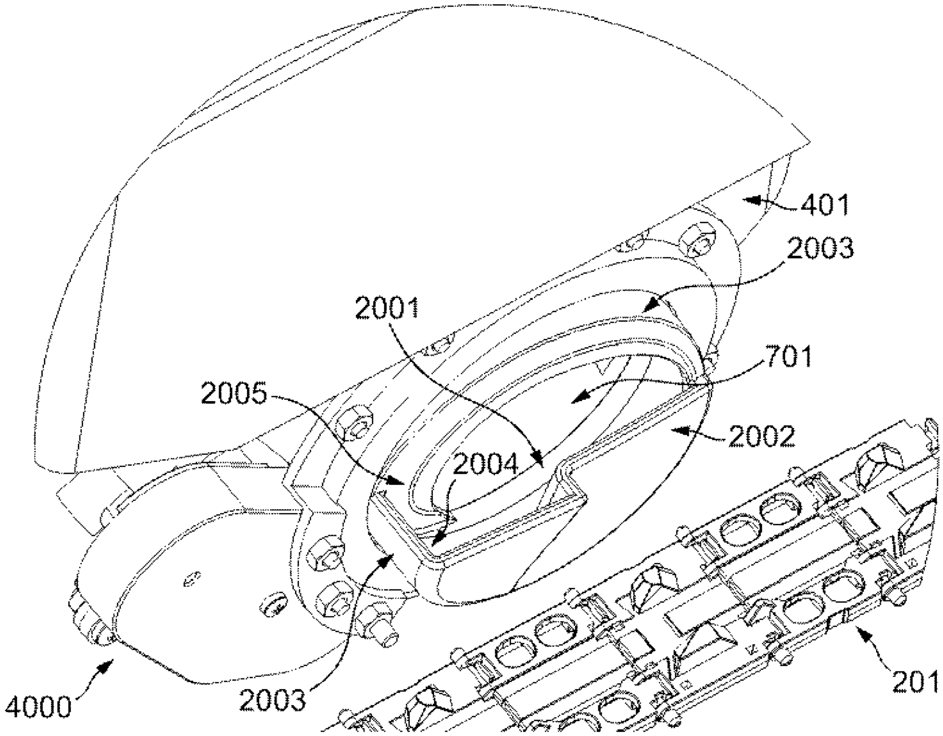
FIG. 15 is a perspective view of aspects of the flow control apparatus shown in FIG. 11, in which a gate element of the flow control apparatus is in a first orientation corresponding to a first flow control position.
Figure 16:
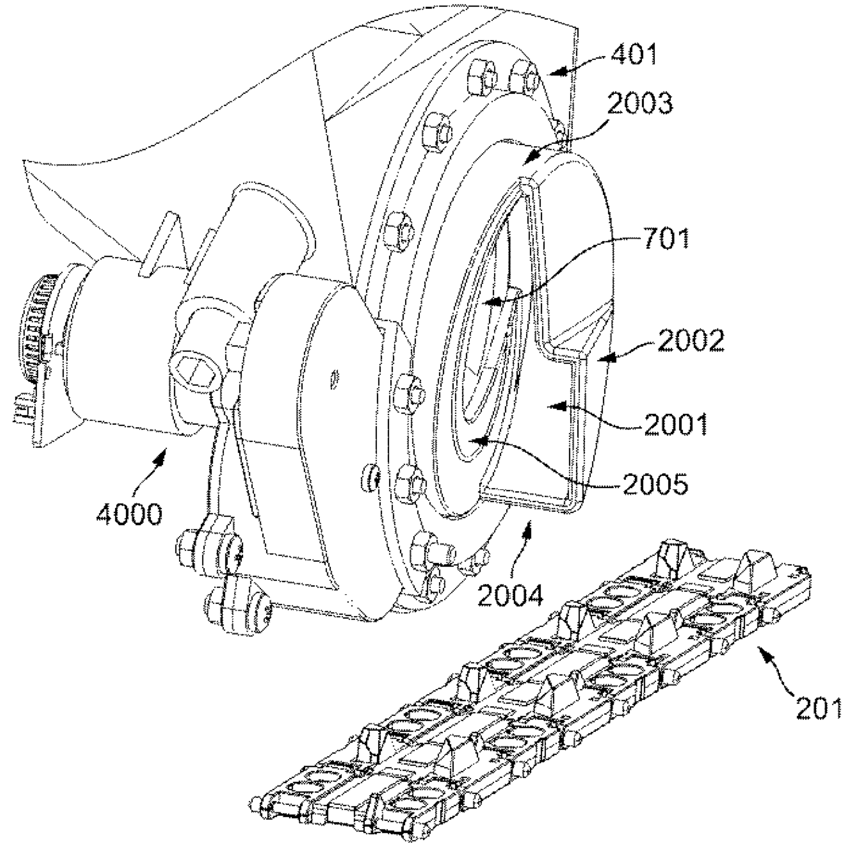
FIG. 16 is a perspective view of aspects of the flow control apparatus shown in FIG. 11, in which a gate element of the flow control apparatus is in a second orientation corresponding to a second flow control position.

As outlined above, the gate element 2000 is operable to selectively adopt first and second flow control positions. Examples of the gate element 2000 in these first and second flow control positions are further illustrated in FIGS. 15 and 16, respectively. Referring first to FIG. 15, it can be seen that the gate element 2000 comprises the money item accommodating region discussed above. The accommodating region is formed of a plurality of walls, including an outer money item retaining wall 2002 and a part circumferential wall 2003 which meets the outer retaining wall 2002 at an approximately perpendicular angle. The principal plane of the outer retaining wall 2002 may be approximately aligned with the principal place of the rotatable apparatus 3000 and may also be approximately aligned with the wall of the money item storage container 401, as illustrated in FIGS. 15 and 16. The part circumferential wall 2003 extends outwardly from the wall of the money item storage container 401 so as to bridge a gap between the outlet aperture 701 and the outer retaining wall 2002 of the gate element 2000. In this manner, the circumferential wall 2003 forms the base and two curved sides of the cup 2001 referred to above. A further side of the cup 2001 is formed by the outer retaining wall 2002. The top of the cup 2001 is open. On at least one side of the cup 2001, the part circumferential wall 2003 may end at a point which is flush with the top of the outer retaining wall 2002, thereby forming an outlet region 2004 of the cup 2001. This is discussed in more detail further below.

In the first flow control position of the gate element 2000, shown in FIGS. 12 and 15, the orientation of the cup 2001 is such that its base, formed by the part circumferential wall 2003, is located directly adjacent to the lowest part of the outlet aperture 701. As such, money items which move though the aperture 701 from the storage region 400 are supported inside the cup 2001 by the circumferential and outer retaining walls 2003, 2002 of the gate element 2000.

The gate element 2000 also comprises an inner retaining wall 2005. In contrast to the outer retaining wall 2002, the principal function of which is to retain money items inside the cup 2001 in the first flow control position of the gate element 2000, the inner retaining wall 2005 is configured to prevent money items from moving from the storage region 400 into the cup 2001. In particular, the inner retaining wall 2005 is configured to prevent money items from moving into the cup 2001 when the gate element 2000 is in the second flow control position. When the gate element 2000 is in the first flow control position, on the other hand, the inner retaining wall 2005 does not prevent money items from moving into the cup 2001. Instead, in the first flow control position, money items flow into the cup 2001 from the storage region 400.

This functionality is achieved by movement of the inner retaining wall 2005, relative to the outlet aperture 701 of the storage region 400, to selectively block and unblock the aperture 701 by alignment and non-alignment of the inner wall 2005 with the bottom of the outlet aperture 701. As illustrated in FIGS. 15 and 16, the inner retaining wall 2005 has a principal plane which is substantially aligned with that of the outer retaining wall 2002. However, a helical shape of the inner retaining wall 2005, which may help to improve the predictability with which money items move into the cup 2001 each time the gate element 2000 is actuated to the first flow control position, may mean that the planar alignment between the inner wall 2005 and outer wall 2002 is not exact. Unlike the outer retaining wall 2002, which is spaced apart from the outlet aperture 701 of the storage region 400 in order to create space for the accommodating region of the cup 2001, the inner retaining wall 2005 is located at the outlet aperture 701.

As can be seen from the figures, at the base of the cup 2001 the inner retaining wall 2005 is not present (or has minimal height). As such, in this portion of the cup 2001, there is no physical barrier between the outlet aperture 701 of the storage region 400 and the accommodating region of the cup 2001. In the first flow control position, when the cup 2001 is in an upright orientation, money items may therefore move freely through the bottom of the aperture 701 and into the cup 2001. However, in the outlet region 2004 of the cup 2001, the inner retaining wall 2005 is present and forms a physical barrier between the between the outlet aperture 701 and the accommodating region of the cup 2001. In the second flow control position, when the cup 2001 is in a non-upright, tilted orientation, this region of the inner retaining wall 2005 is aligned with the bottom of the outlet aperture 701 and thus prevents money items from flowing through the bottom of the aperture 701 and into the cup 2001.

The inner retaining wall 2005 is illustrated in the figures as extending radially inwardly in the direction of the centre of the gate element 2000. However, it is not necessary for either of the outer or inner retaining walls 2005, 2003 to form an exact right-angle with the part circumferential wall 2003. For example, the walls 2002, 2003, 2005 may instead, together, form a concave inner surface on which the inner and/or outer retaining walls 2005, 2002 join the part circumferential wall 2003.

As illustrated in FIGS. 15 and 16, the inner retaining wall 2005 may begin on the outlet region 2004 side of the cup 2001 and progressively increase in height, from a minimum, to its maximum height as it arcs along its length around the gate element 2000. As an example, the wall 2005 may reach its full height approximately at the point where the part circumferential wall 2003, against which it abuts, ends flush with the top of the outer retaining wall 2002. The inner retaining wall 2005 may then continue at its full height for a further part of its length, before progressively reducing in height back to its minimum at a point before it reaches the base of the cup 2001.

As mentioned above, the part circumferential wall 2003 may end at a point which is flush with the top of the outer retaining wall 2002, thereby forming an outlet region 2004 of the cup 2001. An example of the outlet region 2004 is well illustrated in FIG. 16. As can be seen from this figure, the part circumferential 2003 may progressively reduce in height as it approaches the outlet region 2004 from a first direction. On the other hand, as the part circumferential wall 2003 approaches the outlet region 2004 from the other direction, the wall 2003 may end abruptly at its maximum height. This forms a chute, from which money items may exit the cup 2001 in the second flow control position illustrated in FIG. 16.

The gate element 2000 is therefore configured, when in the first flow control position, to allow money items to flow into the cup 2001 from the money item storage region 400 but to prevent money items in the cup 2001 from reaching the collection zone 207 of the conveyor 200. In the second flow control position, the opposite is true. In the second position, the gate element is configured to transfer money items out of the cup 2001 into the collection zone 207 of the conveyor, but to prevent further money items from entering the cup 2001 from the storage region 400. In the first position, the cup 2001 is filled with money items whereas in the second position the cup 2001 is emptied of money items. If the gate element 2000 is repeatedly actuated between the first position and the second position, the cup 2001 may be repeatedly filled with batches of money items which are then emptied into the conveyor collection zone 207. As part of this process, the flow of money items both into and out of the cup 2001 is controlled by actuation of the gate element 2000 between different positions.

Figure 17:
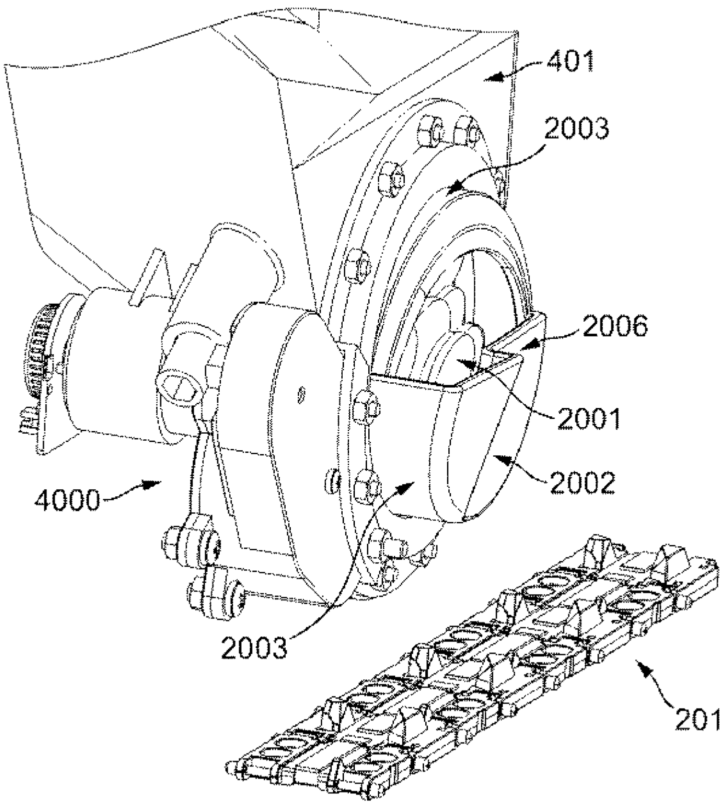
FIG. 17 is a further perspective view of aspects of the flow control apparatus shown in FIG. 11, in which a gate element of the flow control apparatus is in a first orientation corresponding to a first flow control position and money items are retained inside a money item accommodating region of the gate element.

The first flow control position of the gate element is further illustrated in FIG. 17, which shows a plurality of money items having moved through the unrestricted outlet aperture 701 into the cup 2001. The second flow control position is further illustrated in FIG. 18, which shows the money items in the cup 2001 being tipped into the collection zone 207 of the conveyor 200. In this position, it can be seen that the inner retaining wall 2005 at least partially blocks the outlet aperture 701 of the storage container 401 and prevents further money items from moving into the cup 2001 whilst it is in a tipped orientation. Indeed, the second flow control position illustrated in e.g. FIGS. 16 and 18 may stem the flow of money items into the cup 2001 not only by physically blocking part of the outlet aperture 701 but also by contributing to money items in the storage region 400 close to the aperture 701 interlocking and 'bridging' at the aperture 701—creating a temporary 'plug' of money items which helps to hold back money items deeper inside the storage region 400 when the gate element 2000 is in the second flow control position.

Whilst other money item hoppers are often designed to specifically avoid 'bridging' effects in masses of money items, such as coins, so as to prevent disruptions in the flow of money items through the hopper, the equipment described and illustrated here may be configured to specifically create the temporary 'bridging' effect described above in order to control the flow of money items to the cup 2001 when the gate element 2000 is in the second flow control position. Movement of the gate element 2000 back to the first flow control position, e.g. as illustrated in FIGS. 15 and 17, so as to retract the inner retaining wall 2005 from the bottom of the outlet aperture 701, is sufficient to break the temporary bridging effect.

As mentioned above, the inner retaining wall 2005 may have a helical shape. The helical shape of the inner retaining wall 2005 has the effect that, as the gate element 2000 moves from the first flow control position to the second flow control position discussed above and shown, respectively, in FIGS. 15 to 18, the inner retaining wall 2005 moves across the lower part of the outlet aperture 701 and, as it does so, opens out a volume of space behind it into which move money items in the storage region 400. The inner retaining wall 2005 thus simultaneously blocks the lower part of the outlet aperture 701 while increasing the volume of the storage space behind the wall's leading edge as the wall 2005 moves across the lower part of the aperture 701.

Correspondingly, as the gate element 2000 moves from the second flow control position to the first flow control position, the inner retaining wall 2005 may squeeze the money items inside the storage region 400 as it retracts across the lower part of the outlet aperture 701. In particular, the inner retaining wall 2005 may squeeze against the money items which moved into the volume of space opened out behind the inner retaining wall 2005 as it previously moved from the first flow control position to the second flow control position. This act of squeezing the money items inside the storage region 400 in the final moments before the retaining wall 2005 is fully withdrawn from the lower part of the outlet aperture 701 (FIG. 15) disrupts the money items in the storage region 400 and may cause those same money items to flow more freely, as part of a continuous avalanche motion which starts with the aforementioned disruption, into the accommodating cup 2001 as the gate element 2000 moves into the first flow control position. In this way, the helical form of the inner retaining wall 2005 may contribute to breaking the temporary bridging effect referred to above as the wall 2005 moves back to the first flow control position.

The helical shape of the inner retaining wall 2005 may be associated with the varying height of the part circumferential wall 2003, as best shown in FIGS. 15 and 16. In particular, the distance between any given section of the inner retaining wall 2005 and the fixed outlet aperture 701 may directly correspond with the height of the part circumferential wall 2003 at the given section of the inner retaining wall 2005.

The inner retaining wall 2005, and its effects outlined above, is one way in which the flow control apparatus may be configured to dispense an approximately equal volume of money items each time it is moved to the second flow control position. This consistent metering of money items onto the conveyor 200 may be advantageous at least because it may reduce the likelihood of money items building up and overloading the conveyor 200 in the collection region 207. Furthermore, it may allow for smoother running of the conveyor 200.

Figure 18:
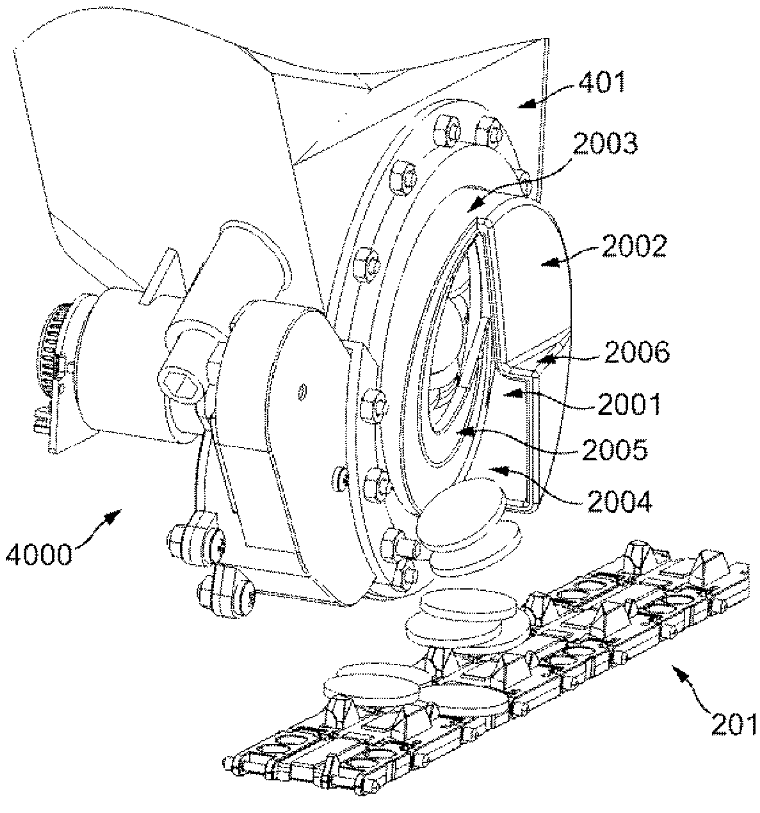
FIG. 18 is a further perspective view of aspects of the flow control apparatus shown in FIG. 11, in which a gate element of the flow control apparatus is in a second orientation corresponding to a second flow control position and money items are tipped out of a money item accommodating region of the gate element.

As best shown in FIGS. 16 to 18, the outer retaining wall 2002 of the gate element 2000 may be stepped. The step 2006 in the outer retaining wall 2002 opens out the cup 2001 in the outlet region 2004 and thereby may further improve the smoothness with which money items flow out of the cup 2001 when the gate element 2000 is in the second flow control position. The step 2006 can be seen as dividing the cup 2001 into two parts, such as two approximate halves, with the outlet part of the cup 2001, which includes the outlet region 2004 mentioned above, having a greater volume and width than the other part. This increase in width at the outlet region 2004 of the cup 2001 may encourage money items to flow out of the outlet region 2004 by providing more space for the money items and thereby reducing the degree to which money items on this side of the cup 2001 entangle with one another.

As has been explained above, the equipment described here and illustrated in the figures may be configured to specifically create a temporary 'bridging' effect when the gate element 2000 is in the second flow control position. The creation of this effect may be assisted by the narrower part of the cup 2001, on the opposite side of the cup 2001 to the outlet region 2004, by optimising the location at which the temporary bridging effect is created in the mass of money items. In particular, the narrower part of the cup 2001 may encourage the bridging effect to occur inside the storage region 400, close to the aperture 701, rather than inside the cup 2001 itself.

This optimisation of the temporary bridging effect is best described with reference to FIGS. 17 and 18. In the first flow control position of the gate element 2000 illustrated in FIG. 17, the outer retaining wall 2002 in the narrower part of the cup 2001 is relatively close to the outlet aperture 701 and the mass of money items inside the storage region 400. This means that, even in the first flow control position of the gate element 2000, there is relatively little space in the narrower part of the cup 2001 for money items to move into the cup 2001 from the storage region 400. As a consequence, the temporary bridging effect is encouraged by the narrower part of the cup 2001 to occur further back, inside the mass of money items in the storage region 400, rather than, for example, inside the cup 2001. This is advantageous because, as described above, the creation of a temporary bridging effect inside the storage region 400 may help to ensure that money items in the storage region 400 do not flow into the cup 2001 when the gate element 2000 is moved into the second flow control position illustrated in FIG. 18.

A further effect of the step 2006 in the outer retaining wall 2002 is to produce an abrupt transition (rather than a more gradual transition) between the narrower and wider parts of the cup 2001. This abrupt transition has the benefit of creating the wider part of the cup 2001 while at the same time ensuring that the temporary bridging effect is encouraged, by the narrower part of the cup 2001, to occur inside the storage region 400, as discussed above. As the gate element 2000 is actuated from the first flow control position to the second flow control position, passage of money items across the step 2006 from the narrower part of the cup 2001 causes the money items to move suddenly to a much less constrained part of the cup 2001 and, as such, flow more freely out of the cup 2001 and onto the conveyor below.

As mentioned above, a corresponding arrangement to that described above with respect to the first gate element 2000 and first routing 700 may also be provided for the second handling system 100 may also comprise a second gate element which is selectively moveable relative to the second routing to control and/or vary the rate of flow of money items from the money item storage region 400 to the second conveyor 300. The outlet aperture of the second routing may correspond in position, shape and size to the outlet aperture 701 of the first routing 700, e.g. in the second sidewall **401*b* referred to above. Alternatively, the outlet aperture of the second routing may have a different shape and/or size to the outlet aperture 701 of the first routing 700**.

Figure 19:
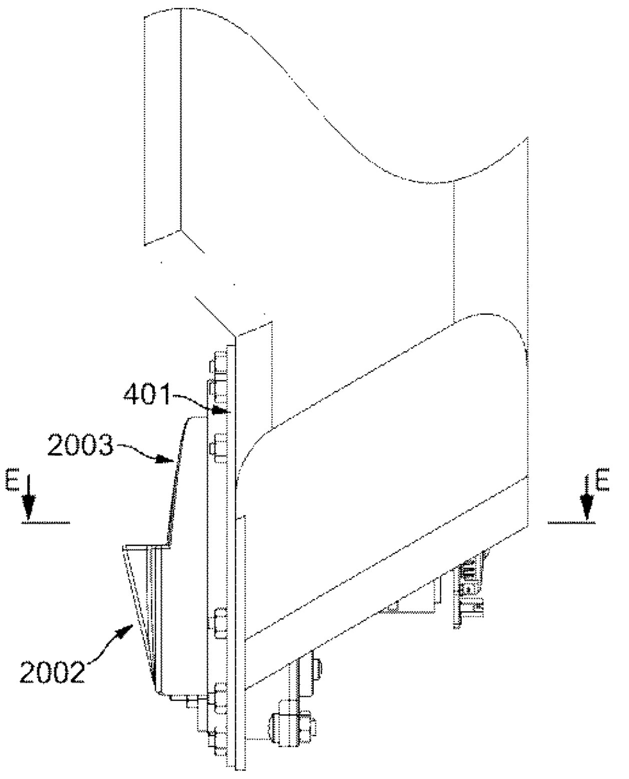
FIG. 19 is a side-on view of aspects of the flow control apparatus shown in FIG. 11, in which a gate element of the flow control apparatus is in a first orientation corresponding to a first flow control position.
Figure 20:
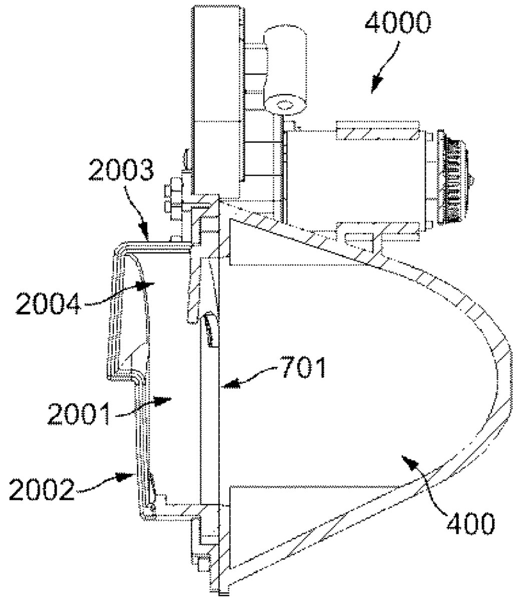
FIG. 20 is a cross-section view along the line E-E in FIG. 19.
Figure 21:
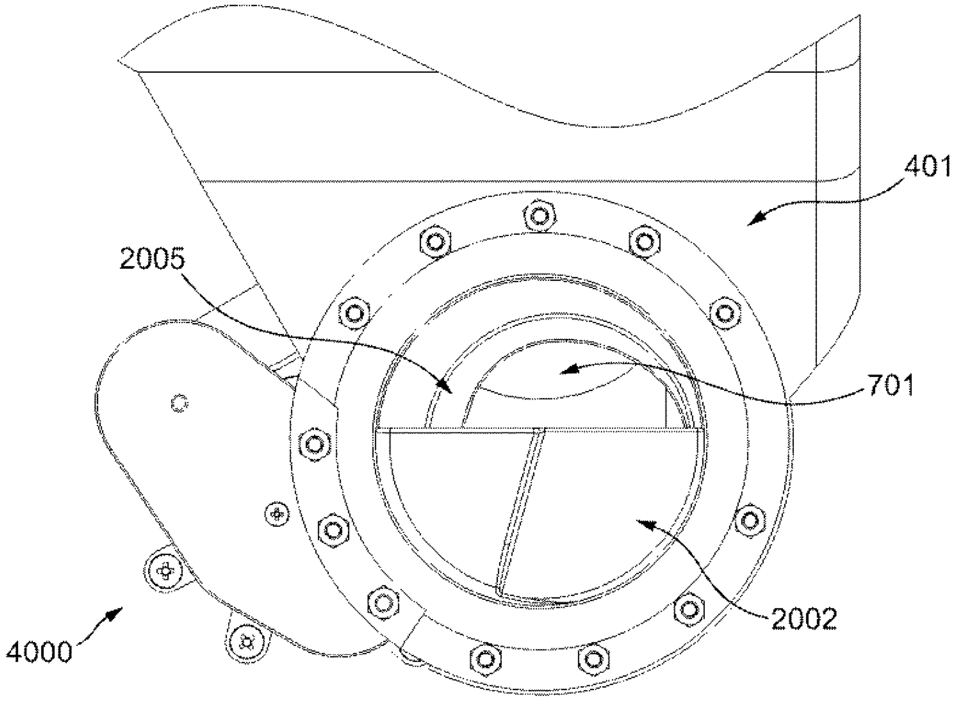
FIG. 21 is a front-on view of aspects of the flow control apparatus shown in FIG. 11, in which a gate element of the flow control apparatus is in a first orientation corresponding to a first flow control position.

Further illustrations of aspects of the flow control apparatus discussed above are present in FIGS. 19-21. FIG. 19 shows a side-on view of the flow control apparatus, its mounting to the money item storage region 400 and aspects of the actuator 4000. FIG. 20 shows a top-down cross sectional view of the flow control apparatus and actuator 4000, together with the money item storage region. The money item accommodating region of the cup 2001 of the gate element 2000 is clearly shown. FIG. 21 is similar to FIG. 12 and shows a front-on view of the gate element 2000. For clarity, money items are omitted. The internal retaining wall 2005 of the gate element 2000 is well illustrated in this figure.

The flow control apparatus discussed with respect to FIGS. 11 to 21 may be used to implement a start-up process similar to that previously described. For example, following a bulk-loading of money items into the storage region 400, the rotatable apparatus 3000 may be continuously rotated back and forth between the first and second flow control positions of the gate element 2000, at an appropriately predefined frequency, to successively deposit groups of money items onto the conveyor 200. During this period of time, the conveyor track 201 may be rotated continuously to collect money items from the collection zone 207. At the outlet zone(s) 209, all money items on the track 201 may be directed off the track 201 and back into the storage region 400. This process mixes money items inside the storage region 400 so as to improve the even distribution of different types and/or values of money items throughout the storage region 400. As an alternative to rotation back and forth between the first and second flow control positions, the gate element 2000 may be rotated continuously in the same direction so as to repeatedly adopt the first and second flow control positions. This type of continuous rotation may be used, in particular, in a purge mode of the system so as to empty all money items in the storage region 400 onto the conveyor, and subsequently out of the system, over a period of time.

Figure 22:
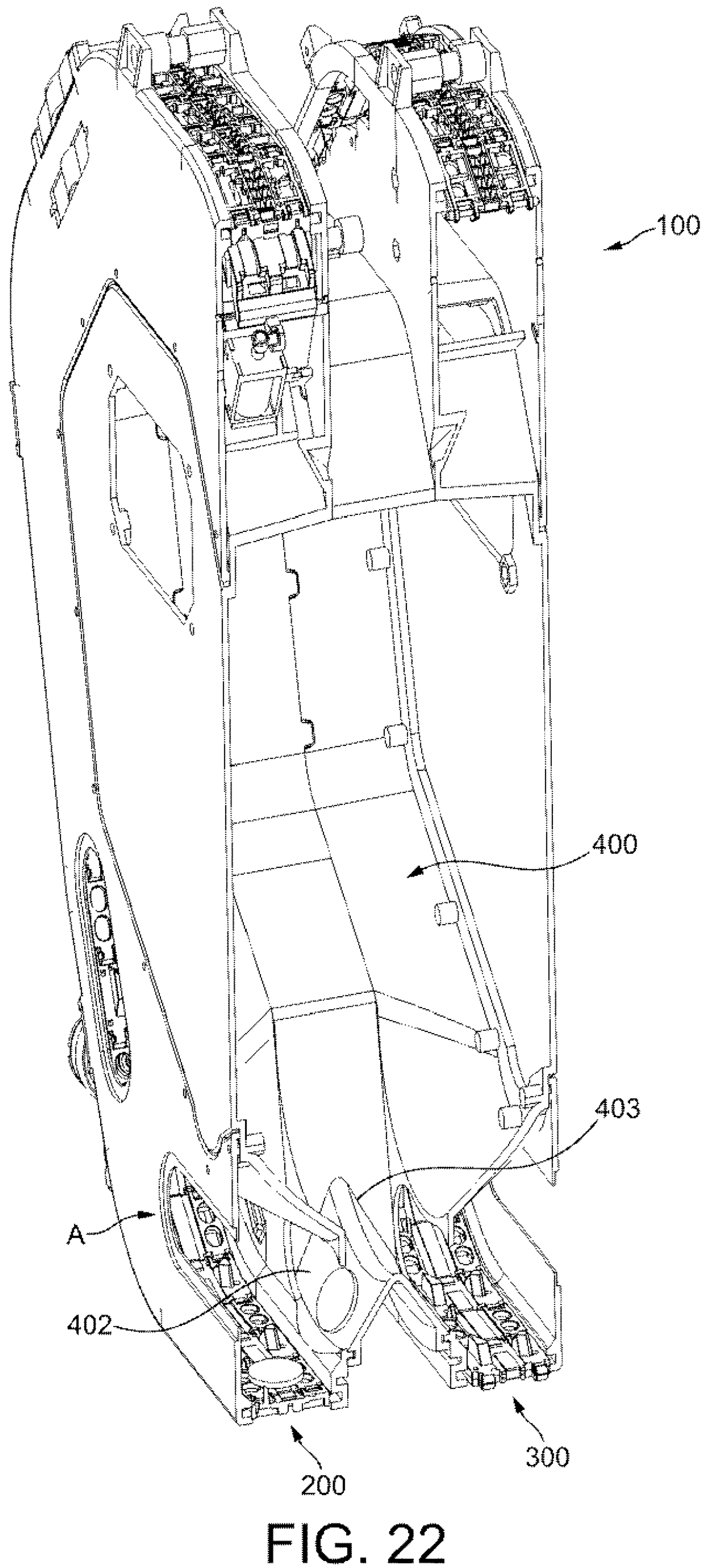
FIG. 22 is a perspective cut-away view of aspects of a money item handling system, including first and second money item conveyors, a money item storage region, and first and second routings to allow a flow of money items from the storage region to the first and second conveyors.

FIG. 22 illustrates an example of the money item handling system 100 without the rotatable apparatus 1000. The first and second routings to the first and second money item conveyors 200, 300, respectively, comprise the first and second outlet apertures described above with respect to the earlier figures. The base of the money item storage container 401 comprises first and/or second guide surfaces 402, 403 which, respectively, assist the passage of money items from the money item storage container 401 to the collection zones of the first and second conveyors 200, 300. In particular, the first guide surface 402 extends downwards at an angle from a central region of the base of the money item storage container 401 towards the outlet aperture 701 in the first side wall 401*a* of the container 401. Money items on the first guide surface 402 naturally slide down the first guide surface 402, under gravity, towards the outlet aperture 701 of the first routing 700 and thereafter into the collection zone 207 of the first conveyor 200. FIG. 22 includes a cut-out region A, for the purposes of illustration only, to help show this.

Correspondingly, the second guide surface 403 extends downwards at an angle from the central region of the base of the money item storage container 401 towards the outlet aperture in the second side wall 401*b* of the container 401. Money items on the second guide surface 403 naturally slide down the second guide surface 403, under gravity, towards the outlet aperture of the second routing and thereafter into the collection zone of the second conveyor 300. The angles of the first and second guide surfaces 402, 403 may be opposite (or substantially opposite) to one another. As illustrated in FIG. 22, the first and second guide surfaces 402, 403 may meet in the central region of the storage container's base and, in doing so, may form a ridge along the central region of the container 401. This ridge encourages money items at the base of the container 401 to fall away towards one or the other of the first and second routings, depending on their position relative to the ridge.

As an alternative to forming part of the base of the storage container 401 shown in FIG. 22, the first and second guide surfaces 402, 403 may form part of the central region of the wheel 1001 on the internal face of the circumferential wall 1003 discussed above. In this implementation, the guide surfaces 402, 403 encourage money items in the central region of the wheel 1001 to slide out of the plane of the wheel 1001 and through the outlet apertures of the first and/or second routings when permitted by alignment of the first and/or second gate elements 800, 1100 with the outlet apertures of the first and/or second routings.

The money item handling system 100 may comprise a money item supply apparatus 1500 which is separate to the first and second conveyors 200, 300 discussed above. The separate money item supply apparatus 1500 is configured to retain a plurality of money items, such as coins, in a manner which permits the apparatus 1500 to very rapidly dispense the money items to another region of system 100. The money item supply apparatus 1500 may be configured, for example, to dispense money items to a payout cup or other money item collection region at the exterior of the system housing 500.

The supply apparatus 1500 may be equipped to store individual denominations of money items in a manner which makes the individual denominations rapidly dispensable, without any hunting operation, in response to demand. In particular, the supply apparatus 1500 may be arranged to store a plurality of different denominations of money items, simultaneously, in a manner which makes each of the different denominations selectively dispensable, separately from other denominations present in the supply apparatus 1500.

The money item supply apparatus 1500 is located inside the housing 500 of the system 100. The specific location of the supply apparatus 1500 within the housing 500 may be chosen so as to be particularly efficient in terms of its use of space within the housing 500, thereby contributing towards the housing 500 and system 100 as a whole being relatively small in size. As mentioned above, a small overall system size may be advantageous—for example when packaging the system 100 in a small space envelope inside a larger overall machine.

The money item supply apparatus 1500 may receive money items from either of the first and second money item conveyors 200, 300 described above. In particular, for either or both of the conveyors 200, 300, money items which have been conveyed from the collection zone 207 and denominated in the sensing zone 208 may be selectively directed off the track 201, 301, in the outlet zone 209 (e.g. via outlet gate 209*b*), and into the money item supply apparatus 1500. In the money item supply apparatus 1500, money items received from the conveyor track(s) 201, 301 are stored in one of a plurality of single-denomination storage regions 1502 so as to make individual denominations of money items rapidly dispensable, from the respective storage regions 1502, in response to demand.

The supply apparatus 1500 may comprise at least one storage region 1502 for each denomination of money item used in the system 100. For example, money items of a first denomination may be automatically sorted into, and stored in, a first storage region 1502*a* of the supply apparatus 1500, whilst money items of second to fourth denominations may be correspondingly sorted into, and stored in, second to fourth storage regions 1502*b-d* of the supply apparatus 1500. An alternative implementation is for each individual money item to be sorted into, and stored in, an individual money item storage region 1502. For example, the money item supply apparatus 1500 may comprise a plurality of slots or other compartments in which individual money items such as individual coins are accommodated on a one money item per compartment basis.

In response to a demand for particular denominations of the money item, for example as part of payout operation, the supply apparatus 1500 can be instructed by the computing apparatus 1200 of the system 100 to immediately eject or otherwise release the particular denominations of money item that are required to make up the amount of the payout. In this way, the supply apparatus 1500 contributes to ensuring that there is no delay in paying-out money items, as required, in response to a demand. The supply apparatus 1500 may be considered as a pre-discriminated buffer zone between the multi-denomination storage region 400, in which different denominations of money items may be mixed in a chamber, and the payout cup or other money item collection region at the exterior of the system housing 500.

The supply of money items from the conveyor(s) 200, 300 to the money item supply apparatus 1500, via the outlet zone(s) 209, may be managed under the control of the computing apparatus 1200 of the system 100. The computing apparatus 1200 may, for example, selectively open and close one or more outlet gates 209*b* of the conveyor(s) 200, 300 so as to route particular denominated money items from the track(s) 201, 301 to the money item supply apparatus 1500 whilst not doing so for others of the denominated money items on the track(s) 201, 301. In selecting which money items to route to the supply apparatus 1500 from the conveyor(s) 200, 300, the computing apparatus 1200 may seek to ensure that the plurality of money item storage regions 1502 of the supply apparatus 1500 are filled with appropriate money items. For example, if the supply apparatus 1500 has recently been used to dispense money items of particular denomination(s) to a payout/collection region of the system 100, the computing apparatus 1200 may route replacement money items, of the same denomination(s), into the supply apparatus 1500 upon such denominations of money item being denominated in the sensing region(s) 208 of the conveyor track(s) 201, 301.

Figure 23:
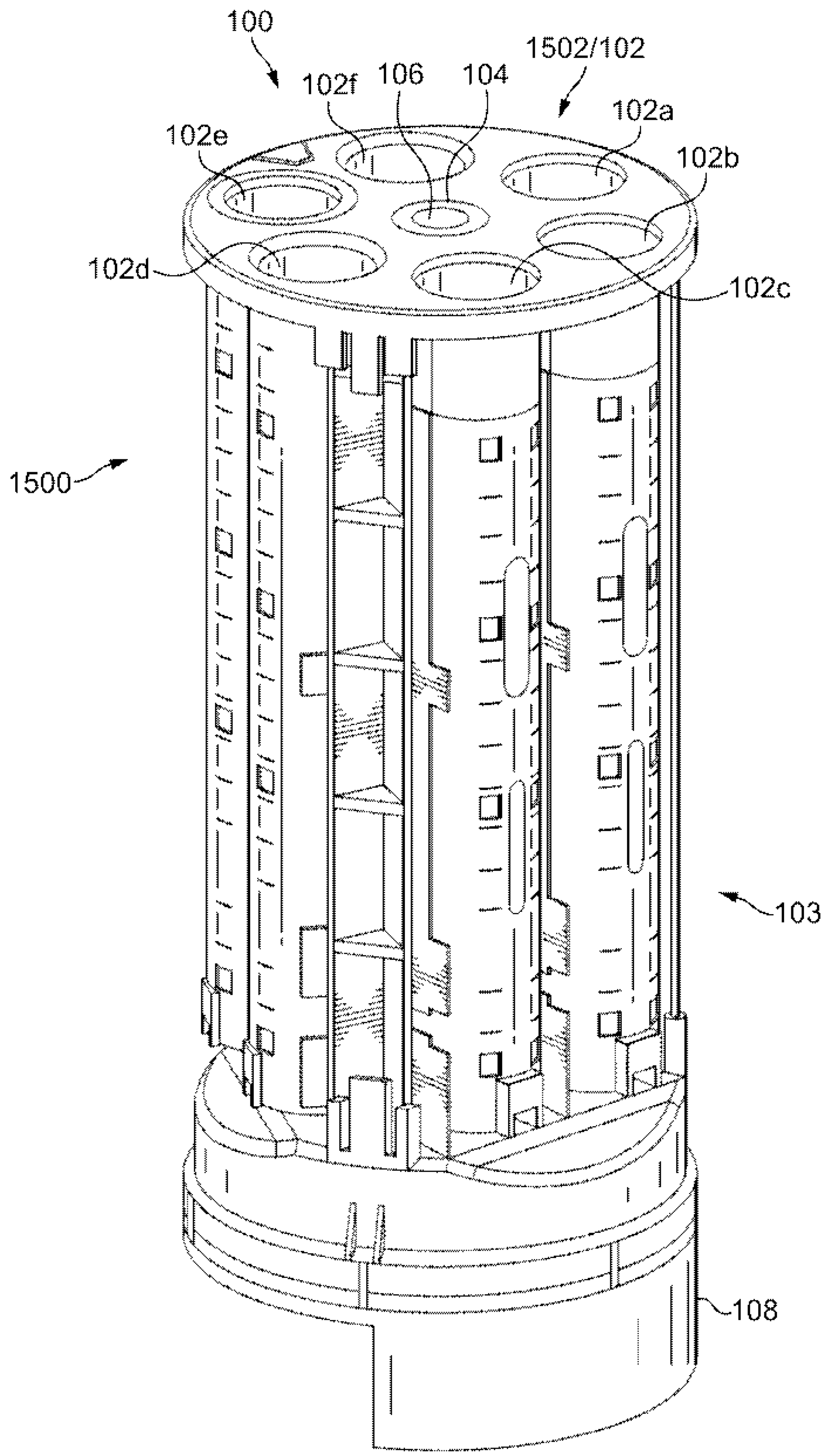
FIGS. 23-33 illustrate aspects of a money item supply apparatus, as first published with International patent application nO. PCT/US2018/055282. The content of PCT/US2018/055282 and that of International patent application nO. PCT/US2017/048062 is fully incorporated into this application by reference.

An example of the money item supply apparatus 1500 is illustrated in FIG. 23. The supply apparatus 1500 includes a plurality of separate money item storage regions 1502, as outlined above. In the illustrated example, the money item storage regions 1502 are part of a money item canister 101, such as a coin canister, in which each money item storage region 1502 takes the form of a tube 102. In particular, the money item canister 101 includes a plurality of tubes 102 for storing money items and a money item releaser, e.g. an ejector 202, which is operable to eject or otherwise release one or more money items from the tubes 102. The canister 101 may, for example, include an element which is operable to rotate and engage the money item ejector 202 to eject the money items from the individual tubes 102 when the tubes 102 are moved into position with the element.

A more detailed explanation of the money item canister 101 is set out below. It should be appreciated, however, that the money item canister 101 is explained here only as an example implementation of the money item supply apparatus 1500. The functionality of the money item canister 101 described below applies generally to other possible implementations of the money item supply apparatus 1500, such as those in which individual money items are sorted into, and stored in, individual money item storage regions 1502 on a one-to-one basis.

Referring to FIG. 23, the coin canister 101 has a cylindrical body 103 and a plurality of tubes 102 positioned around its perimeter. The coin canister 101 may, for example, include six tubes including a first tube 102*a*, a second tube 102*b*, a third tube 102*c*, a fourth tube 102*d*, a fifth tube 102*e*, and a sixth tube 102*f*. In this example, each of the tubes 102 is configured to hold or retain one or more money items, such as coins, in a stacked orientation. As outlined above, the coin canister 101 may hold or retain multiple different denominations of money item for dispensing. In this respect, each of the tubes 102 may have a diameter according to a type or denomination of money item to be held or retained within the tube 102. The money item canister 101 may also include a hollowed out or bored center 104 to allow the money item canister 101 to be placed onto a rotatable shaft 106. This allows the coin canister 101 to be rotated over and with respect to a base or a bottom 108 by a motor assembly or another actuator. This motor assembly (not shown) may be installed below and to the bottom 108 of the money item canister 101 and may be of a small form factor. The money item canister 101 may have a canister base 107 to support money items such as coins retained in each of tubes 102.

For example, the cylindrical body 103 of the money item canister 101 may rotate with the rotatable shaft 106 about the bored center 104 in a clockwise or anticlockwise direction. As the cylindrical body 103 rotates, a position of each tube 102 of the plurality of tubes 102 changes with respect to the static bottom 108 of the canister 101. Thus, a tube 102 may be moved into position to allow money items to be dispensed from the tube 102. For example, a rotation of the cylindrical body 103 of the canister 101 may move a tube 102 into position with a hopping disc 318 and/or out of position with the hopping disc 318.

Figure 24:
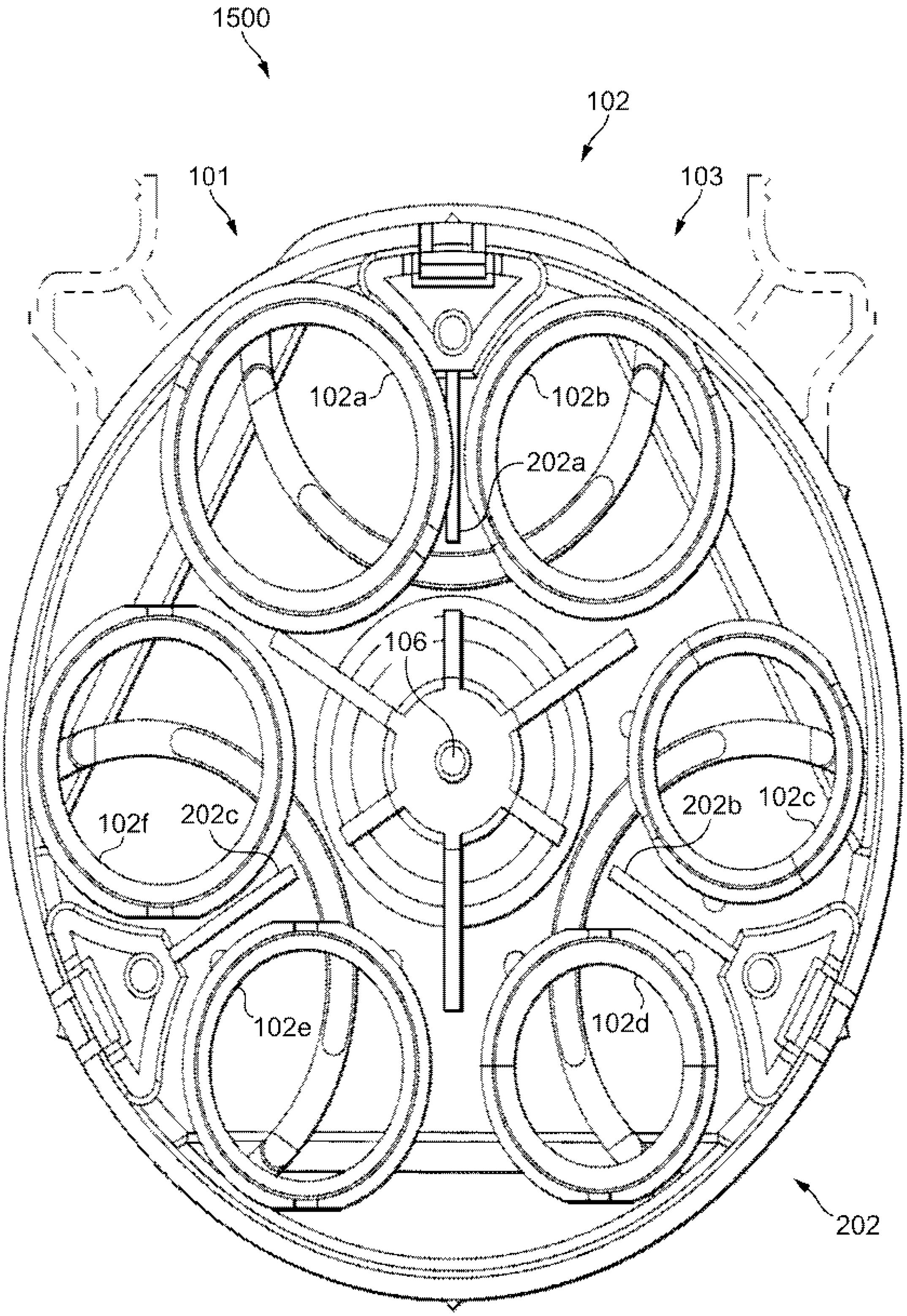

FIG. 24 illustrates a top view of the canister 101 disposed on the motor assembly. The canister 101 is centered on the rotatable shaft 106 which, when the motor assembly is operating, turns the cylindrical body 103 of the canister 101 to change the positions of the tubes 102.

The canister 101 includes one or more money item releasers, in the form of ejectors 202, disposed underneath the tubes 102. The ejectors 202 selectively release money items from the canister 101 by rotating and pushing a bottom money item in a tube 102 out of the tube 102 and out of the canister 101. In certain embodiments, a single tube 102 may be paired with an ejector 202 such that the single tube 102 rotates with and is disposed over the ejector 202. For example, an ejector 202 may be able to eject a money item from only a single tube 102 associated with the ejector 202 by rotating and pushing a bottom money item out of the tube 102 when the single tube is positioned above a payout position (e.g., positioned with a hopping disc 318). In certain embodiments, the ejectors 202 may have paths 207 to rotate in the canister base 107. The paths 207 may be created by cavities in the canister base 107. For example, the canister base 107 may have at least two sections, such as a first section 107*a* and a second section 107*b*. The first section 107*a* may be a horizontal section that supports money items retained in each of the tubes 102. The second section 107*b* may be an angled section that provides a path for ejected money items to move from the tubes 102 for payout.

The tubes 102 may be paired such that two tubes 102 are disposed over and rotate with an associated ejector 202 that is able to eject from either one of the two associated tubes 102 depending on which of the two associated tubes 102 is above a payout position. For example, as illustrated in FIG. 24, the first tube 102*a* and the second tube 102*b* are paired over a first ejector 202*a*, the third tube 102*c* and the fourth tube 102*d* are paired over a second ejector 202*b*, and the fifth tube 102*e* and the sixth tube 102*f* are paired over a third ejector 202*c*. The cylindrical body 103 of the canister 101 may rotate between three positions in order to position the tubes 102 for money item ejection. The fourth tube 102*d* and the fifth tube 102*e*, when positioned as shown in FIG. 24, may be oriented over a chute for receiving money items paid out from the fourth tube 102*d* and the fifth tube 102*e*. As the canister 101 rotates between the three positions, other tubes 102 may be positioned over the chute.

In the further discussion below, the canister 101 is described in the context of a coin canister and the money items are described in the context of coins. Similarly, the money item ejectors 202 are described in the context of coin ejectors.

Figure 25:
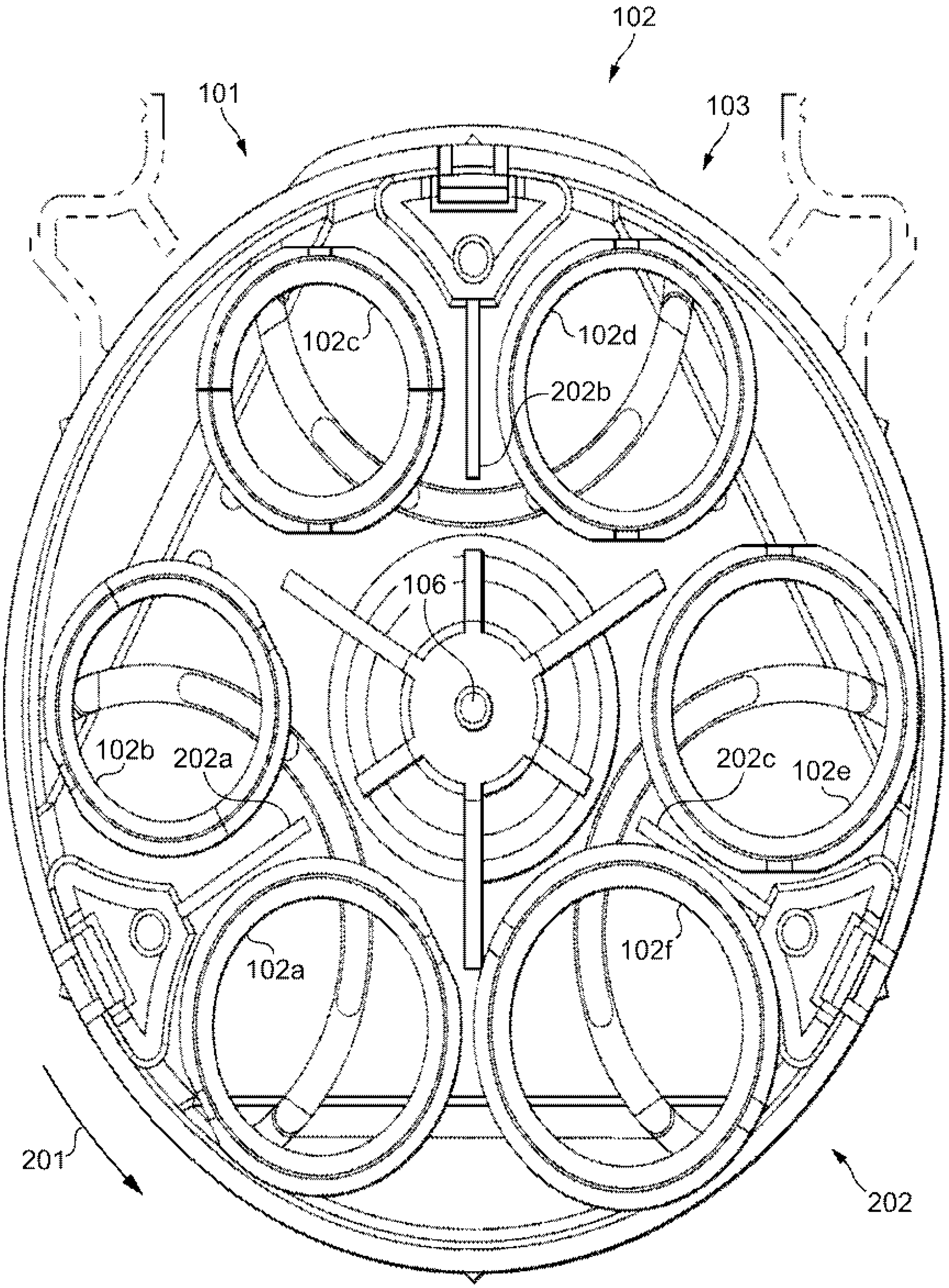

Referring now to FIG. 25, there is illustrated a top view of the coin canister 101 after the cylindrical body 103 of the coin canister 101 is rotated counter-clockwise one position. A single counter-clockwise position change (indicated by arrow 201) from the position shown in FIG. 24 results in the first tube 102*a* and the sixth tube 102*f* being oriented over the chute for receiving coins paid out from the first tube 102*a* and the sixth tube 102*f*. The coin ejectors 202 may also move with their associated tubes 102 such that a coin ejector 202 is always disposed beneath the same one or more tubes 102. For example, as shown in FIG. 25, during the counter-clockwise rotation, the first coin ejector 202*a* remains associated with the first tube 102*a* and the second tube 102*b*, the second coin ejector 202*b* remains associated with the third tube 102*c* and the fourth tube 102*d*, and the third coin ejector 202*c* remains associated with the fifth tube 102*e* and the sixth tube 102*f*.

The coin canister 101 may include two payout positions. For example, in FIG. 24, the payout positions would be at the fourth tube 102*d* and the fifth tube 102*e*, with the second coin ejector 202*b* being disposed below the third tube 102*c* and the fourth tube 102*d* causing coins to be ejected from the fourth tube 102*d*, and the third ejector 202*c* being disposed below the fifth tube 102*e* and the sixth tube 102*f* causing coins to be ejected from the fifth tube 102*e*. In FIG. 25, the payout positions would be at the first tube 102*a* and the sixth tube 102*f*, with the first coin ejector 202*a* being disposed below the first tube 102*a* and the second tube 102*b* causing coins to be ejected from the first tube 102*a*, and the third coin ejector 202*c* being disposed below the fifth tube 102*e* and the sixth tube 102*f* causing coins to be ejected from the sixth tube 102*f*.

It should be understood that each tube 102 of the plurality of tubes 102 may have only one payout position. For example, the first tube 102*a*, the third tube 102*c*, and the fifth tube 102*e* may be moved into a first payout position (e.g., moved into position with a first hopping disc) while the second tube 102*b*, the fourth tube 102*d*, and the sixth tube 102*f* may be moved into a second payout position (e.g., moved into position with a second hopping disc). One or more additional payout positions may be provided for one or more tubes 102 of the plurality of tubes 102. For example, the first tube 102*a*, the third tube 102*c*, and the fifth tube 102*e* may have two payout positions (e.g., two hopping discs). Optionally, all the tubes 102 may share a same payout position. For example, each tube 102 of the plurality of tubes 102 may have an unshared coin ejector 202. In this case, each tube 102 may move into position at the same payout position to dispense a coin.

Figure 26:
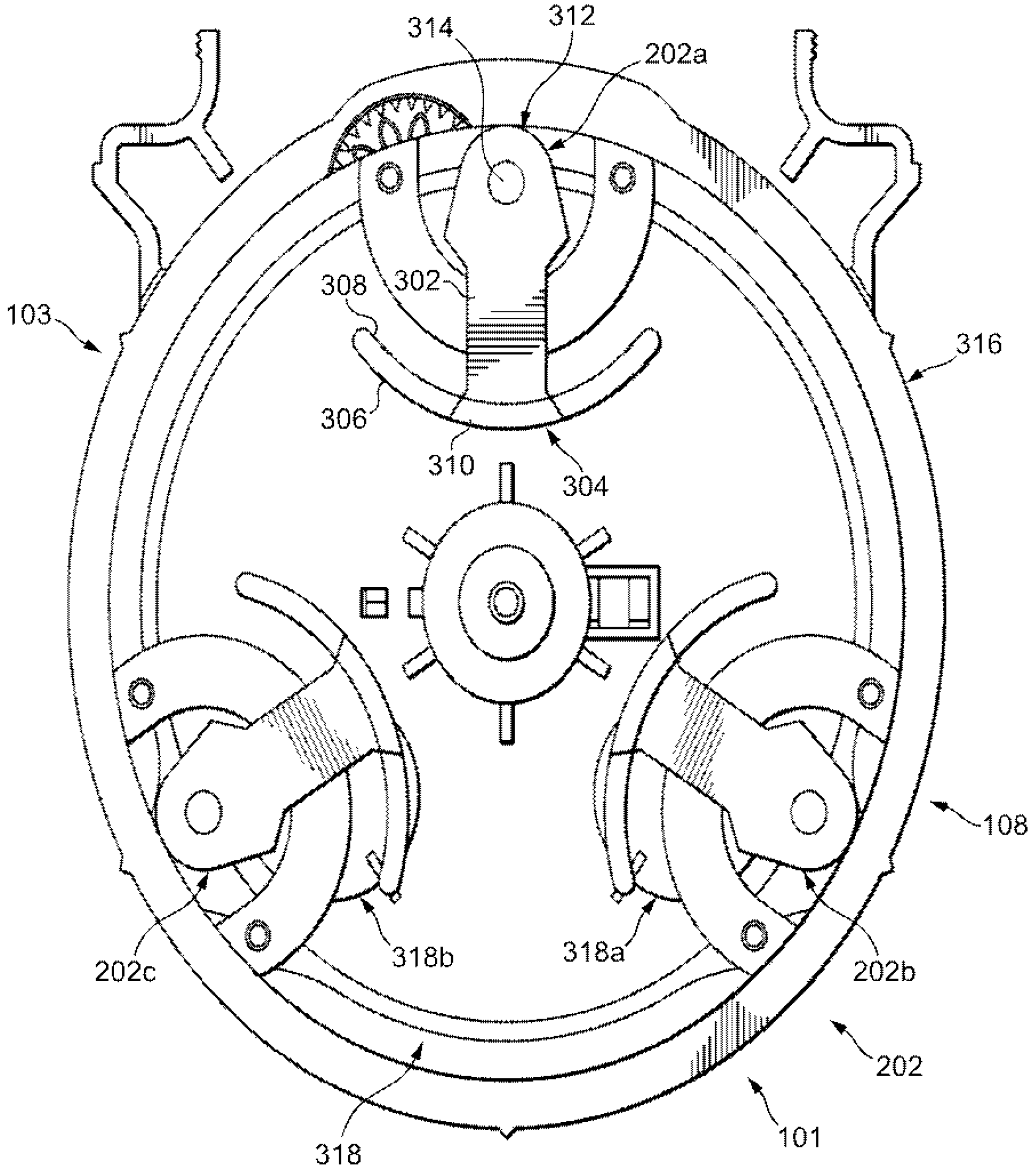

Referring now to FIG. 26, there is illustrated a top view of the coin canister 101 without the tubes 102. Removing the tubes 102 reveals the configuration of each of the coin ejectors 202. The first coin ejector 202*a*, the second coin ejector 202*b*, and the third coin ejector 202*c* are shown with the first coin ejector 202*a* at a first position, the second coin ejector 202*b* at a second position, and the third coin ejector 202*c* at a third position.

Each of the coin ejectors 202 may have a substantially similar shape and configuration. For example, as shown with respect to at least the first coin ejector 202*a*, the first coin ejector 202*a* includes a rectangular body 302. At a first end 304 of the rectangular body 302, the first coin ejector 202*a* may have an arcuate surface 306 extending up from the first end 304 of the rectangular body 302 such that a wall 308 is formed at the first end 304 of the rectangular body 302. The arcuate surface 306 may extend out on each side of the rectangular body 302, arcing in and toward the rectangular body 302. The arcuate surface 306 may further have a coin ledge 310 that is a surface extending above the arcuate surface 306 at the same angle as the arcuate surface 306. The coin ledge 310 may have a shorter arc than the arc of the arcuate surface 306, extending the width of the first end 304 of the rectangular body 302 of the coin ejector 202*a*. A second end 312 of the rectangular body 302 may be rotatably fixed to the coin canister 101 by a single fixation device 314, such as a pin or bolt, at a point around the perimeter 316 of and near the bottom 108 of the coin canister 101. For example, as illustrated in FIG. 26, the first coin ejector 202*a* is fixed at a 12 o'clock position, the second coin ejector 202*b* is fixed at a 4 o'clock position, and the third coin ejector 202*c* is fixed at an 8 o'clock position.

The money item supply apparatus 1500 may include at least one mechanism for operating the at least one coin ejector 202 in order to eject a coin from a coin tube 102. In particular, one or more hopping discs 318 may be rotatably installed at positions below the coin ejectors 202. As illustrated in FIG. 26, a first hopping disc 318*a* is installed below the second coin ejector 202*b* at the second position, and a second hopping disc 318*b* is installed below the third coin ejector 202*c* at the third position, with there being no hopping disc installed at the first position below the first coin ejector 202*a*. In an example implementation, the hopping discs 318 do not rotate with the coin ejectors 202 or the associated tubes 102, but rather remain fixed at the second position and the third position. Each of the hopping discs 318 rotate in order to interact with the coin ejector 202 presently disposed above the hopping disc 318 in order to move the coin ejector 202 so that the coin ejector 202 ejects a coin from one of the tubes 102 associated with the coin ejector 202, depending on which of the tubes 102 is oriented over a payout position.

As shown in FIG. 26, a first hopping disc 318*a* installed below the second coin ejector 202*b* at the second position may cause the second coin ejector 202*b* to eject a coin from the fourth tube 102*d*. Similarly, a second hopping disc 318*b* installed below the third coin ejector 202*c* at the third position may cause the third coin ejector 202*c* to eject a coin from the fifth tube 102*e*. Conversely, because no hopping disc is located at the first position, the first coin ejector 202*a* is not able to eject a coin from either the first tube 102*a* or the second tube 102*b*.

Figure 27:
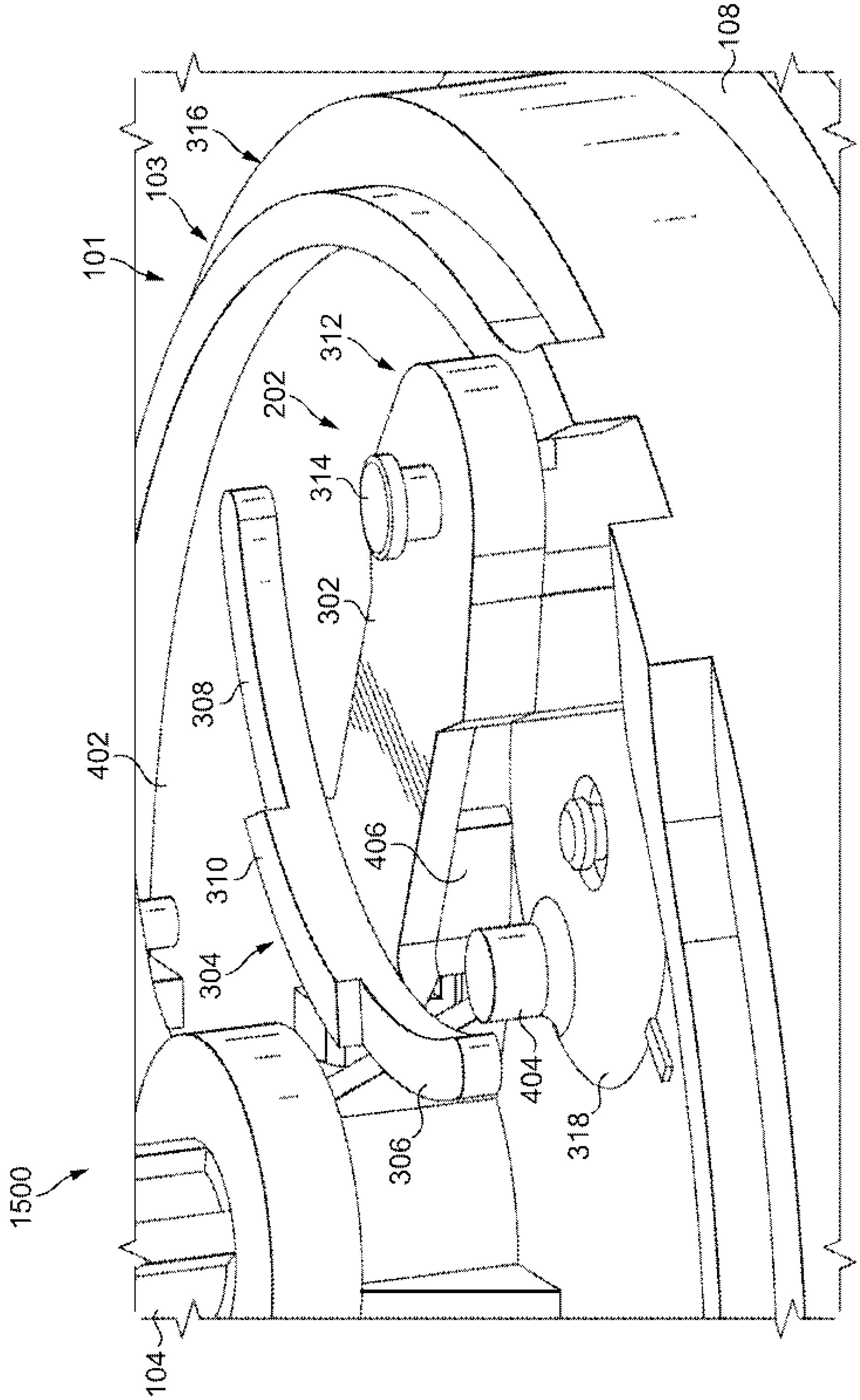
Figure 28:
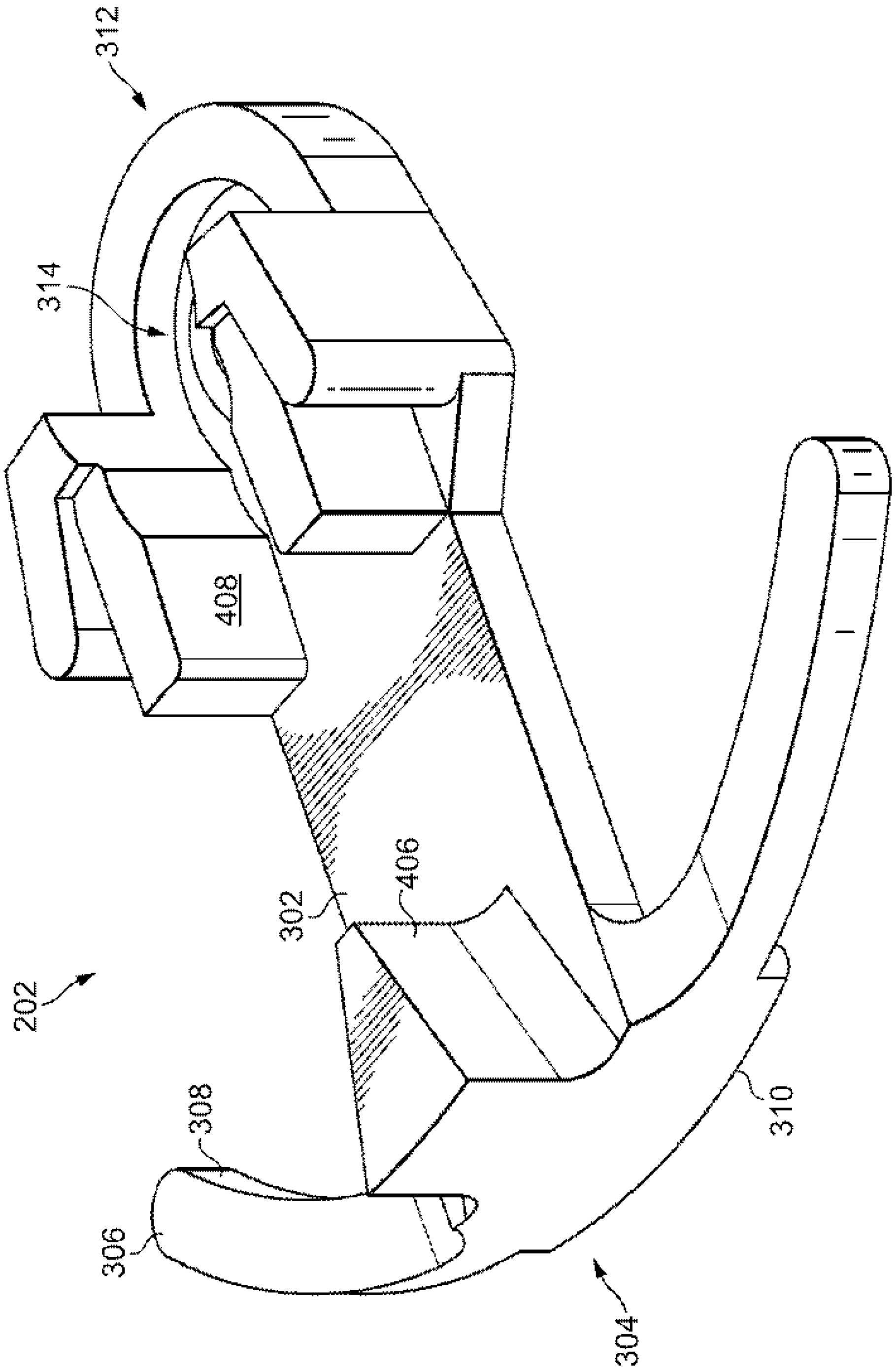

Referring now to FIGS. 27 and 28, FIG. 27 illustrates a perspective view of a coin ejector 202 and hopping disc 318 configuration and FIG. 28 illustrates a bottom perspective view of a coin ejector 202. As shown in FIGS. 27 and 28, a coin ejector 202 is shown pivotally coupled to a point around the perimeter 316 of the coin canister 101. The coin ejector 202 is oriented in a default position with the rectangular body 302 of the ejector 202 extending from the second end 312 of the coin ejector 202 towards the center 104 of the cylindrical body 103 of the coin canister 101. A hopping disc 318 is pivotally coupled to a bottom surface 402 of the coin canister 101. As the hopping disc 318 rotates, a hopping pin 404 extending up from a top surface of the hopping disc 318 pushes against a first contact surface 406 disposed below a bottom surface of the coin ejector 202 at the first end 304 of the coin ejector 202 such that the coin ejector 202 is rotated toward the outer perimeter 316 of the coin canister 101. This movement causes the arcuate surface 306 of the coin ejector 202 to curve toward the outer perimeter 316 of the coin canister 101. Movement or curving of the arcuate surface 306 of the coin ejector 202 may cause the coin ledge 310 extending above the arcuate surface 306 to encounter a bottom coin in a tube 102 of the coin canister 101. When the arcuate surface 306 encounters a bottom coin in the tube 102 of the coin canister 101 a coin may be ejected from the tube 102. The first contact surface 406 may extend diagonally from a point starting at the first end 304 of the coin ejector 202 (e.g., near a side of the first end 304) and extend toward the middle of the bottom surface of the coin ejector 202.

As shown in FIG. 28, as the hopping disc 318 continues to rotate, the hopping pin 404 will encounter a second contact surface 408 disposed near the second end 312 of the coin ejector 202. The second contact surface 408 may extend away from the second end 312 of the coin ejector 202 down a length of the rectangular body 302 of the coin ejector 202. The second contact surface 408 may extend a center of the rectangular body 302 such that the hopping pin 404 encounters the second contact surface 404 408 near the center of the rectangular body 302 and under the bottom surface of the coin ejector 202. When the hopping pin 404 encounters the second contact surface 408, the coin ejector 202 is pushed back to the default position.

It should be understood that a coin ejector 202 may be associated with and disposed beneath a pair of tubes 102. Thus, when a coin canister 101 includes a configuration as illustrated in FIG. 26, two hopping discs may rotate in opposite directions. Accordingly, a first hopping disc may engage a coin ejector to rotate the coin ejector in a first direction to eject coins from a first tube of the pair of tubes 102 when the first tube of the pair of tubes 102 have moved into position with the first hopping disc. Similarly, a second hopping disc may engage the same coin ejector to rotate the coin ejector in a second direction, opposite the first direction, to eject coins from a second tube of the pair of tubes 102 when the second tube of the pair of tubes 102 have moved into position with the second hopping disc.

Figure 29:
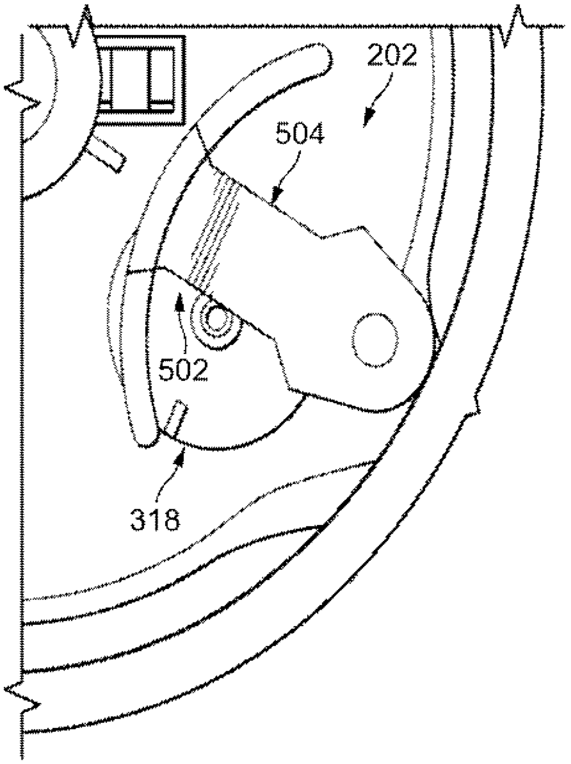
Figure 30:
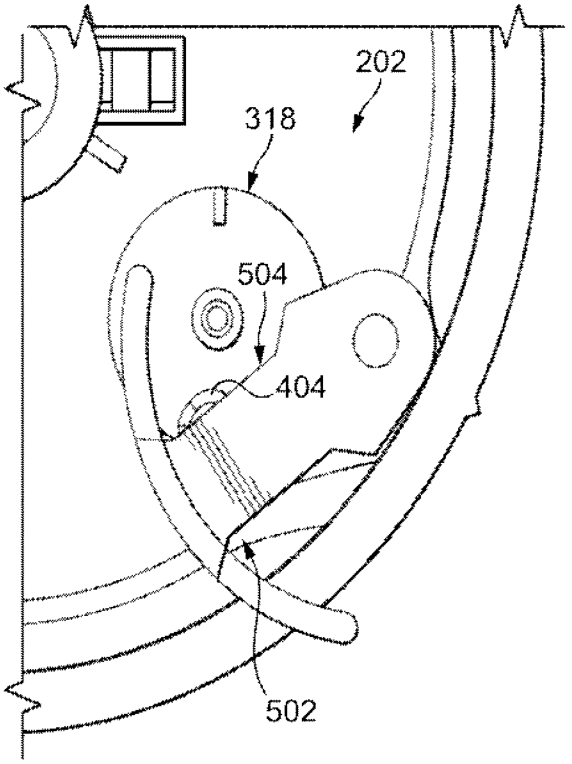

Referring now to FIGS. 29 and 30, there is illustrated a top view of a coin ejector rotation operation. As a hopping disc 318 rotates, the hopping pin 404 of the hopping disc 318 encounters the first contact surface 406 of the coin ejector 202 at a first contact point 502. As the hopping disc 318 continues to rotate, the coin ejector 202 is pushed causing the coin ejector 202 to pivot at the single fixation device 314 and rotate from a default position shown in FIG. 29 to an end position shown in FIG. 30. The hopping disc 318 will then continue to rotate until the hopping pin 404 passes by the first contact surface 406 of the coin ejector 202. The hopping pin 404 will then encounter the second contact surface 408 of the coin ejector 202 at a second contact point 504. As the hopping disc 318 continues to rotate from the second contact point 504, the coin ejector 202 is pushed back to the default position. Rotation of the hopping disc 318 may continue so that additional coins may be ejected from the coin canister 101. When a coin ejector 202 is associated with and disposed beneath a pair of tubes 102, another hopping disc 318 may rotate in an opposite direction from the aforementioned hopping disc described with respect to FIGS. 29 and 30. In this case, when the pair of tubes 102 is moved into a position with the other hopping disc 318, the coin ejector 202 may be rotated in an opposite direction and cause a coin from the other tube of the pair of tubes 102 to be ejected.

Figure 31:
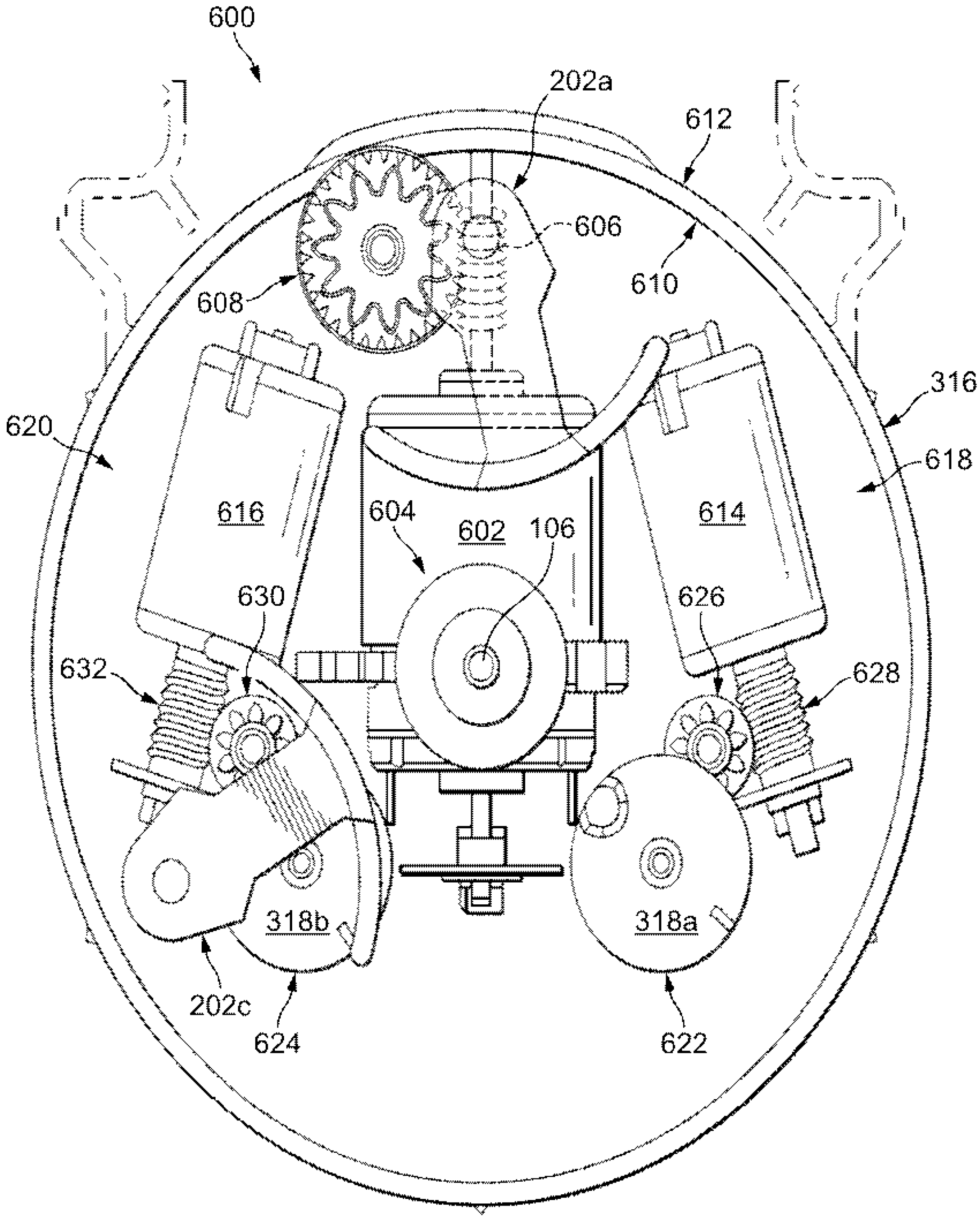
Figure 32:
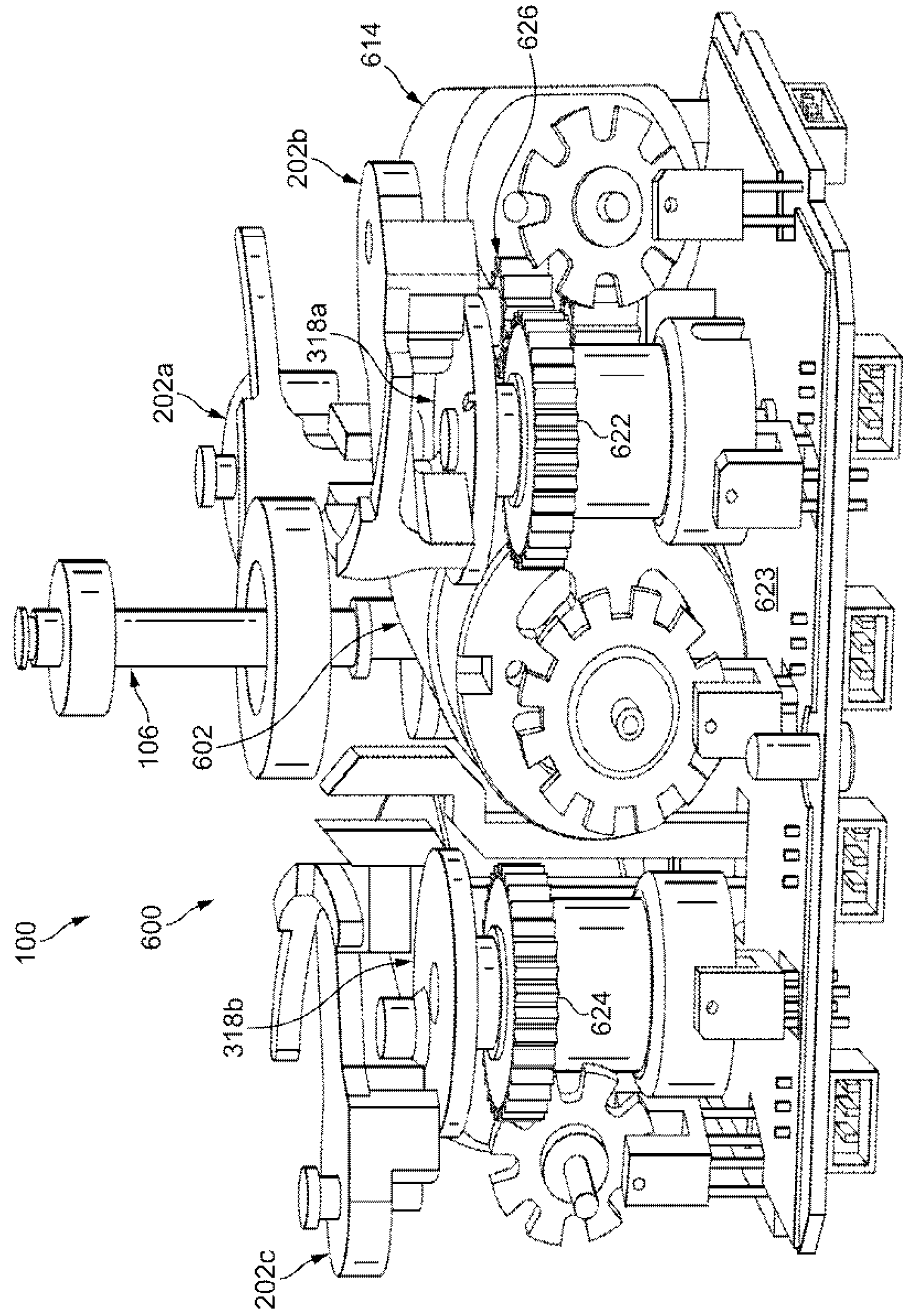
Figure 33:
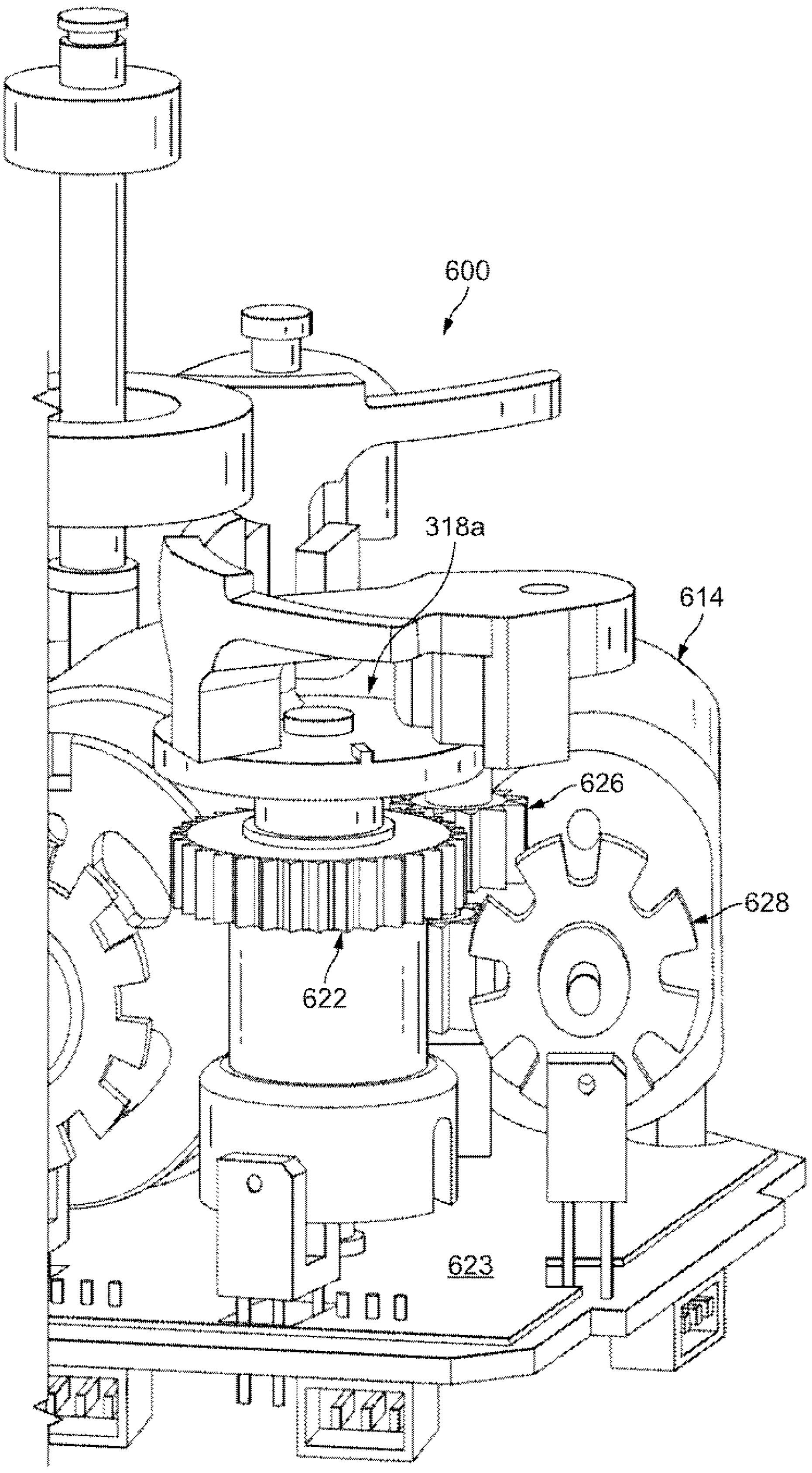

Referring now to FIGS. 31 to 33, FIG. 31 illustrates a top view of a motor assembly 600 of a money item supply apparatus 1500. FIG. 32 illustrates a front perspective view of a motor assembly 600 of a money item supply apparatus 1500. FIG. 33 illustrates a side perspective view of a motor assembly 600 of a money item supply apparatus 1500. The motor assembly 600 may be coupled to the bottom 108 of the coin canister 101 so that component of the motor assembly 600 may drive components of the coin canister 101 as described herein.

For example, as shown in FIGS. 31 to 33, the rotatable shaft 106 extends up from the motor assembly 600 and allows for a coin canister 101 to be placed thereon. A rotation motor 602 disposed near the center 604 of the motor assembly 600 includes a worm gear 606 that drives a first gear 608. The first gear 608 engages with an inner surface 610 of a wall 612 formed at the perimeter 316 of the coin canister 101 and drives the rotation of the coin canister 101 (e.g., the rotation of the cylindrical body 103 of the coin canister 101). The rotation of the coin canister 101 may cause the positions of the tubes 102 of the coin canister 101 as well as the positions of the coin ejectors 202 disposed beneath the tubes 102 of the coin canister 101 to rotate with the coin canister 101 and change positions with respect to a hopping disc 318 and one or more payout positions. The motor assembly 600 also includes a first payout motor 614 and a second payout motor 616. The first payout motor 614 is disposed on a first side 618 of the motor assembly 600 and the second payout motor 616 disposed on a second side 620 of the motor assembly 600.

The first hopping disc **318*a* is associated with the first payout motor 614 and the second hopping disc 318*b* is associated with the second payout motor 616. The first hopping disc 318*a* and the second hopping disc 318*b* are disposed at the top of a first rotatable gear shaft 622 and a second rotatable gear shaft 624, respectively. The first rotatable gear shaft 622 extends up from a base 623 of the motor assembly 600 in front of the first payout motor 614. The first gear shaft 622 (e.g., gear teeth of the first gear shaft 622) meshes with first intermediate gear 626. The first intermediate gear 626 meshes with a first worm gear 628 coupled to the first payout motor 614. Thus, the first payout motor 614 drives the rotation of the first hopping disc 318*a*, via the first worm gear 628, the first intermediate gear 626, and the first rotatable gear shaft 622. Similarly, the second rotatable gear shaft 624 similarly extends up from the base of the motor assembly 600 in front of the second payout motor 616. The second gear shaft 624 (e.g., gear teeth of the second gear shaft 624) meshes with second intermediate gear 630. The second intermediate gear 630 meshes with a second worm gear 632 coupled to the second payout motor 616. Thus, the second payout motor 616 drives the rotation of the second hopping disc 318*b*, via the second worm gear 632, the second intermediate gear 630, and the second rotatable gear shaft 624. During operation of the motor assembly 600, the first hopping disc 318*a* may rotate clockwise while the second hopping disc 318*b* may rotate counter-clockwise. This causes the coin ejectors 202 situated over the first hopping disc 318*a* and the second hopping disc 318*b* to rotate in opposite directions and eject coins at the two payout positions. For example, when the position of the fourth tube 102***d* and the fifth tube 102*e* are as illustrated in FIG. 24, the second hopping disc 318*b* causes coins to be ejected from the fifth tube 102*e* and the first hopping disc 318*a* causes coins to be ejected from the fourth tube 102*d*. As another example, if the coin canister 101 were in the position illustrated in FIG. 25, the first hopping disc 318*a* would cause coins to be ejected from the first tube 102*a*, while the second hopping disc 318*b* would cause coins to be ejected from the sixth tube 102*f*. Since the coin ejectors 202 also rotate with their associated tubes 102, the coin ejectors 202 remain symmetrical with the associated tubes 102 during operation of the motor assembly 600 and rotation of the coin canister 101. This also allows for coin payout from any of the different tubes 102 on the coin canister 101 by rotating the coin canister 101 to position a needed tube 102 into one of the payout positions over the hopping discs 318. In certain embodiments, ejected coins may be ejected from the coin canister 101 and into a coin collection area.

Example operations of the money item handling system 100 and the rotatable apparatus 1000, 3000 are discussed further below. These operations may take place after the system start-up actions discussed above, i.e. with respect to the mixing of money items so as to improve the even distribution of money items inside the storage region 400.

Figure 34:
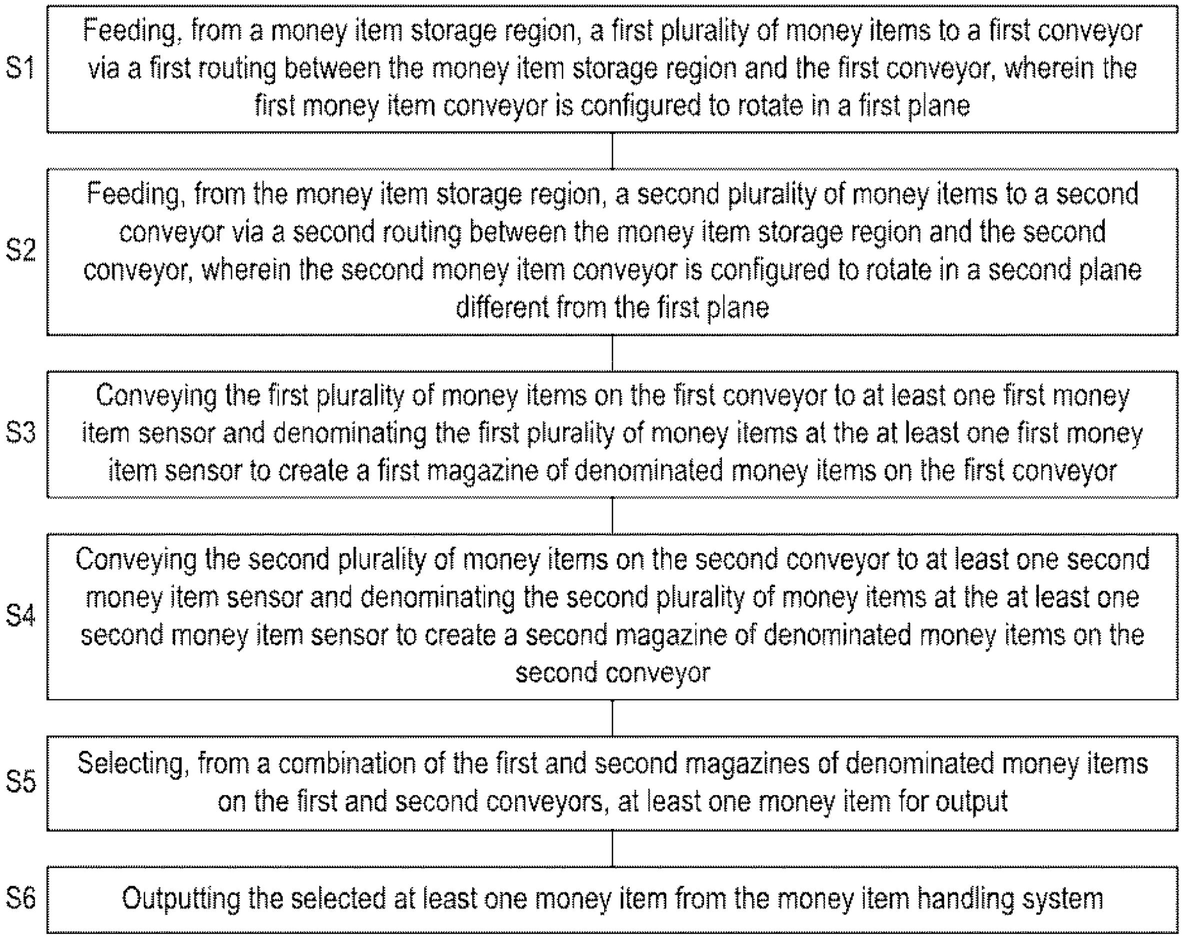
FIG. 34 is a flow diagram of operation of a money item handling system including first and second money item conveyors, a money item storage region, and first and second routings to allow a flow of money items from the storage region to the first and second conveyors.

Referring to FIG. 34, example operations of a money item handling system such as the system 100 illustrated in the figures comprise, in a first stage S1, feeding a first plurality of money items from the money item storage region 400 to the collection zone 207 of the first conveyor 200 via the first routing 700. In a second stage S2, the operations comprise feeding a second plurality of money items from the money item storage region 400 to the collection zone of the second conveyor 300 via the second routing. The second stage S2 may occur simultaneously with the first stage S1. Alternatively (or additionally), the second stage may occur before or after the first stage S1, or independently of the first stage S1.

In a third stage S3, rotation of the first conveyor 200 around its looped path causes money items in the collection zone 207 of the first conveyor 200 to be collected by the articulated conveying elements 202 of the conveyor track 201 and transported around the looped path of the conveyor 200. Further rotation of the conveyor causes more money items to be collected from the collection zone 207. Rotation of the conveyor 200 in the third stage S3 may commence before, after or at the same time as the first gate element 800, 2000 is actuated to an open or partially open position in the first stage S1. Money items on the track 201 of the conveyor 200 are transported to the money item sensing zone 208 of the conveyor path, at which the money items are denominated by the one or more money item sensors 208*a* located adjacent to the track 201.

Money items which have been denominated on the track 201 of the first conveyor 200 form part of a first magazine of money items in the system 100. This first magazine of money items is available to the money item handling system 100 for rapid money item dispensing operations, as discussed below.

In a fourth stage S4, rotation of the second conveyor 300 around its looped path causes money items in the collection zone of the second conveyor 300 to be collected by the articulated conveying elements 302 of the conveyor track 301 and transported around the looped path of the conveyor 300. As with the first conveyor 200, further rotation of the second conveyor 300 causes more money items to be collected from the collection zone. Money items on the track 301 of the conveyor 300 are transported to the money item sensing zone of the conveyor path, at which the money items are denominated by the one or more money item sensors located adjacent to the track 301.

Money items which have been denominated on the second conveyor track 301 form part of a second magazine of money items in the system 100. As with the first magazine mentioned above, this second magazine of money items is available to the money item handling system 100 for rapid money item dispensing operations. The fourth stage S4 of operations may, for example, occur simultaneously with the third stage S3. Alternatively (or additionally), the fourth stage S4 may occur before or after the third stage S3, including independently of the third stage S3.

In a fifth stage S5, the operations comprise selecting, from the denominated magazines of money items on the first and/or second conveyors 200, 300, at least one money item for output from the conveyors 200, 300. This may comprise assessing all denominated money items on one or both conveyor tracks 201, 301, in combination, and selecting individual money items, located on particular conveying elements 202, 302 of the first and/or second tracks 201, 301 for output from the conveyors 200, 300. Selection of the money items for output may be made in response to a need to dispense a particular value of money items to an exterior outlet of the system 100 or, for example, a need to dispense particular denominations or types of money item to the exterior outlet of the system 100. Alternatively, particular values or denominations of money items may be selected for output to another internal region of the system 100 (e.g. within the system housing 500). Examples of such internal regions of the system 100 include the money item supply apparatus 1500, the money item storage region 400 and the money item collection zone(s) 207 of the first and/or second conveyors 200, 300. In this respect, the system 100 may include a money item diverting apparatus which operates in cooperation with the gates 209*a-c* of the money item outlet zone(s) 209, under the control of the computing apparatus 1200, to divert money items routed off the conveyor track(s) 201, 301 into respective internal regions of the system 100. Each of these respective internal regions of the system 100 may be directly connected to at least one gate 209*a-c* of the money item outlet zone(s) 209 by a respective money item channel.

The respective money item channels referred to above mean that money items routed off the conveyor track(s) 201, 301 can be selectively channelled directly into the mixed denomination money item storage region 400. Additionally or alternatively, money items routed off the conveyor track(s) 201, 301 can be selectively channelled directly into the money item supply apparatus 1500 for stocking the storage regions 1502 of the supply apparatus 1500 with different denominations of money items. For this purpose, in order to ensure that money items routed to the supply apparatus 1500 from the outlet zone 209 enter the appropriate storage region 1502, the money item supply apparatus 1500 may be rotated or otherwise actively moved by the system 100 so as to align the appropriate money item storage region(s) 1502 with the channel from the outlet zone 209.

Similarly, money items routed off the conveyor track(s) 201, 301 in the outlet zone(s) 209 can be selectively channelled directly into the money item collection zone(s) 207 without passing through the money item storage region 400 on-route. In scenarios where it is advantageous or required that particular money items are moved off the conveyor track(s) 201, 301 to make room for other money items to be picked-up by the track(s) 201, 301 in the collection zone(s)

207, for example in order to refresh the mix of money items in the money item magazine(s), the direct channelling of money items from the outlet zone(s) 209 to the collection zone(s) 207 allows such money items to be retained within the relatively small quantity of money items present in the collection zone(s) 207 and conveyor track(s) 201, 301 (in combination). In other words, such money items do not need to be routed back to the potentially large mix of money items present in the money item storage region 400. This action of retaining particular (e.g. short supply) money items as part of the relatively small pool of items present in the collection zone(s) 207/on the conveyor track(s) 201, 301 means that the money items remain more accessible for use by the system 100 as part of a future dispensing operation.

Due to the presence of dual money item conveyors 200, 300 and the corresponding first and second magazines of denominated money items on the conveyor tracks 201, 3o1, the probability that the system 100 is able to respond to an immediate demand for particular values/denominations/types of money items by selecting appropriate money items already present on at least one of the tracks 201, 301 is high. Where included, the money item supply apparatus 1500 discussed above may increase this probability still further.

The demand referred to above may correspond to, or be dictated by, a request for money items to be transported to another region of the money item handling system, as discussed above. For example, a transactional process may require a particular value of money items to be transported to an exterior outlet of the system 100, such as the payout cup or other collection region mentioned above, where a person outside the housing 500 can access the money items. However, as mentioned above, there may alternatively be a demand for particular denominations of money item at another internal region of the system 100.

Where the money item supply apparatus 1500 is present, payout operations may ultimately be actioned by releasing required denominations of money items from the supply apparatus 1500 to the payout cup or other collection region of the system 100. Where the money item supply apparatus 1500 is not present, payout operations may instead be actioned by routing required denominations of money items directly from the magazine(s) of money items on the conveyor(s) 200, 300 to the payout cup or other collection region.

The assembly of the first and second magazines may take place at any time, i.e. not necessarily in response to the demand. For example, the magazines may be assembled, or partially assembled, during time when the system's conveyors 200, 300 would otherwise be inactive, so that once a request for money items is received at, or determined by, the computing apparatus 1200, the computing apparatus 1200 may immediately determine a suitable combination of denominated money items already present in the first and/or second magazines. The computing apparatus 1200 may then issue instructions to cause these money items to be routed off the conveyor(s) 200, 300 in order to meet the demand. For example, as discussed above, money items may be routed to the collection region in order to fulfil a required payout and/or may be routed to the money item supply apparatus 1500 in order to fill the money item storage regions 1502 of the supply apparatus 1500 with selected denominations of money items.

In a sixth stage S6, the selected money item or items are selectively routed off the track(s) 201, 301 of the first and/or second conveyors 200, 300 through one or more of the outlet gates 209*a*, 209*b*, 209*c* of the first and/or second conveyors 200, 300. For example, once the money item or money items have been selected, the track(s) 201, 301 on which they are present is/are rotated until the selected money item(s), and the conveying element(s) 202, 302 on which they are sitting, are in the money item outlet zone(s) 209 of the conveyor(s) 200, 300 and are aligned with the one or more outlet gates 209*a-c* of the zone(s) 209. The outlet gate(s) 209*a-c* are then opened, as required, in order to route the selected money item(s) off the conveyor track(s) 201, 301.

The system 100 has been described above predominately in the context of a system 100 comprising first and second money item conveyors 200, 300 and also first and second money item routings which, respectively, route money items from a mixed denomination storage region 400 to the first and second conveyors 200, 300. However, as has been made clear, the system 100 can alternatively be implemented without the second conveyor 300 and without the second money item routing. Such implementations of the system 100 also do not comprise the second money item gate element 1100 discussed above in the context of the second money item routing. Instead, the opening in the wall of the storage container 401 of the storage region 400 for the second routing is not present. Money items are routed from the storage region 400 to the first conveyor 200 only, via the first routing 700. It will be appreciated that in this implementation, the second money item collection zone, second money item sensing zone and second money item outlet zone, all of which are directly associated with the second conveyor 300, are also not present. In all other respects, the system 100 operates in the manner described above. This naturally follows from the manner in which the system 100 has been explained, in which the first conveyor 200, first routing 700 and first money item gate element 800, 2000 have been used as the primary examples for describing the operation of the system 100.

In implementations of the system 100 where the second conveyor 300 and other associated elements, as discussed above, are not present, it should be understood that the first conveyor 200, first routing 700 and first money item gate element 800, 2000 may retain all of the functionality previously described. For example, money items collected by the track 201 of the first conveyor 200, from the money item collection zone 207, are carried around the path of the conveyor 200 and denominated in the money item sensing region 208. The denominated money items on the track 201 may form a magazine of money items and individual ones of the denominated money items in the magazine can be selectively routed off the conveyor track 201, using the gates 209*a-c* in the money item outlet zone 209, in order to be dispensed to other regions of the system 100, including the money item supply apparatus 1500 and other possibilities previously described.

Further example operations of the money item handling system 100 are discussed further below. As with stages S1-S6, these operations may take place after the system start-up actions described above.

Figure 35:
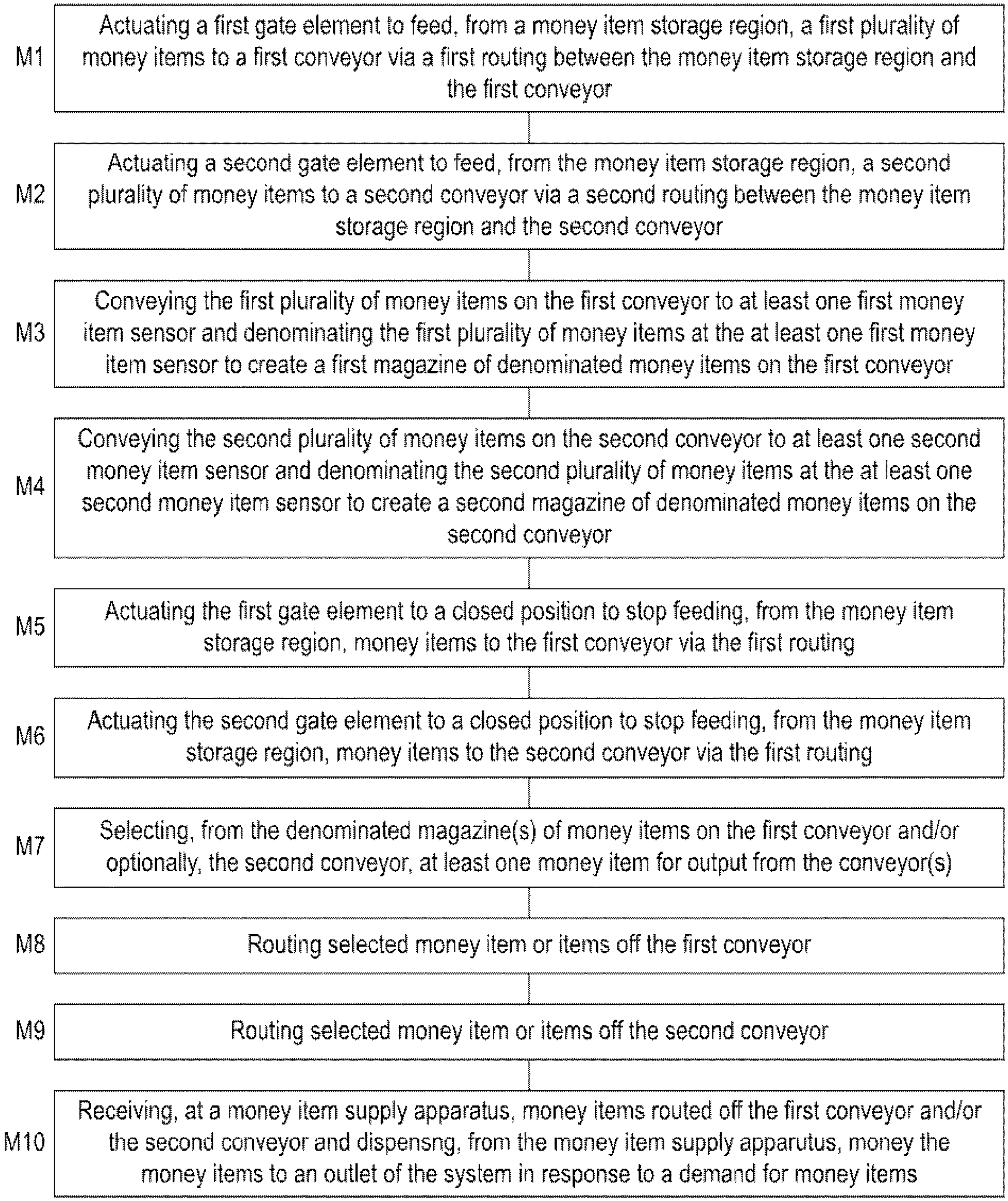
FIG. 35 is a flow diagram of operation of a money item handling system including a money item conveyor, a money item storage region, a routing to allow a flow of money items from the storage region to the money item conveyor, and a gate element which is actuatable by the system relative to the routing.

Referring to FIG. 35, example operations of a money item handling system such as the system 100 illustrated in FIG. 1 or a system 100 of the type mentioned immediately above (i.e. without a second conveyor 300 etc.) comprise, in a first stage M1, actuating the first gate element 800 to a partially or fully open position to feed a first plurality of money items from the money item storage region 400 to the collection zone 207 of the first conveyor 200 via the first routing 700. In an optional second stage M2, in implementations of the system 100 which include the second conveyor 300, the operations comprise actuating the second gate element to a partially or fully open position to feed a second plurality of money items from the money item storage region 400 to the collection zone of the second conveyor 300 via the second routing. Where performed, the second stage M2 may occur simultaneously with the first stage M1. Alternatively (or additionally), the second stage M2 may occur before or after the first stage M1, or independently of the first stage M1.

In a third stage M3, rotation of the first conveyor 200 around its looped path causes money items in the collection zone 207 of the first conveyor 200 to be collected by the articulated conveying elements 202 of the conveyor track 201 and transported around the looped path of the conveyor 200. Further rotation of the conveyor causes more money items to be collected from the collection zone 207. Rotation of the conveyor 200 in the third stage M3 may commence before, after or at the same time as the first gate element 800 is actuated to an open or partially open position in the first stage M1.

Money items on the track 201 of the conveyor 200 are transported to the money item sensing zone 208 of the conveyor path, at which the money items are denominated by the one or more money item sensors 208*a* located adjacent to the track 201. Money items which have been denominated on the track 201 of the first conveyor 200 form part of a first magazine of money items in the system 100. This first magazine of money items is available to the money item handling system 100 for rapid money item dispensing operations.

In an optional fourth stage M4, in implementations of the system 100 which include the second conveyor 300, rotation of the second conveyor 300 around its looped path causes money items in the collection zone of the second conveyor 300 to be collected by the articulated conveying elements 302 of the conveyor track 301 and transported around the looped path of the conveyor 300. As with the first conveyor 200, further rotation of the second conveyor 300 causes more money items to be collected from the collection zone. Money items on the track 301 of the conveyor 300 are transported to the money item sensing zone of the conveyor path, at which the money items are denominated by the one or more money item sensors located adjacent to the track 301. Money items which have been denominated on the second conveyor track 301 form part of a second magazine of money items in the system 100. As with the first magazine mentioned above, this second magazine of money items is available to the money item handling system 100 for rapid money item dispensing operations. Where performed, the fourth stage M4 of operations may, for example, occur simultaneously with the third stage M3. Alternatively (or additionally), the fourth stage M4 may occur before or after the third stage M3, including independently of the third stage M3.

In a fifth stage M5, the operations may comprise actuating the first gate element 800 to a closed position to stop feeding money items from the storage region 400 through the first routing 700 to the first money item collection zone 207. Meanwhile, the track 201 of the first conveyor 200 continues to rotate through the first collection zone 207 so as to continue to pick up money items from the first collection zone 207 and convey the money items around the path of the conveyor 200.

In an optional sixth stage M6, in implementations of the system 100 which include the second conveyor 300, the operations may comprise actuating the second gate element to a closed position to stop feeding money items from the storage region 400 through the second routing to the second money item collection zone. Meanwhile, the track 301 of the second conveyor 300 continues to rotate through the second collection zone so as to continue to pick up money items from the second collection zone and convey the money items around the path of the second conveyor 300. The sixth stage M6 may occur simultaneously with the fifth stage M5, or may be offset from the fifth stage M5.

The first to sixth stages M1-M6 may be repeated one or more times as the first and, where present, the second gate elements are actuated back and forth to feed a controlled flow of money items into the collection zone(s) for pick-up by the conveyor track(s).

In a seventh stage M7, the operations comprise selecting, from the denominated magazine of money items on the first conveyor 200 at least one money item for output from the conveyor 200. Optionally, in implementations of the system 100 which include the second conveyor 300, this stage M7 may also comprise selecting, from the denominated magazine of money items on the second conveyor 300, at least one money item for output from the second conveyor 300 This selection process may comprise assessing all denominated money items on the first conveyor track 201, and optionally also the second conveyor track 301, and selecting individual money items, located on particular conveying elements 202, 302 for output from the conveyor(s) 200, 300. Selection of the money items for output may be made in response to a need to dispense a particular value of money items to an exterior outlet (e.g. a collection region) of the system 100 or, for example, a need to dispense particular denominations or types of money item to the exterior outlet of the system 100. Alternatively, particular values or denominations of money items may be selected for output to another internal region of the system 100 (e.g. within the system housing 500). Examples of such internal regions of the system 100, and the manner in which money items may be diverted into such internal/external regions of the system 100, are discussed above in the context of operational stages S1-S6. That discussion applies equally here also, including for implementations of the system 100 in which the second conveyor 300 and associated system elements such as the second routing and second gate element are not present.

In an eighth stage M8, the selected money item or items are selectively routed off the track(s) 201 of the first conveyor 200 through one or more of the outlet gates 209*a*, 209*b*, 209*c* of the first conveyor 200. For example, once the money item or money items have been selected, the track 201 is rotated until the selected money item(s), and the conveying element(s) 202 on which the selected money item(s) are sitting, are in the money item outlet zone 209 of the conveyor 200 and are aligned with the one or more outlet gates 209*a-c* of the zone 209. The outlet gate(s) 209*a-c* are then selectively opened, as required, in order to route the selected money item(s) off the conveyor track 201.

In implementations of the system 300 100 in which the second money item conveyor 300 and its associated elements, including the second routing and second money item gate element, are present, the operations may also comprise a ninth stage M9 in which the eighth stage M8 operations described above in relation to the first conveyor 200 are carried out with respect to the second conveyor 300 also.

In an optional tenth stage M10, the operations may comprise dispensing money items from the money item supply apparatus 1500 to an outlet of the system 100, such as an exterior money item collection region, in response to a demand for money items being determined at the computing apparatus 1200. As described above, the money item supply apparatus 1500 is operable to selectively dispense individual or multiple money items of single or varying denominations, from one or more of the money item storage regions 1502 of the supply apparatus 1500, in order to fulfil a demand for a particular value of money items, or for particular denominations of money items.

The following discussion is applicable equally to implementations of the system 100 which comprise both the first and second conveyors 200, 300 and to implementations of the system 100 which comprise the first conveyor 200 but not the second conveyor 300. Referring back to FIG. 1, the first outlet gate 209*a* of either or both of the money item conveyors 200, 300 may, for example, lead directly to the storage region 400 so that money items on the conveyor track(s) 201, 301 can be directed back into the mixed denomination money item storage when required. The second outlet gate 209*b* of either or both of the tracks 201, 301 may lead to a further money item storage region, such as the money item supply apparatus 1500 discussed above or, for example, an external storage chamber. The third outlet gate 209*c* of either or both of the tracks 201, 301 may lead to a money item exit routing, through which money items which have been directed off the conveyor track(s) 201, 301 at the third outlet gate(s) 209*c* are routed to the exterior of the housing 500 for collection by e.g. a person using the system 100. The location of this third outlet gate 209*c*, which is furthest away from the sensing zone 208, means that a relatively large number of denominated money items may be accommodated on the track(s) 201, 301 in the region between the money item sensor(s) 208*a* and the outlet gate 209*c* through which money items can be directed for external collection. These denominated money items form at least part of the magazines and can be very rapidly and selectively dispensed to the exterior of the housing, as required, when the system 100 determines that there is a need to payout particular values or denominations of money items from the magazine(s).

As money items leave either or both of the track(s) 201, 301 of the first and second conveyors 200, 300, the track(s) 201, 301 are replenished with further money items from the money item storage region 400. This occurs as the track(s) 201, 301 of the money item conveyor(s) 200, 300 are moved through the collection zones described above. At the collection zones, conveying elements 202, 302 which are empty (i.e. those on which a money item is not present) may collect money items from pools of money items which have moved from the storage region 400, through the first and second routings described above, to the collection zones. Money items arriving in each collection zone via the first and second routings rest on a static floor of the collection zone in a position from which they may be physically picked-up by the conveying elements 202, 302. The pool of money items in the collection zone of each conveyor 200, 300 effectively acts as a float from which money items may be sourced by the track(s) 201, 301 of each conveyor 200, 300 in order to prepare for, and complete, future dispensing operations such as those described above with respect to the sixth stage S6 of FIG. 34 and the eighth to tenth stages M8-M10 of FIG. 35.

The pool of money items in the collection zone of each conveyor 200, 300 may be controlled by selective actuation of the first and second gate elements 800, 1100. For example, using the first conveyor 200 for illustration, as outlined above in relation to the operational stages M1-M6, the first gate element 800 may initially be moved to a position which allows money items to move through the first routing 700 from the storage region 400 to the first conveyor 200. This position may be the second or third flow control position of the gate element 800 discussed above. The first routing 700 may be held open, or partially open, for a first time period, for example so as to allow a particular number of money items to pool in the collection zone 207, before the first gate element 800 is moved to reduce or stop the rate of flow of money items from the storage region 400 through the first routing 700. This may involve actuating the gate element 800 to the second or first flow control position.

At a later time, for example after a further second period of time, the gate element 800 may be actuated back in the opposite direction to the third (or second) flow control position to restart or increase the flow of money items through the first routing 700 to the collection zone 207, thereby adding to the float of money items available for collection by the conveyor track 201 as it moves through the collection zone 207. After a still further period of time, such as a third period of time, the first gate element 800 may be actuated back to the first (or second) flow control position to again stop or reduce the rate of flow of money items from the storage region 400 through the first routing 700.

These operational movements of the first gate element 800 may be repeated in a cycle, in which the gate element 800 is repeatedly moved to fully open, partially open and closed positions relative to the outlet aperture 701 in order to control the flow of money items from the storage region 400 to the collection zone 207 of the first conveyor 200. It will be appreciated that the first, second and third time periods may vary from cycle to cycle in order to allow the system 100 to refill the collection zone 207 as required by the conditions in the system 100. For example, the rate and/or degree to which the collection zone 207 is refilled (under the control of the computing apparatus 1200) from the money item storage region 400 may depend on the rate at which money items in the collection zone 207 are being picked-up and carried away by the conveying elements 202 of the conveyor track 201. The rate of pick-up will vary depending on the number of empty conveying elements 202 on the track 201, which will in turn depend on the rate at which money items are being routed off the track in the money item outlet zone 209.

The system 100 may, for example, seek to keep the number of money items in the collection zone 207 within a predetermined range—such as 25 to 35 money items. In order to do this, the system 100 may monitor money items leaving the conveyor track 201 via the outlet gate(s) 209*a-c* at the outlet zone 209 and, using the selectively moveable gate element 800, vary the rate at which replacement money items are fed into the collection zone 207 from the money item storage 400. The system 100 may do this so that the combined number of money items on the track 201 and in the collection zone 207 remains substantially constant or within a predetermined range.

In one example implementation of the above process S1-S6 or the process M1-M10, the first gate element 800 is, in the first stage S1, M1, moved to an open or partially open position in order to facilitate a flow of money items from the storage region 400 to the collection zone 207. The first gate element 800 is held in this position for a first period of time, such as five seconds, before being moved to a closed position. During the time for which the first gate element is open or partially open, a limited quantity of money items, such as 20-30 money items, move through the first routing into the collection zone 207. As the conveyor track 201 moves through the collection zone 207, these money items are collected, as described above, by the conveying elements of the conveyor track 201 and carried around the conveyor path towards the sensing zone 208.

The limited period for which the first gate element 800 is held in an open or partially open position, before being returned back to a closed position (e.g. at stages M5 and M6), means that the total number of money items present in the collection zone 207 at any one particular time does not reach an undesirably high level. In particular, the limited number of money items allowed to pass through the first routing during any particular open or partially open period of the first gate element 800 prevents the pool of money items in the collection zone 207 from placing too high a load on the moving conveyor track 201 as it passes through the collection zone 207. Instead, the load placed on the conveyor 200 is managed at a level which keeps the operation of the conveyor efficient (e.g. from a power perspective) and which prevents a high rate of wear on the drive actuators and other mechanical components of the track 201. Furthermore, the possibility of the conveyor track 201 being jammed by money items in the collection zone 207 is reduced and the probability of money items being successfully picked up by empty conveying elements 202 moving through the collection zone 207 is increased.

In order to fill the conveyor track 201 from a state in which it is empty or substantially empty of money items, the process described in the preceding two paragraphs may be repeated for a number of times so that the first gate element is repeatedly actuated between open and closed positions. This is mentioned above in the context of stages M1-M6 of FIG. 35. The duration of time for which the gate element 800 is held in a closed position, before being opened again to allow more money items to enter the collection zone 207, is selected so as to allow at least a majority of the money items previously metered into the collection zone 207 to be collected by the moving conveyor track 201. This 'closed' time duration may be pre-stored in memory of the computing apparatus 1200, or may be actively determined in the system 100 by assessing, at the sensing region 208, whether the rotating conveyor track 201 is still picking up new money items from the collection zone 207. If no new money items are being sensed at the sensing zone 208 (e.g. since the last full rotation of the track 201), this indicates that the number of money items in the collection zone 207 is low or zero. In response to such an indication, the gate element 800 may be re-actuated to an open or partially open position to allow more money items to enter the collection zone 207.

This conveyor-filling process may cease upon it being detected, based on data from the sensors in the sensing zone 208, that at least a threshold proportion of the conveying elements 202 on the track 201 are occupied by money items collected from the collection zone 207. At this time, the track 201 is caused to stop rotating and the first gate element 800 is held in a closed position with respect to the first routing at least until there is a need or demand to dispense money items off the conveyor 200 via the outlet zone 209.

The system 100 may optionally adjust the distribution of money items on the conveyor track 201 by selectively directing individual money items on the track 201 back into the money item storage region 400 via the appropriate gate **209*a* in the outlet zone 209, as discussed above. This action frees-up one or more individual conveying elements of the track 201 so that they may collect further money items from the collection zone 207 as the track 201 is rotated. If data from the sensing zone 208 indicates that no further money items have been collected by rotation of the track 201, the system 100 actuates the first gate element 800 to an open (or partially open) position to facilitate a flow of further money items into the collection zone 207 from the storage region 400**.

By selectively retaining certain money items on the conveyor track 201, such as certain denominations of money item, whilst directing others back into the storage region 400, the system 100 is able to assemble on the track 201 a range of money items in accordance with particular parameters (e.g. so as to include at least one money item of each of multiple denominations initially present in the storage region 400 or system 100 as a whole). This management of the distribution of money items on the track 201 increases the likelihood that the system 100 will be able to rapidly dispense any given value of money items to the exterior of the housing, as required, directly from money items already present on the track 201. Additionally or alternatively, the management of the distribution of money items on the track 201 increases the likelihood that the track 201 will be able to rapidly dispense any given value or denomination(s) of money items into the money item supply apparatus 1500, as required, in order to stock or restock the plurality of storage regions 1502 of the supply apparatus 1500.

Following such a dispensing operation, one or more conveying elements 202 of the track 201 are likely to be empty of money items (the money items having been dispensed off the track 201 in order to e.g. fulfil a payout requirement or meet a demand for money items in another region of the system 100 such as the money item dispensing apparatus 1500). The locations of any such empty conveying elements 202 are known to the system 100 (the system 100 having selectively dispensed money items off those elements 202 following denomination of money items in the sensing zone 208) and the conveyor track 201 is, in response, rotated through the collection zone 207 in order fill the empty elements 202. As part of this process, if insufficient money items are being collected on the empty elements 202 by rotation of the track 201, the first gate element 800 is actuated to an open or partially open position for a limited time period in order to allow more money items to enter the collection zone 207 from the storage region 400.

The operational steps discussed above with respect to the first gate element 800, the first routing 700 and the collection zone 207 of the first conveyor 200 are equally applicable with respect to the second gate element 1100, the second routing and the collection zone of the second conveyor 300 in implementations of the system 100 which include the second conveyor 300. The second gate element 1100 may be selectively moved with respect to the outlet aperture of the second routing, in the same manner as the first gate element 800, so as to fill and subsequently replenish the pool of money items in the collection zone of the second conveyor 300. The system 100 may do this so that the combined number of money items on the track 301 and in the collection zone of the second conveyor 300 remains constant or within a predetermined range. Additionally or alternatively, the system 100 may seek to keep the combined number of money items on the first track 201, on the second track 301 and in the collection zones of the two conveyors 300 constant or within a predetermined range.

Figure 37:
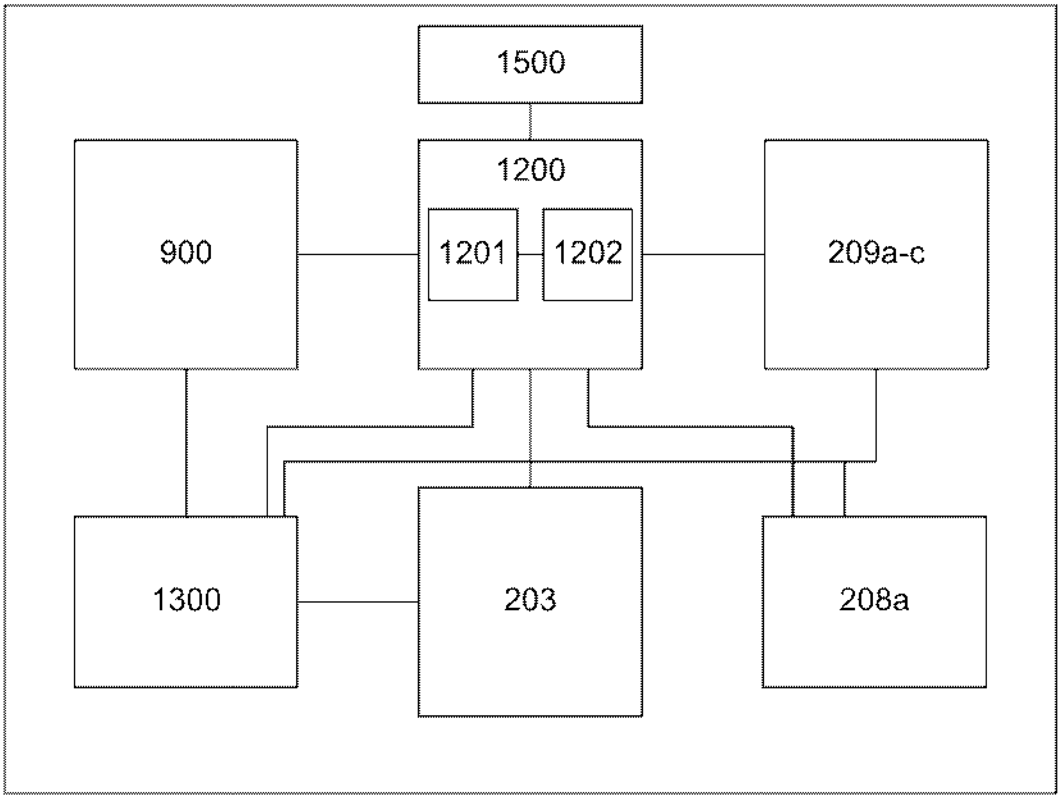
FIG. 37 is a schematic diagram of aspects of a money item handling system.

As outlined above, the functional control of the first and second gate elements 800, 1100, including movement of the gate elements 800, 1100 to the first, second and third flow control positions discussed above, is controlled by the computing apparatus 1200 of the money item handling system 100. This is shown in FIG. 37. For example, the computing apparatus 1200 may cause the actuator 900 mentioned above to rotate the wheel(s) 1001 in the money item storage region 400 of the system 100 to selectively position the first and/or second gate elements 800, 1100 relative to the outlet apertures of the first and second routings. In implementations of the gate elements 800, 1100 which involve a plurality of wheels 1001, as mentioned above, or where, for example, the gate elements 800 are not implemented using a wheel, the first and second gate elements 800, 1001 1100 are moveable independently of one another.

Another set of example operations of a money item handling system is shown in FIG. 36 and described below. In these example operations, the gate element 2000 of the flow control apparatus comprises a money item accommodating region. This is discussed below in the context of the cup 2001 mentioned above. Aside from the specifics of the flow control apparatus, which may be that illustrated in FIGS. 11 to 21, the system 100 may correspond to that illustrated in FIG. 1 either with or without the second conveyor 300.

In a first stage P1, the operations comprise actuating the first gate element 2000 to a position which allows money items to move through the first routing 700 from the storage region 400 to the accommodating region of the gate element 2000. This position may be the first flow control position of the gate element 2000 discussed above. In an optional second stage P2, in implementations of the system which include the second conveyor 300, the operations comprise actuating the second gate element (not shown) to a corresponding position so that money items move through the second routing from the storage region 400 to the accommodating region of the second gate element. Where performed, the second stage P2 may occur simultaneously with the first stage P1. Alternatively, the second stage P2 may occur before or after the first stage P1, or independently of the first stage P1.

In a third stage P3, after a first period of time, the first gate element 2000 may then be actuated to a position which causes the money items in the accommodating region to transfer to the collection zone 207 of the first conveyor 200. This position may be the second flow control position of the gate element 2000 discussed above. In an optional fourth stage P4, in implementations of the system which include the second conveyor 300, the second gate element may also be actuated to a corresponding position, thereby causing the money items in the accommodating region of the second gate element to transfer to the collection zone of the second conveyor 200 300. Where performed, the fourth stage P4 may occur simultaneously with the third stage P3. Alternatively, the fourth stage P4 may occur before or after the third stage P3, or entirely independently of the third stage P3.

In a fifth stage P5, rotation of the first conveyor 200 around its looped path causes money items in the collection zone 207 of the first conveyor 200 to be collected by the articulated conveying elements 202 of the conveyor track 201 and transported around the looped path of the conveyor 200. Further rotation of the conveyor 200 causes more money items to be collected from the collection zone 207. Rotation of the conveyor 200 in the fifth stage P5 may commence before, after or at the same time as the first gate element 2000 is actuated to transfer money items from the accommodating region to the collection zone 207 of the conveyor 200.

Money items on the track 201 of the conveyor 200 are transported to the money item sensing zone 208 of the conveyor path, at which the money items are denominated by the one or more money item sensors 208*a* located adjacent to the track 201. Money items which have been denominated on the track 201 of the first conveyor 200 form part of a first magazine of money items in the system. This first magazine of money items is available to the money item handling system for rapid money item dispensing operations.

In an optional sixth stage P6, in implementations of the system which include the second conveyor 300, rotation of the second conveyor 300 around its looped path causes money items in the collection zone of the second conveyor 300 to be collected by the articulated conveying elements 302 of the conveyor track 301 and transported around the looped path of the conveyor 300. As with the first conveyor 200, further rotation of the second conveyor 300 causes more money items to be collected from the collection zone. Money items on the track 301 of the conveyor 300 are transported to the money item sensing zone of the conveyor path, at which the money items are denominated by the one or more money item sensors located adjacent to the track 301. Money items which have been denominated on the second conveyor track 301 form part of a second magazine of money items in the system. As with the first magazine mentioned above, this second magazine of money items is available to the money item handling system 100 for rapid money item dispensing operations. Where performed, the sixth stage P6 of operations may, for example, occur simultaneously with the fifth stage P5. Alternatively, the sixth stage P6 may occur before or after the fifth stage P5, including independently of the fifth stage P5.

In a seventh stage P7, the operations may comprise actuating the first gate element 2000 back to its first flow control position. This may occur after a further predefined period of time, following actuation of the gate element to the second position referred to above, and may be after the contents of the accommodating region have been tipped or otherwise emptied into the collection zone 207 of the first conveyor 200. Meanwhile, the track 201 of the first conveyor 200 continues to rotate through the first collection zone 207 so as to continue to pick up money items from the first collection zone 207 and convey the money items around the path of the conveyor 200.

In an optional eighth stage P8, in implementations of the system which include the second conveyor 300, the operations may comprise actuating the second gate element to the first flow control position also. Meanwhile, the track 301 of the second conveyor 300 continues to rotate through the second collection zone so as to continue to pick up money items from the second collection zone and convey the money items around the path of the second conveyor 300. The eighth stage P8 may occur simultaneously with the seventh stage P7, or may be offset from the seventh stage P7.

The first to eighth stages P1-P8 may be repeated one or more times as the first and, where present, second gate elements are actuated back and forth between the first and second flow control positions to feed successive groups of money items into the collection zone(s) for pick-up by the conveyor track(s).

In a ninth stage P9, the operations comprise selecting, from the denominated magazine of money items on the first conveyor 200 at least one money item for output from the conveyor 200. Optionally, in implementations of the system which include the second conveyor 300, this stage P9 may also comprise selecting, from the denominated magazine of money items on the second conveyor 300, at least one money item for output from the second conveyor 300. This selection process may comprise assessing all denominated money items on the first conveyor track 201, and optionally also the second conveyor track 301, and selecting individual money items, located on particular conveying elements 202, 302 for output from the conveyor(s) 200, 300. Selection of the money items for output may be made in response to a need to dispense a particular value of money items to an exterior outlet (e.g. a collection region) of the system or, for example, a need to dispense particular denominations or types of money item to the exterior outlet of the system. Alternatively, particular values or denominations of money items may be selected for output to another internal region of the system (e.g. within the system housing 500). Examples of such internal regions of the system, and the manner in which money items may be diverted into such internal/external regions of the system, are discussed above in the context of operational stages P1-P8. That discussion applies equally here also, including for implementations of the system in which the second conveyor 300 and associated system elements such as the second routing and second gate element are not present.

In a tenth stage P10, the selected money item or items are selectively routed off the track(s) 201 of the first conveyor 200 through one or more of the outlet gates 209*a*, 209*b*, 209*c* of the first conveyor 200. For example, once the money item or money items have been selected, the track 201 is rotated until the selected money item(s), and the conveying element(s) 202 on which the selected money item(s) are sitting, are in the money item outlet zone 209 of the conveyor 200 and are aligned with the one or more outlet gates 209*a-c* of the zone 209. The outlet gate(s) 209*a-c* are then selectively opened, as required, in order to route the selected money item(s) off the conveyor track 201.

In implementations of the system in which the second money item conveyor 300 and its associated elements, including the second routing and second money item gate element, are present, the tenth stage P10 operations described above in relation to the first conveyor 200 are carried out with respect to the second conveyor 300 also.

In an optional eleventh stage P11, the operations may comprise dispensing money items from the money item supply apparatus 1500 to an outlet of the system, such as an exterior money item collection region, in response to a demand for money items being determined at the computing apparatus 1200. As described above, the money item supply apparatus 1500 is operable to selectively dispense individual or multiple money items of single or varying denominations, from one or more of the money item storage regions 1502 of the supply apparatus 1500, in order to fulfil a demand for a particular value of money items, or for particular denominations of money items.

As has already been discussed above with respect to the operational steps M1-M10, the first outlet gate 209*a* of either or both of the money item conveyors 200, 300 may, for example, lead directly to the storage region 400 so that money items on the conveyor track(s) 201, 301 can be directed back into the mixed denomination money item storage when required. The second outlet gate 209*b* of either or both of the tracks 201, 301 may lead to a further money item storage region, such as the money item supply apparatus 1500 discussed above or, for example, an external storage chamber. The third outlet gate 209*c* of either or both of the tracks 201, 301 may lead to a money item exit routing, through which money items which have been directed off the conveyor track(s) 201, 301 at the third outlet gate(s) 209*c* are routed to the exterior of the housing 500 for collection by e.g. a person using the system. The location of this third outlet gate 209*c*, which is furthest away from the sensing zone 208, means that a relatively large number of denominated money items may be accommodated on the track(s) 201, 301 in the region between the money item sensor(s) 208*a* and the outlet gate 209*c* through which money items can be directed for external collection. These denominated money items form at least part of the magazines and can be very rapidly and selectively dispensed to the exterior of the housing, as required, when the system determines that there is a need to payout particular values or denominations of money items from the magazine(s).

As money items leave either or both of the track(s) 201, 301 of the first and second conveyors 200, 300, the track(s) 201, 301 may be replenished with further money items from the money item storage region 400. This occurs as the track(s) 201, 301 of the money item conveyor(s) 200, 300 are moved through the collection zones described above. At the collection zones, conveying elements 202, 302 which are empty (i.e. those on which a money item is not present) may collect money items from pools of money items which have moved from the storage region 400, through the first and/or second routings described above, to the collection zone(s). Money items arriving in each collection zone via the first and second routings may rest on a static floor of the collection zone in a position from which they may be physically picked-up by the conveying elements 202, 302. The pool of money items in the collection zone of each conveyor 200, 300 effectively acts as a float from which money items may be sourced by the track(s) 201, 301 of each conveyor 200, 300 in order to prepare for, and complete, future dispensing operations such as those described above with respect to the tenth to twelfth stages P10-P12 of FIG. 36.

The pool of money items in the collection zone of each conveyor 200, 300 may be controlled by selective actuation of the first gate element 2000 and, where present, corresponding second gate element 2000. For example, using the first conveyor 200 for illustration, as outlined above in relation to the operational stages P1-P8, the first gate element 2000 may initially be moved to a position which allows money items to move through the first routing 700 from the storage region 400 into the cup 2001 of the gate element 2000. This position may be the first flow control position of the gate element 2000 discussed above. The gate element 2000 may be held in this orientation for a first time period, for example so as to allow money items the cup 2001 to fill with money items. The first gate element 2000 may then be moved to a position which causes money items in the cup 2001 to transfer into the collection zone 207 of the first conveyor 200. As has been described with respect to FIGS. 11 to 21, this may involve tilting the orientation of the cup 2001 to a second flow control position so as to tip the money items out of the outlet region 2004 of the cup 2001 and into the collection zone 207. After a further period of time, the first gate element 2000 may be actuated back to the first flow control position so as to refill the cup 2001 with money items from the storage region 400.

At a later time, for example after a further period of time, the gate element 2000 may be actuated back in the opposite direction to the second flow control position to restart the flow of money items to the collection zone 207, thereby adding to the float of money items available for collection by the conveyor track 201 as it moves through the collection zone 207. After a still further period of time, the gate element 2000 may be actuated back to the first flow control position to again.

These operational movements of the first gate element 2000 may be repeated in a cycle, in which the orientation of the gate element 2000 is repeatedly changed between the first and second flow control positions shown, for example, in FIGS. 12 and 13 in order to control the flow of money items from the storage region 400 to the collection zone 207 of the first conveyor 200. It will be appreciated that the specific timings between each actuation of the gate element 2000 to the second flow control position may vary from cycle to cycle in order to allow the system to refill the collection zone 207 as required by current conditions in the system. For example, the frequency with which groups of money items are emptied into the collection zone 207 by the conveyor 200 (under the control of the computing apparatus 1200) may be selected based on the rate at which money items in the collection zone 207 are being picked-up and carried away by the conveying elements 202 of the conveyor track 201. During rotation of the track 201, the rate of pick-up will vary depending on the number of empty conveying elements 202 on the track 201, which will in turn depend on the rate at which money items are being routed off the track 201 in the money item outlet zone 209.

As has been described above, the system may, for example, seek to keep the number of money items in the collection zone 207 within a predetermined range—such as 25 to 35 money items. In order to do this, the system 100 may monitor money items leaving the conveyor track 201 via the outlet gate(s) 209*a-c* at the outlet zone 209 and, using the selectively moveable gate element 2000, vary the rate at which replacement money items are fed into the collection zone 207 from the money item storage 400. The system may do this so that the combined number of money items on the track 201 and in the collection zone 207 remains substantially constant or within a predetermined range.

As has been mentioned above, controlling the flow of money items through the first gate element 2000 in this manner can ensure that the total number of money items present in the collection zone 207 at any one particular time does not reach an undesirably high level. In particular, the limited number of money items dispensed by the gate element 2000 each time it is moved to the second flow control position prevents the pool of money items in the collection zone 207 from placing too high a load on the moving conveyor track 201 as it passes through the collection zone 207. Instead, the load placed on the conveyor 200 is managed at a level which keeps the operation of the conveyor efficient (e.g. from a power perspective) and which prevents a high rate of wear on the drive actuators and other mechanical components of the track 201. Furthermore, the possibility of the conveyor track 201 being jammed by money items in the collection zone 207 is reduced and the probability of money items being successfully picked up by empty conveying elements 202 moving through the collection zone 207 is increased.

In order to fill the conveyor track 201 from a state in which it is empty or substantially empty of money items, the first gate element may be repeatedly actuated back and forth. During such a cycle, the duration of time for which the gate element 2000 is held in the first flow control position, before being actuated again to allow more money items to enter the collection zone 207, is selected so as to allow at least a majority of the money items previously metered into the collection zone 207 to be collected by the moving conveyor track 201. This 'closed' time duration may be pre-stored in memory of the computing apparatus 1200, or may be actively determined in the system by assessing, at the sensing region 208, whether the rotating conveyor track 201 is still picking up new money items from the collection zone 207. If no new money items are being sensed at the sensing zone 208 (e.g. since the last full rotation of the track 201), this indicates that the number of money items in the collection zone 207 is low or zero. In response to such an indication, the gate element 2000 may be re-actuated to an open or partially open position to allow more money items to enter the collection zone 207. As has been mentioned above, the conveyor-filling process may cease upon it being detected, based on data from the sensors in the sensing zone 208, that at least a threshold proportion of the conveying elements 202 on the track 201 are occupied by money items collected from the collection zone 207.

The system may adjust the distribution of money items on the conveyor track 201 by selectively directing individual money items on the track 201 back into the money item storage region 400 via the appropriate gate 209*a* in the outlet zone 209, as discussed above. This action frees-up one or more individual conveying elements of the track 201 so that they may collect further money items from the collection zone 207 as the track 201 is rotated. If data from the sensing zone 208 indicates that no further money items have been collected by rotation of the track 201, the system actuates the first gate element 2000 to facilitate a flow of further money items into the collection zone 207.

By selectively retaining certain money items on the conveyor track 201, such as certain denominations of money item, whilst directing others back into the storage region 400, the system is able to assemble on the track 201 a range of money items in accordance with particular parameters (e.g. so as to include at least one money item of each of multiple denominations initially present in the storage region 400 or system 100 as a whole), with the same benefits as those already mentioned above. When money items are dispensed off the track 201, the track 201 may be empty conveying elements 202 on the track 201 may be refilled by further actuation of the gate element 2000.

The discussion above with respect to the first gate element 2000, the first routing 700 and the collection zone 207 of the first conveyor 200 are equally applicable with respect to the second gate element, the second routing and the collection zone of the second conveyor 300 in implementations of the system which include the second conveyor 300.

As outlined above, the actuation of the gate element(s) 2000, is controlled by the computing apparatus 1200 of the money item handling system.

For all implementations of the flow control apparatus, the computing apparatus 1200 also selectively controls movement of the tracks 201, 301 of the first and second conveyors 200, 300, for example in order to cause the conveyor tracks 201, 301 to pick-up further money items from the collection zones and/or to move money items which have been selected for output into positions from which they may be routed off the conveyor tracks 201, 301 in the outlet zones of the conveyors 200, 300. As discussed above, this may involve causing the electrical motors 203 positioned adjacent to the first and second conveyor tracks 201, 301 to rotate the tracks 201, 301 around their looped paths.

The computing apparatus 1200 may also control other aspects of the money item handling system 100, such as the outlet gates 209*a-c* at each conveyor 200, 300. In particular, the computing apparatus 1200 may cause actuators of the outlet gates 209*a-c* to selectively actuate the gates 209*a-c* to open positions when money items are to be diverted off the conveying tracks 201, 301 through the gates 209*a-c*. The actuators will then return the gates 209*a-c* to a closed position.

As shown in FIG. 37, the computing apparatus 1200 may be communicatively coupled to a power supply 1300 of the system 100. The power supply 1300 facilitates movement and control of the flow control apparatus, including the rotatable apparatuses 1000, 3000 discussed above, conveyors 200, 300, the output gates 209*a-c* and other elements of the system 100, as required by the computing apparatus 1200.

The computing apparatus 1200 comprises at least one computer processor 1201 and at least one computer memory 1202. The processor 1201 executes computer-readable instructions stored in the memory 1202 to cause the movement and functional control of the system 100, including that of the elements specifically mentioned above. For the avoidance of doubt, the computing apparatus 1200 may include a single processor or may comprise one or more architectures employing multiple processor designs for increased computing capability.

The computer memory 1202 may comprise, for example, one or more read-only memories (ROMs), random access memories (RAMs), EPROMs, EEPROMs, Flash memories, magnetic or optical cards or application specific integrated circuits (ASICs). Additionally or alternatively, the computer memory 1202 may comprise any type of storage disk, such as one or more floppy disks, optical disks, CD-ROMs and/or magnetic-optical disks, or any other type of media suitable for storing electronic instructions which can be executed by the processor 1201. The memory 1202 is coupled to the processor 1201 and other elements of the computing apparatus architecture via a computer system bus. The processor 1201 is configured to implement the instructions under the control of the computer-readable instructions to operate the system 100.

As previously explained, money items which are collected by the conveyor tracks 201, 301 are denominated in the money item sensing zones 208 of the conveyors 200, 300 so that, once a money item on either track 201, 301 has passed the sensing zone 208 at least once, its denomination and position on the track 201, 301 is known to the system 100. Once money items have passed the sensing zone 208, the denomination and position of each money item on the tracks 201, 301 may, for example, be stored in a memory of the system 100 to create the magazines referred to above.

It will be appreciated that there are various modifications and adaptations that can be made to the specific aspects of the system 100 described above. For example, the money item storage region 400 may comprise first and second money item storage sub regions so that a sub region is provided for each of the first and second conveyors 200, 300 and its associated routing. These sub regions may each be in the form of a money item storage container. In such a system 100, money items fed to the first conveyor 200 come from a first storage container and money items fed to the second conveyor 300 come from a second storage container. The first and second storage containers are physically divided from one another. For example, the storage containers may be separated from one another by an internal partition in a central region of a larger container of the type illustrated in FIG. 22. A sub region arrangement of this type allows different denominations and/or types of money items to be consistently fed to each conveyor 200, 300. For example, the first container might contain money items of first to third denominations and/or types whilst the second container might contain different money items such as money items of fourth to sixth denominations and/or types. The containers may be supplied with such denominations via separate channels, either as part of a bulk-fill operation or from the gates 209*a-c* of the first and second conveyors following denomination in the conveyor sensing regions 208.

In a system in which the money item storage region 400 is provided by separate first and second storage containers, as outlined above, there may also be more than one rotatable apparatus to control the flow of money items from the storage region 400 to the first and second conveyors 200, 300. For example, a first wheel may be provided inside the first container to control a flow of money items through a first routing from the first container to the first conveyor, whilst a second wheel may be provided inside the second container to control a flow of money items through a second routing from the second container to the second conveyor. Each of these wheels may comprise a gate element of the type discussed above with respect to FIGS. 7-10, except without a corresponding gate element on the other side of the wheel. Alternatively, the wheel may comprise a gate element of the type discussed above with respect to FIGS. 11-21. As discussed above, other implementations of the gate elements are possible. The gate elements are controllable independently of one another, either via separate rotatable apparatuses as mentioned above or via other suitable implementations such as sliding doors.

The aspects described above may be used either singly or in combination. For example, the flow control apparatus, including the rotatable apparatuses 1000, 3000 explained above, is not inextricably linked to all other aspects of the particular money item handling system 100 shown in the figures and described above. In this specification, the term "money items" refers, for example, to coins or other tokens of a monetary value.

The specification includes the following examples:

A money item handling system, comprising:

a mixed denomination money item storage region comprising at least one money item outlet routing;

at least one money item collection zone arranged to receive mixed denomination money items outlet through the at least one money item outlet routing;

at least one money item conveyor arranged to collect money items from the at least one money item collection zone and to convey money items collected from the at least one money item collection zone around a path of the at least one money item conveyor;

at least one money item flow control apparatus; and at least one actuator configured to controllably actuate the at least one money item flow control apparatus to selectively control movement of money items from the mixed denomination money item storage region to the at least one money item collection zone.

2. The money item handling system of example 1, wherein the at least one flow control apparatus comprises at least one gate element having a money item accommodating region configured to receive money items via the at least one money item outlet routing.

3. The money item handling system of example 2, wherein in a first orientation the money item accommodating region is configured to retain money items inside the at least one gate element and wherein in a second orientation the money item accommodating region is configured to release the money items to the at least one money item conveyor.

4. The money item handling system of example 3, wherein in the first orientation retaining walls of the at least one gate element are arranged to allow money items to enter the accommodating region from the money item storage region but to prevent money items from leaving the accommodating region for the at least one money item conveyor.

5. The money item handling system of example 3 or 4, wherein in the second orientation retaining walls of the at least one gate element are arranged to prevent money items from entering the accommodating region from the money item storage region but to allow money items to leave the accommodating region for the at least one money item conveyor.

6. The system of any of examples 3-5, wherein the gate element comprises a step in an outer retaining wall, and wherein a first narrower part of the accommodating region is separated from a second wider part of the accommodating region by the step.

7. The system of example 6, wherein the second wider part of the accommodating region comprises a money item outlet region via which money items leave the second wider part of the accommodating region for the at least one money item conveyor.

8. The system of example 6 or 7, wherein the outer retaining wall in the narrower part of the accommodating region is configured to restrict money item access to the narrower part of the accommodating region from the mixed denomination money item storage region.

9. The system of any of examples 3-8, wherein the gate element comprises a helically formed inner retaining wall.

10. The system of example 9, wherein the helically formed inner retaining wall is arranged to open out space for money items in the mixed denomination money item storage region upon movement of the accommodating region from the first orientation to the second orientation.

11. The system of example 9 or 10, wherein the helically formed inner retaining wall is arranged to disrupt money items in the mixed denomination money item storage region upon movement of the accommodating region from the second orientation to the first orientation.

12. The system of example 11, wherein the disruption of the money items in the mixed denomination money item storage region by the helically formed inner retaining wall causes a flow of money items from the mixed denomination money item storage region to the accommodating region in the first orientation.

13. The system of any of examples 2-12, wherein the money item accommodating region comprises a cup in the at least one gate element.

14. The money item handling system of example 1, wherein:

- the at least one money item flow control apparatus comprises at least one gate element which is selectively alignable with the at least one money item outlet routing; and
- the at least one actuator is configured to controllably move the at least one gate element to selectively vary a degree of alignment between the at least one gate element and the at least one money item outlet routing to thereby selectively control movement of money items from the mixed denomination money item storage region through the at least one money item outlet routing to the at least one money item collection zone.

15. The money item handling system of example 14, wherein the at least one gate element is selectively moveable relative to the at least one money item outlet routing to selectively open and close the at least one outlet routing.

16. The money item handling system of example 14 or 15, wherein the at least one gate element is selectively moveable to a plurality of flow control positions relative to the at least one money item outlet routing, including at least one of:

- a first flow control position in which the at least one gate element fully blocks the at least one outlet routing and prevents money items from moving past the at least one gate element to the at least one money item collection zone;
- a second flow control position in which the at least one gate element partially blocks the at least one outlet routing but allows a restricted flow of money items past the at least one gate element to the at least one money item collection zone; and
- a third flow control position in which the at least one gate element does not block the at least one outlet routing and thereby allows a full flow of money items past the at least one gate element to the at least one money item collection zone.

17. The money item handling system of any of examples 2-16, comprising a rotatable apparatus configured to receive money items from the at least one money item storage region, wherein the rotatable apparatus comprises the at least one gate element.

18. The money item handling system of example 17, wherein the at least one gate element comprises at least a section of a first side wall region of the rotatable apparatus to prevent money items from moving out of a plane of the rotatable apparatus.

19. The money item handling system of example 17 or 18, wherein rotation of the rotatable apparatus by the at least one actuator causes the at least one gate element to move relative to the at least one outlet routing to selectively align and not align the at least one gate element with the at least one outlet routing.

20. The money item handling system of example 19, wherein when the at least one gate element is aligned with the at least one outlet routing money items in the rotatable apparatus are prevented by the at least one gate element from moving through the at least one outlet routing.

21. The money item handling system of example 20, wherein when the at least one gate element is not aligned with the at least one outlet routing money items in the rotatable apparatus are not prevented from moving through the at least one outlet routing.

22. The money item handling system of any of examples 17-21, wherein the rotatable apparatus is configured to rotate in a plane different from a plane of rotation of the at least one money item conveyor.

23. The money item handling system of example 22, wherein the plane of the rotatable apparatus is parallel to the plane of the at least one money item conveyor.

24. The money item handling system of any preceding example, wherein the money item storage region is located adjacent to the at least one money item conveyor.

25. The money item handling system of any preceding example, wherein the at least one actuator comprises a motor-driven actuator.

26. The money item handling system of any preceding example, comprising:

- at least one money item sensor configured to denominate money items in the system; and
- at least one money item supply apparatus arranged to receive money items denominated by the at least one money item sensor;
- wherein the system is configured to sort money items denominated by the at least one money item sensor into a plurality of money item storage regions of the at least one money item supply apparatus.

27. The money item handling system of example 26, wherein the at least one money item sensor is configured to denominate money items on the at least one money item conveyor as the money items collected from the at least one money item collection zone are conveyed around the path of the at least one money item conveyor.

28. The money item handling system of example 27, wherein the at least one money item sensor is positioned in a money item sensing zone of the at least one money item conveyor.

29. The money item handling system of any of examples 26-28, comprising at least one money item outlet gate configured to selectively divert money items denominated by the at least one money item sensor into the at least one money item supply apparatus.

30. The money item handling system of example 29, wherein the at least one money item outlet gate is positioned in a money item outlet zone of the at least one money item conveyor.

31. The money item handling system of any of examples 26-30, wherein the system is configured to sort individual money items denominated by the at least one money item sensor into different ones of the plurality of money item storage regions of the at least one money item supply apparatus in dependence of the denominations of the individual money items.

32. The money item handling system of any of examples 26-31, wherein each of the plurality of money item storage regions of the at least one money item supply apparatus is a single denomination money item storage region.

33. The money item handling system of any of examples 26-32, wherein the plurality of storage regions of the at least one money item supply apparatus each comprise a money item compartment to accommodate a plurality of money items of the same denomination.

34. The money item handling system of any of examples 26-32, wherein the plurality of storage regions of the at least one money item supply apparatus each comprise a money item compartment to accommodate a single money item only.

35. The money item handling system of any of examples 26-34, wherein the at least one money item supply apparatus comprises at least one money item releasor operable to selectively release money items from at least one of the plurality of money item storage regions of the at least one money item supply apparatus.

36. The money item handling system of example 35, wherein the at least one money item releasor is operable to selectively and individually release money items from each of the plurality of money item storage regions of the at least one money item supply apparatus.

37. The money item handling system of any of examples 26-36, wherein the system is arranged to dispense money items released from the at least one money item supply apparatus to a money item collection region accessible from the exterior of the apparatus.

38. The money item handling system of any of examples 26-37, wherein the at least one money item supply apparatus is operable to selectively release particular denominations of money items from the plurality of money item storage regions in response to a demand for the particular denominations of money items.

39. The money item handling system of any of examples 26-38, wherein the at least one money item supply apparatus is operable to selectively release particular denominations of money items from the plurality of money item storage regions in response to a demand for a particular value of money items.

40. A method of operating a money item handling system, comprising:

actuating at least one money item flow control apparatus to feed, from a mixed denomination money item storage region, money items to a collection zone of a money item conveyor via a first money item outlet routing between the mixed denomination money item storage region and the money item conveyor;

conveying, on the money item conveyor, a plurality of money items from the collection zone to at least one money item sensor;

denominating, at the at least one money item sensor, the plurality of money items;

selecting, from the denominated money items on the conveyor, at least one money item for output from the money item conveyor;

routing, in a money item outlet zone of the money item conveyor, the selected at least one money item off the money item conveyor.

41. The method of example 40, wherein the at least one money item flow control apparatus comprises at least one gate element.

42. The method of example 41, wherein the at least one gate element comprises a money item accommodating region configured to receive money items via the at least one money item outlet routing.

43. The method of example 42, comprising:

actuating the at least one gate element to a first orientation in which the money item accommodating region is arranged to retain money items inside the at least one gate element; and actuating the at least one gate element to a second orientation in which the money item accommodating region is configured to release the money items to the money item conveyor.

44. The method of example 43, comprising:

following actuation of the at least one gate element to the second orientation, actuating the at least one gate element back to the first orientation.

45. The method of example 43 or 44, wherein in the first orientation retaining walls of the at least one gate element are arranged to allow money items to enter the accommodating region from the money item storage region but to prevent money items from leaving the accommodating region for the money item conveyor.

46. The method of any of examples 43-45, wherein in the second orientation retaining walls of the at least one gate element are arranged to prevent money items from entering the accommodating region from the money item storage region but to allow money items to leave the accommodating region for the money item conveyor.

47. The method of example 41, comprising selectively moving the at least one gate element relative to the first money item outlet routing to selectively open and close the first money item outlet routing.

48. The method of example 41 or 47, wherein the at least one gate element is selectively moveable to a plurality of flow control positions relative to the first money item outlet routing, including at least one of:

a first flow control position in which the at least one gate element fully blocks the first outlet routing and prevents money items from moving past the at least one gate element to the at least one money item collection zone;

a second flow control position in which the at least one gate element partially blocks the first outlet routing but allows a restricted flow of money items past the at least one gate element to the at least one money item collection zone; and a third flow control position in which the at least one gate element does not block the first outlet routing and thereby allows a full flow of money items past the at least one gate element to the at least one money item collection zone.

49. The method of any of examples 40-49, comprising:
actuating the at least one money item flow control apparatus to stop feeding, from the mixed denomination money item storage region, money items to the collection zone of the money item conveyor via the first routing.

50. The method of example 49, wherein actuating the at least one money item flow control apparatus to stop feeding money items to the collection zone of the money item conveyor occurs a predetermined period of time after actuating the at least one money item flow control apparatus to feed, from the mixed denomination money item storage region, money items to the collection zone of the money item conveyor.

51. The method of example 49, wherein actuating the at least one money item flow control apparatus to stop feeding money items to the collection zone of the money item conveyor occurs in response to a determination, by the system, that no further money items are required in the money item collection zone.

52. The method of example 51, comprising determining, using the at least one money item sensor, that the money item conveyor comprises a plurality of money items of predetermined denominations.

53. The method of example 52, comprising determining that no further money items are required in the money item collection zone in response to the determination that the money item conveyor comprises a plurality of money items of predetermined denominations.

54. The method of any of examples 40-53, wherein actuating the at least one money item flow control apparatus to feed, from the mixed denomination money item storage region, money items to the collection zone of the money item conveyor occurs in response to a determination, by the system, that further money items are required in the money item collection zone.

55. The method of example 54, comprising determining, using the at least one money item sensor, that the money item conveyor does not comprise a plurality of money items of predetermined denominations.

56. The method of example 55, comprising determining that further money items are required in the money item collection zone in response to the determination that the money item conveyor does not comprises the plurality of money items of predetermined denominations.

57. The method of any of examples 40-56, wherein routing, in the money item outlet zone of the money item conveyor, the selected at least one money item off the money item conveyor comprises routing the selected at least one money item to a money item supply apparatus of the system.

58. The method of example 57, wherein the money item supply apparatus comprises a plurality of money item storage regions.

59. The method of example 58, wherein routing the selected at least one money item to a money item supply apparatus of the system comprises routing the selected at least one money item to a particular one of the plurality of money item storage regions of the money item supply apparatus.

60. The method of example 59, wherein the particular one of the plurality of money item storage regions is selected for the selected at least one money item on the basis that the denomination of the selected at least one money item matches the denomination associated with the particular one of the plurality of money item storage regions.

61. The method of any of examples 57-60, comprising dispensing, in response to a demand for money items, at least one money item from the money item supply apparatus.

62. The method of example 61, wherein the demand for money items is a demand for money items to be paid to a money item collection region at an exterior of the system and dispensing the at least one money item comprises dispensing the at least one money item to the money item collection region.

63. The method of any of examples 40-62, wherein routing, in the money item outlet zone of the money item conveyor, the selected at least one money item off the money item conveyor comprises routing the selected at least one money item to the mixed denomination money item storage region.

64. The method of any of examples 40-63, wherein routing, in the money item outlet zone of the money item conveyor, the selected at least one money item off the money item conveyor comprises routing the selected at least one money item directly to a money item collection region at an exterior of the system.

65. The method of any of examples 40-62, wherein routing, in the money item outlet zone of the money item conveyor, the selected at least one money item off the money item conveyor comprises routing the selected at least one money item directly to the collection zone of the money item conveyor.

66. The method of example 65, wherein routing the selected at least one money item directly to the collection zone of the money item conveyor occurs in response to a determination that a denomination of the at least one money item should be retained outside of the mixed denomination money item storage region.

67. A money item handling system, comprising:
a money item storage region;
a money item feed in which at least one money item routing is arranged to feed money items out of the money item storage region;
a rotatable apparatus comprising at least one gate element; and
at least one actuator configured to controllably rotate the rotatable apparatus between at least first and second flow control positions to control movement of money items from the money item storage region through the at least one money item routing.

68. The money item handling system of example 67, wherein the at least one gate element comprises a money item accommodating region configured to receive money items via the at least one money item outlet routing.

69. The money item handling system of example 68, wherein the money item accommodating region comprises a cup in the at least one gate element.

70. The money item handling system of example 67 or 68, wherein the first flow control position corresponds to a first orientation of the money item accommodating region in which the money item accommodating region is configured to retain money items received from the money item storage region.

71. The money item handling system of example 70, wherein the second flow control position corresponds to a second orientation the money item accommodating region in which the money item accommodating region is configured to release the money items.

72. The money item handling system of example 71, wherein in the first orientation retaining walls of the at least one gate element are arranged to allow money items to enter the accommodating region from the money item storage region but to prevent money items from leaving the accommodating region.

73. The money item handling system of example 71 or 72, wherein in the second orientation retaining walls of the at least one gate element are arranged to prevent money items from entering the accommodating region from the money item storage region but to allow money items to leave the accommodating region.

74. The money item handling system of any of examples 70-73, wherein:

the at least one actuator is configured to actuate the at least one gate element to the first orientation in which the money item accommodating region is arranged to retain money items; and subsequently, the at least one actuator is configured to actuate the at least one gate element to the second orientation in which the money item accommodating region is configured to release the money items.

75. The money item handling system of example 74, wherein:

following actuation of the at least one gate element to the second orientation, the at least one actuator is configured to actuate the at least one gate element back to the first orientation to receive, from the money item storage region, further money items in the accommodating region.

76. The money item handling system of any of examples 70-75, wherein:

the at least one actuator is configured to controllably rotate the rotatable apparatus to selectively align an inner retaining wall of the at least one gate element with the at least one money item routing to prevent movement of money items through the at least one money item routing; and the at least one actuator is further configured to controllably rotate the rotatable apparatus to selectively misalign the inner retaining wall of the at least one gate element with the at least one money item routing to permit movement of money items through the at least one money item routing.

77. The money item handling system of any of examples 70-76, wherein:

the at least one actuator is configured to controllably rotate the rotatable apparatus to selectively tip the accommodating region to cause money items in the accommodating region to fall out of the accommodating region.

78. The money item handling system of any of examples 67-77, comprising:

a first money item conveyor and a first money item collection zone associated with the first money item conveyor, wherein money items which move out of the money item storage region through the at least one money item routing are collected from the first money item collection zone by the first money item conveyor.

79. The system of example 78, wherein the plane of rotation of the rotatable apparatus is substantially parallel with a plane of rotation of the first money item conveyor.

80. The system of any of examples 67-79, wherein the at least one money item routing is located out of the plane of rotation of the rotatable apparatus.

81. A money item handling system, comprising:

a first money item conveyor configured to rotate in a first plane;

at least one first money item sensor configured to denominate money items on the first conveyor;

a second money item conveyor configured to rotate in a second plane different to the first plane;

at least one second money item sensor configured to denominate money items on the second conveyor;

a money item storage region; and a money item feed in which a first routing feeds money items from the money item storage region to the first money item conveyor and a second routing feeds money items from the money item storage region to the second money item conveyor.

82. The system of example 81, wherein the first plane is parallel to the second plane.

83. The system of example 81 or 82, comprising a first money item collection zone arranged to receive money items from the money item storage region via the first routing, and a second money item collection zone arranged to receive money items from the money item storage region via the second routing.

84. The system of example 83, wherein the first conveyor is configured to collect and convey money items from the first money item collection zone and the second conveyor is configured to collect and convey money items from the second money item collection zone.

85. The system of example 83 or 84, wherein the first routing comprises a first guide surface which is angled downwards towards the first collection zone to cause money items to move down the first guide surface towards the first money item conveyor.

86. The system of example 85, wherein the second routing comprises a second guide surface which is angled downwards towards the second collection zone to cause money items to move down the second guide surface towards the second money item conveyor.

87. The system of example 86, wherein the first and second guide surfaces are located at a base of the money item storage region.

88. The system of example 87, wherein a junction between the first and second guide surfaces forms a ridge in the base of the money item storage region.

89. The system of any of examples 81-88, wherein the first routing comprise at least one first outlet aperture on a first side of the money item storage region and the second routing comprises at least one second outlet aperture on a second side of the money item storage region.

90. The system of example 89, wherein the first side of the storage region is opposite to the second side of the storage region.

91. The system of example 89 or 90, wherein the at least one first outlet aperture is of a first shape and size, and the at least one second outlet aperture is of a different second shape and size to the at least one first outlet aperture.

92. The system of any of examples 81-91, wherein the money item storage region comprises a first sub-region and a second sub-region physically divided from the first sub region to prevent money items moving directly between the first and second sub-regions.

93. The system of example 92, wherein the first routing feeds money items to the first money item conveyor from the first-sub region and the second routing feeds money items to the second money item conveyor from the second sub-region.

94. The system of example 92 or 93, wherein the first sub-region is located closer to the first money item conveyor on a first side of the money item storage region and the second sub region is located closer to the second money item conveyor on a second side of the money item storage region.

95. The system of any of examples 81-94, wherein the first money item conveyor and the second money item conveyor are each endless loop conveyors comprising a track of articulated money item conveying elements.

96. The system of any of examples 81-95, comprising at least one first money item outlet gate configured to selectively open to direct money items off the first money item conveyor into at least one first outlet path of the system.

97. The system of example 96, wherein the at least one first money item outlet gate is located, in a direction of rotation of the first money item conveyor, at a location of the first money item conveyor which is past the at least one first money item sensor.

98. The system of example 96 or 97, comprising at least one second money item outlet gate configured to selectively open to direct money items off the second money item conveyor into at least one second outlet path of the system.

99. The system of example 98, wherein the at least one second money item outlet gate is located, in a direction of rotation of the second money item conveyor, at a location of the second money item conveyor which is past the at least one second money item sensor.

100. The system of any of examples 81-99, comprising a bulk money item feed apparatus configured to feed money items deposited in the bulk feed apparatus from an exterior of the system to the money item storage region.

101. The system of any of examples 81-100, comprising:

a first money item flow control apparatus to selectively control movement of money items via the first routing to the first money item conveyor; and/or a second money item flow control apparatus to selectively control movement of money items via the second routing to the second money item conveyor.

102. The system of example 101, wherein:

- the first money item flow control apparatus comprises a first gate element which is selectively moveable relative to the first routing to selectively open and close the first routing to control movement of money items via the first routing to the first money item conveyor; and/or
- the second money item flow control apparatus comprises a second gate element which is selectively moveable relative to the second routing to selectively open and close the first routing to control movement of money items via the second routing to the second money item conveyor.

103. The system of example 102, wherein the first gate element is selectively moveable to a plurality of flow control positions relative to the first routing, including at least one of:

- a first flow control position in which the first gate element fully blocks the first routing and prevents money items from moving past the first gate element to the first money item conveyor;
- a second flow control position in which the first gate element partially blocks the first routing but allows a restricted flow of money items past the first gate element to the first money item conveyor; and
- a third flow control position in which the first gate element does not block the first routing and thereby allows a full flow of money items past the first gate element to the first money item conveyor.

104. The system of example 102 or 103, wherein the second gate element is selectively moveable to a plurality of flow control positions relative to the second routing, including at least one of:

- a first flow control position in which the second gate element fully blocks the second routing and prevents money items from moving past the second gate element to the second money item conveyor;
- a second flow control position in which the second gate element partially blocks the second routing but allows a restricted flow of money items past the second gate element to the second money item conveyor; and
- a third flow control position in which the second gate element does not block the second routing and thereby allows a full flow of money items past the second gate element to the second money item conveyor.

105. The system of example 102, wherein the first gate element comprises a money item accommodating region configured to receive money items via the first routing, wherein in a first orientation the money item accommodating region is configured to retain money items inside the gate element and wherein in a second orientation the money item accommodating region is configured to release the money items to the first conveyor.

106. The system of example 105, wherein in the first orientation retaining walls of the first gate element are arranged to allow money items to enter the accommodating region from the money item storage region but to prevent money items from leaving the accommodating region for the first conveyor.

107. The system of example 105 or 106, wherein in the second orientation retaining walls of the first gate element are arranged to prevent money items from entering the accommodating region from the money item storage region but to allow money items to leave the accommodating region for the first conveyor.

108. The system of any of examples 105-107, wherein the money item accommodating region comprises a cup in the first gate element.

109. The system of any of examples 102-108, comprising at least one actuator to controllably actuate movement of the first gate element relative to the first routing and/or the second gate element relative to the second routing.

110. The system of example 109, wherein the at least one actuator comprises a motor-driven actuator.

111. The system of any of examples 102-110, comprising a rotatable apparatus configured to receive money items from the money item storage region and comprising at least the first gate element.

112. The system of example 111, wherein the first gate element comprises at least a section of a first side wall region of the rotatable apparatus to prevent money items from moving out of a plane of the rotatable apparatus.

113. The system of example 111 or 112, wherein rotation of the rotatable apparatus by the at least one actuator causes the first gate element to move relative to the first routing to selectively align and not align the first gate element with the first routing.

114. The system of example 113, wherein when the first gate element is aligned with the first routing money items in the rotatable apparatus are prevented by the first gate element from moving through the first routing.

115. The system of example 114, wherein when the first gate element is not aligned with the first routing money items in the rotatable apparatus are not prevented from moving through the first routing.

116. The system of any of examples 111-115, wherein the rotatable apparatus comprises the second gate element.

117. The system of example 116, wherein the second gate element comprises at least a section of a second side wall region of the rotatable apparatus to prevent money items from moving out of a plane of the rotatable apparatus.

118. The system of example 116 or 117, wherein rotation of the rotatable apparatus by the at least one actuator causes the second gate element to move relative to the second routing to selectively align and not align the second gate element with the second routing.

119. The system of example 118, wherein when the second gate element is aligned with the second routing money items in the rotatable apparatus are prevented by the second gate element from moving through the second routing.

120. The system of example 119, wherein when the second gate element is not aligned with the second routing money items in the rotatable apparatus are not prevented from moving through the second routing.

121. The system of any of examples 111-120, wherein the rotatable apparatus is configured to rotate in a third plane different from the first and second planes.

122. The system of example 121, wherein the third plane is parallel to the first and second planes.

123. The system of any of examples 81-122, wherein the money item storage region is located at least partially between the first money item conveyor and the second money item conveyor.

124. A method of operating a money item handling system, comprising:

- feeding, from a money item storage region, a first plurality of money items to a first conveyor via a first routing between the money item storage region and the first conveyor, wherein the first money item conveyor is configured to rotate in a first plane;
- feeding, from the money item storage region, a second plurality of money items to a second conveyor via a second routing between the money item storage region and the second conveyor, wherein the second money item conveyor is configured to rotate in a second plane different from the first plane;
- conveying the first plurality of money items on the first conveyor to at least one first money item sensor and denominating the first plurality of money items at the at least one first money item sensor to create a first magazine of denominated money items on the first conveyor;
- conveying the second plurality of money items on the second conveyor to at least one second money item sensor and denominating the second plurality of money items at the at least one second money item sensor to create a second magazine of denominated money items on the second conveyor;
- selecting, from a combination of the first and second magazines of denominated money items on the first and second conveyors, at least one money item for output; and
- outputting the selected at least one money item from the money item handling system.

125. The method of example 124, wherein conveying the first plurality of money items on the first conveyor to the at least one first money item sensor comprises collecting the first plurality of money items from a money item collection zone of the first conveyor.

126. The method of example 124 or 125, wherein conveying the second plurality of money items on the second conveyor to the at least one second money item sensor comprises collecting the second plurality of money items from a money item collection zone of the second conveyor.

127. The method of any of examples 124-126, wherein the first plane is parallel to the second plane.

128. The method of any of examples 124-127, wherein feeding the first plurality of money items to the first conveyor via the first routing comprises selectively actuating at least one first money item flow control apparatus.

129. The method of example 128, comprising determining parameters for a distribution of money items in the first magazine, and selectively actuating the at least one first money item flow control apparatus to selectively feed money items to the first conveyor in response to determining that the money items in the first magazine are not in accordance with the determined parameters.

130. The method of example 129, comprising selectively actuating the at least one first money item flow control apparatus to selectively stop feeding money items to the first conveyor in response to determining that the money items in the first magazine are in accordance with the determined parameters.

131. The method of example 128, wherein:

- the at least one first money item flow control apparatus comprises at least one first gate element; and
- feeding the first plurality of money items to the first conveyor via the first routing comprises selectively actuating the at least one first gate element to selectively open the first routing.

132. The method of example 131, comprising selectively actuating the at least one first gate element to selectively close the first routing and thereby prevent money items from being fed to the first conveyor via the first routing.

133. The method of example 131 or 132, wherein the first routing comprises an outlet aperture and wherein actuating the at least one first gate element comprises moving the at least one first gate element relative to the outlet aperture.

134. The method of any of examples 131-133, comprising determining parameters for a distribution of money items in the first magazine, and selectively actuating the at least one first gate element to selectively open the first routing in response to determining that the money items in the first magazine are not in accordance with the determined parameters.

135. The method of example 134, comprising selectively actuating the at least one first gate element to selectively close the first routing in response to determining that the money items in the first magazine are in accordance with the determined parameters.

136. The method of any of examples 131-135, comprising determining parameters for a distribution of money items across a combination of the first and second magazines, and selectively actuating the at least one first gate element to selectively open the first routing in response to determining that a combination of the money items in the first and second magazines is not in accordance with the determined parameters.

137. The method of example 136, comprising selectively actuating the at least one first gate element to selectively close the first routing in response to determining that the money items in the combination of the money items in the first and second magazines is in accordance with the determined parameters.

138. The method of any of examples 134-137, wherein feeding the second plurality of money items to the second conveyor via the second routing comprises selectively actuating at least one second money item flow control apparatus.

139. The method of example 138, comprising determining parameters for a distribution of money items in the second magazine, and selectively actuating the at least one second money item flow control apparatus to selectively feed money items to the second conveyor in response to determining that the money items in the second magazine are not in accordance with the determined parameters.

140. The method of example 139, comprising selectively actuating the at least one second money item flow control apparatus to selectively stop feeding money items to the second conveyor in response to determining that the money items in the second magazine are in accordance with the determined parameters.

141. The method of example 138, wherein:

the at least one second money item flow control apparatus comprises at least one second gate element; and feeding the second plurality of money items to the second conveyor via the second routing comprises selectively actuating the at least one second gate element to selectively open the second routing.

142. The method of example 141, comprising selectively actuating the at least one second gate element to selectively close the second routing and thereby prevent money items from being fed to the second conveyor via the second routing.

143. The method of example 141 or 142, wherein the second routing comprises an outlet aperture and wherein actuating the at least one second gate element comprises moving the at least one second gate element relative to the outlet aperture.

144. The method of any of examples 141-143, comprising determining parameters for a distribution of money items in the second magazine, and selectively actuating the at least one second gate element to selectively open the second routing in response to determining that the money items in the second magazine are not in accordance with the determined parameters.

145. The method of example 144, comprising selectively actuating the at least one second gate element to selectively close the second routing in response to determining that the money items in the second magazine are in accordance with the determined parameters.

146. The method of any of examples 141-143, comprising determining parameters for a distribution of money items across a combination of the first and second magazines, and selectively actuating the at least one second gate element to selectively open the second routing in response to determining that a combination of the money items in the first and second magazines is not in accordance with the determined parameters.

147. The method of example 146, comprising selectively actuating the at least one second gate element to selectively close the second routing in response to determining that the money items in the combination of the money items in the first and second magazines is in accordance with the determined parameters.

148. The method of any of examples 144-147, wherein the money item storage region is located at least partially between the first money item conveyor and the second money item conveyor.

149. A money item handling system, comprising:

a money item storage region;

a money item feed in which at least one money item routing is arranged to feed money items out of the money item storage region;

a rotatable apparatus, arranged to rotate in a plane of rotation inside the money item storage region, comprising at least one gate element which is selectively alignable with the at least one money item routing;

at least one actuator configured to controllably rotate the rotatable apparatus to selectively vary a degree of alignment between the at least one gate element and the at least one money item routing to control movement of money items from the money item storage region through the at least one money item routing.

150. The system of example 149, wherein the at least one gate element comprises a first gate element and the at least one money item routing comprises a first money item routing to feed money items out of the money item storage region.

151. The system of example 150, wherein:

the at least one actuator is configured to controllably rotate the rotatable apparatus to selectively align the first gate element with the first money item routing to prevent movement of money items through the first money item routing; and the at least one actuator is further configured to controllably rotate the rotatable apparatus to selectively misalign the first gate element with the first money item routing to permit movement of money items through the first money item routing.

152. The system of example 150, wherein the at least one actuator is configured to rotate the rotatable apparatus to selectively adopt a plurality of flow control positions of the first gate element, including:

a first flow control position in which the first gate element fully blocks the first routing and prevents money items from moving past the first gate element out of the money item storage region;

a second flow control position in which the first gate element partially blocks the first routing but allows a restricted flow of money items past the first gate element out of the money item storage region; and a third flow control position in which the first gate element does not block the first routing and thereby allows a full flow of money items past the first gate element out of the money item storage region.

153. The system of any of examples 150-152, comprising:

a first money item conveyor and a first money item collection zone associated with the first money item conveyor, wherein money items which move out of the money item storage region through the first money item routing are collected from the first money item collection zone by the first money item conveyor.

154. The system of example 153, wherein the plane of rotation of the rotatable apparatus is substantially parallel with a plane of rotation of the first money item conveyor.

155. The system of any of examples 150-154, wherein the first money item routing is located out of the plane of rotation of the rotatable apparatus.

156. The system of any of examples 150-155, wherein the at least one gate element further comprises a second gate element and the at least one money item routing further comprises a second money item routing to feed money items out of the money item storage region.

157. The system of example 156, wherein the first money item routing exits the money item storage region on a first side of the money item storage region and the second money item routing exits the money item storage region on a second side of the money item storage region.

158. The system of example 156 or 157, wherein:

the at least one actuator is configured to controllably rotate the rotatable apparatus to selectively align the second gate element with the second money item routing to prevent movement of money items through the second money item routing; and the at least one actuator is further configured to controllably rotate the rotatable apparatus to selectively misalign the second gate element with the second money item routing to permit movement of money items through the second money item routing.

159. The system of example 156 or 157, wherein the at least one actuator is configured to rotate the rotatable apparatus to selectively adopt a plurality of flow control positions of the second gate element, including:

a first flow control position in which the second gate element fully blocks the second routing and prevents money items from moving past the second gate element out of the money item storage region;

a second flow control position in which the second gate element partially blocks the second routing but allows a restricted flow of money items past the second gate element out of the money item storage region; and a third flow control position in which the second gate element does not block the second routing and thereby allows a full flow of money items past the second gate element out of the money item storage region.

160. The system of any of examples 156-159, comprising:

a second money item conveyor and a second money item collection zone associated with the second money item conveyor, wherein money items which move out of the money item storage region through the second money item routing are collected from the second money item collection zone by the second money item conveyor.

161. The system of example 160, wherein the plane of rotation of the second money item conveyor is substantially parallel with the plane of rotation of the rotatable apparatus.

162. The system of any of examples 156-161, wherein the second money item routing is located out of the plane of rotation of the rotatable apparatus.

163. The system of any of examples 156-162, wherein the first gate element is formed by a first side wall region of the rotatable apparatus and the second gate element is formed by a second side wall region of the rotatable apparatus.

164. The system of example 163, wherein the first and second side wall regions of the rotatable apparatus are substantially parallel with each other.

165. The system of any of examples 156-164, wherein:

the first gate element extends around only a first partial region of a circumference of the rotatable apparatus; and the second gate element extends around only a second partial region of the circumference of the rotatable apparatus.

166. The system of example 165, wherein the first and second partial regions of the circumference of the rotatable apparatus are partially, but not fully, aligned with one another.

167. The system of any of examples 149-166, wherein the rotatable apparatus comprises at least one stirring element to disrupt money items in the money item storage region upon rotation of the rotatable apparatus.

168. The system of example 167, wherein the at least one stirring element is located on an internal circumferential face of the rotatable apparatus.

The invention claimed is:

1. A money item handling system, comprising:

a mixed denomination money item storage region comprising at least one money item outlet routing;

at least one money item collection zone arranged to receive mixed denomination money items output through the at least one money item outlet routing;

at least one money item conveyor arranged to collect money items from the at least one money item collection zone and to convey money items collected from the at least one money item collection zone around a path of the at least one money item conveyor;

at least one money item flow control apparatus; and at least one actuator configured to controllably actuate the at least one money item flow control apparatus to selectively control movement of money items from the mixed denomination money item storage region to the at least one money item collection zone, wherein the at least one money item flow control apparatus comprises at least one gate element to selectively block and permit movement of money items under gravity from the at least one money item outlet routing to the at least one money item collection zone, and wherein the at least one gate element has a money item accommodating region comprising an open top, the money item accommodating region being configured to receive groups of money items via the at least one money item outlet routing, wherein in a substantially upright first orientation of the money item accommodating region, an inner retaining wall of the at least one gate element is arranged to allow a group of money items to enter the money item accommodating region via the at least one money item outlet routing, and the money item accommodating region is configured to retain the group of money items inside the at least one gate element, wherein in a substantially non-upright second orientation of the money item accommodating region, the inner retaining wall of the at least one gate element is arranged to prevent further money items from entering the money item accommodating region via the at least one money item outlet routing, and the money item accommodating region is configured to release the group of money items to the at least one money item conveyor by tipping the group of money items out of the open top of the money item accommodating region, and wherein the money item accommodating region is configured to move back and forth between the first and second orientations to successively feed groups of money items onto the at least one money item conveyor.

2. The money item handling system of claim 1, wherein in the first orientation further retaining walls of the at least one gate element are arranged to prevent money items from leaving the money item accommodating region for the at least one money item conveyor.

3. The money item handling system of claim 2, wherein in the second orientation the further retaining walls of the at least one gate element are arranged to allow money items to leave the money item accommodating region for the at least one money item conveyor.

4. The money item handling system of claim 1, wherein the at least one gate element comprises a step in an outer retaining wall, and wherein a first narrower part of the money item accommodating region is separated from a second wider part of the money item accommodating region by the step.

5. The money item handling system of claim 4, wherein the second wider part of the money item accommodating region comprises a money item outlet region via which money items leave the second wider part of the money item accommodating region for the at least one money item conveyor.

6. The money item handling system of claim 4, wherein the outer retaining wall in the first narrower part of the money item accommodating region is configured to restrict money item access to the first narrower part of the money item accommodating region from the mixed denomination money item storage region.

7. The money item handling system of claim 1, wherein the inner retaining wall comprises a helically formed inner retaining wall configured to create a bridging effect in money items in the mixed denomination money item storage region when the money item accommodating region is in the second orientation.

8. The money item handling system of claim 7, wherein the helically formed inner retaining wall is arranged to open out space for money items in the mixed denomination money item storage region upon movement of the money item accommodating region from the first orientation to the second orientation.

9. The money item handling system of claim 7, wherein the helically formed inner retaining wall is arranged to disrupt money items in the mixed denomination money item storage region upon movement of the money item accommodating region from the second orientation to the first orientation.

10. The money item handling system of claim 9, wherein the disruption of the money items in the mixed denomination money item storage region by the helically formed inner retaining wall causes a flow of money items from the mixed denomination money item storage region to the money item accommodating region in the first orientation.

11. The money item handling system of claim 1, wherein the money item accommodating region comprises a cup in the at least one gate element.

12. The money item handling system of claim 1, wherein the at least one actuator comprises a motor-driven actuator.

13. A method of operating a money item handling system, comprising:

actuating at least one money item flow control apparatus to selectively permit money items to move under gravity, from a money item outlet routing of a mixed denomination money item storage region, to a collection zone of a money item conveyor, wherein the at least one money item flow control apparatus comprises at least one gate element to selectively block and permit money items from moving under gravity from the money item outlet routing to the collection zone of the money item conveyor, and wherein the at least one gate element has a money item accommodating region comprising an open top, the money item accommodating region being configured to receive groups of money items via the money item outlet routing, wherein in a substantially upright first orientation of the money item accommodating region, an inner retaining wall of the at least one gate element is arranged to allow a group of money items to enter the money item accommodating region via the at least one money item outlet routing, and the money item accommodating region is configured to retain the group of money items inside the at least one gate element, wherein in a substantially non-upright second orientation of the money item accommodating region, the inner retaining wall of the at least one gate element is arranged to prevent further money items from entering the money item accommodating region via the at least one money item outlet routing, and the money item accommodating region is configured to release the group of money items to the collection zone of the money item conveyor by tipping the group of money items out of the open top of the money item accommodating region, and wherein the money item accommodating region is configured to move back and forth between the first and second orientations to successively feed groups of money items onto the money item conveyor;

conveying, on the money item conveyor, a plurality of money items from the collection zone to at least one money item sensor;

denominating, at the at least one money item sensor, the plurality of money items;

selecting, from the denominated plurality of money items on the money item conveyor, at least one money item for output from the money item conveyor; and routing, in a money item outlet zone of the money item conveyor, the selected at least one money item off the money item conveyor.

14. The method of claim 13, comprising:

actuating the at least one gate element to the first orientation in which the money item accommodating region is configured to retain the money items inside the at least one gate element; and actuating the at least one gate element to the second orientation in which the money item accommodating region is configured to release the money items to the money item conveyor.

15. The method of claim 14, comprising:

following actuation of the at least one gate element to the second orientation, actuating the at least one gate element back to the first orientation.

16. The method of claim 14, wherein in the first orientation further retaining walls of the at least one gate element are arranged to prevent money items from leaving the money item accommodating region for the money item conveyor.

* * * * *